(12) United States Patent
Baghdadi et al.

(10) Patent No.: US 12,004,590 B2
(45) Date of Patent: Jun. 11, 2024

(54) FOAM COMPOSITIONS AND USES THEREOF

(71) Applicant: NIKE, Inc., Beaverton, OR (US)

(72) Inventors: Hossein A. Baghdadi, Portland, OR (US); Jay Constantinou, Beaverton, OR (US); Joseph Thomas Muth, Boxford, MA (US); Brian G. Prevo, Portland, OR (US); Bradley C. Tutmark, Aloha, OR (US)

(73) Assignee: NIKE, INC., Beaverton, OR (US)

( * ) Notice: Subject to any disclaimer, the term of this patent is extended or adjusted under 35 U.S.C. 154(b) by 0 days.

(21) Appl. No.: 18/455,582

(22) Filed: Aug. 24, 2023

(65) Prior Publication Data

US 2023/0397694 A1 Dec. 14, 2023

Related U.S. Application Data

(63) Continuation of application No. 17/018,814, filed on Sep. 11, 2020, now abandoned.

(60) Provisional application No. 62/899,688, filed on Sep. 12, 2019, provisional application No. 62/899,696, filed on Sep. 12, 2019.

(51) Int. Cl.
*A43B 13/18* (2006.01)
*A43B 13/04* (2006.01)
(Continued)

(52) U.S. Cl.
CPC ............ *A43B 13/187* (2013.01); *A43B 13/04* (2013.01); *A43B 17/14* (2013.01); *A43D 29/00* (2013.01); *B29C 44/355* (2013.01); *B29C 44/42* (2013.01); *B29C 44/56* (2013.01); *B29C 45/0001* (2013.01); *B29C 48/0021* (2019.02); *B29C 48/15* (2019.02); *B29D 35/0018* (2013.01); *B29D 35/081* (2013.01); *B29D 35/122* (2013.01); *B29D 35/142* (2013.01); *B29D 35/144* (2013.01); *B32B 5/20* (2013.01); *B32B 27/065* (2013.01); *C08G 63/183* (2013.01); *C08J 9/0061* (2013.01); *C08J 9/122* (2013.01); *C08L 67/00* (2013.01); *C08L 75/04* (2013.01); *B29C 2045/0079* (2013.01); *B29K 2021/003* (2013.01); *B29K 2067/00* (2013.01); *B29K 2075/00* (2013.01); *B29K 2105/045* (2013.01); *B32B 27/306* (2013.01); *B32B 27/40* (2013.01); *B32B 2266/0292* (2013.01); *B32B 2266/06* (2013.01); *B32B 2274/00* (2013.01); *B32B 2307/7265* (2013.01); *B32B 2437/02* (2013.01);
(Continued)

(58) Field of Classification Search
CPC ....... A43B 13/187; A43B 13/04; A43B 17/14; A43B 13/20; A43D 29/00; B29C 44/355; B29C 44/42; B29C 44/56; B29C 45/0001; B29C 48/0021; B29C 48/15; B29C 2045/0079; B29C 44/06; B29D 35/0018; B29D 35/081; B29D 35/122; B29D 35/142; B29D 35/144; B32B 5/20; B32B 27/065; B32B 27/306; B32B 27/40; B32B 2266/0292; B32B 2266/06; B32B 2274/00; B32B 2307/7265; B32B 2437/02; B32B 2266/025; B32B 2266/0264; B32B 2266/104; B32B 2307/51; B32B 2307/5825; B32B 27/302; B32B 37/308; B32B 27/32; B32B 27/34; B32B 2307/536; B32B 2307/54; B32B 2307/554; B32B 2307/72; B32B 2307/7244; B32B 2307/7246; B32B 2307/744; B32B 5/18; B32B 7/12; B32B 27/08; B32B 27/36; C08G 63/183; C08G 2410/00; C08J 9/0061; C08L 67/00; C08L 75/04; C08L 2203/14; C08L 2205/025; B29K 2021/003; B29K 2067/00; B29K 2075/00; B29K 2105/045; B29L 2031/50

See application file for complete search history.

(56) References Cited

U.S. PATENT DOCUMENTS 4,667,423 A  5/1987  Autry et al.
4,876,805 A  10/1989  Peoples
(Continued)

FOREIGN PATENT DOCUMENTS

CN  103717657 A  4/2014
CN  106459353 A  2/2017
(Continued)

OTHER PUBLICATIONS

Deleglise et al., "Simulation of LCM processes involving induced or forced defamations," Composites: Part A 37 (2006) 874-880 (Year: 2006).*

(Continued)

*Primary Examiner* — K. Boyle
(74) *Attorney, Agent, or Firm* — THOMAS | HORSTEMEYER, LLP

(57) ABSTRACT

Components for articles of footwear and athletic equipment including a foam are provided. The foam portion of the components and articles include a composition which includes a thermoplastic copolyester, the composition having a foam structure. A polymer layer is provided on at least on surface of the foam portion. The polymer layer can control or reduce the water uptake of the foam portion. Methods of making the compositions, foams, and components are provided, as well as methods of making an article of footwear including one of the foam components. In some aspects, the foams and foam components can be made by injection molding, or injection molding followed by compression molding.

20 Claims, 15 Drawing Sheets

(51) Int. Cl.

| | |
|---|---|
| A43B 17/14 | (2006.01) |
| A43D 29/00 | (2006.01) |
| B29C 44/34 | (2006.01) |
| B29C 44/42 | (2006.01) |
| B29C 44/56 | (2006.01) |
| B29C 45/00 | (2006.01) |
| B29C 48/00 | (2019.01) |
| B29C 48/15 | (2019.01) |
| B29D 35/00 | (2010.01) |
| B29D 35/08 | (2010.01) |
| B29D 35/12 | (2010.01) |
| B29D 35/14 | (2010.01) |
| B32B 5/20 | (2006.01) |
| B32B 27/06 | (2006.01) |
| C08G 63/183 | (2006.01) |
| C08J 9/00 | (2006.01) |
| C08J 9/12 | (2006.01) |
| C08L 67/00 | (2006.01) |
| C08L 75/04 | (2006.01) |
| B29K 21/00 | (2006.01) |
| B29K 67/00 | (2006.01) |
| B29K 75/00 | (2006.01) |
| B29K 105/04 | (2006.01) |
| B32B 27/30 | (2006.01) |
| B32B 27/40 | (2006.01) |
| C08J 9/36 | (2006.01) |

(52) U.S. Cl.
CPC ........... *C08G 2410/00* (2013.01); *C08J 9/365* (2013.01); *C08J 2201/03* (2013.01); *C08J 2203/08* (2013.01); *C08J 2205/044* (2013.01); *C08J 2205/05* (2013.01); *C08J 2205/052* (2013.01); *C08J 2323/02* (2013.01); *C08J 2367/02* (2013.01); *C08L 2203/14* (2013.01); *C08L 2205/025* (2013.01)

(56) References Cited

U.S. PATENT DOCUMENTS

| | | | |
|---|---|---|---|
| 4,984,376 A | 1/1991 | Walter et al. | |
| 4,988,740 A | 1/1991 | Walter et al. | |
| 5,202,069 A | 4/1993 | Pontiff | |
| 5,642,575 A | 7/1997 | Norton et al. | |
| 6,267,692 B1 | 7/2001 | Higuchi et al. | |
| 6,833,428 B1 | 12/2004 | Kato | |
| 10,314,364 B2 | 6/2019 | Schiller et al. | |
| 10,974,447 B2 | 4/2021 | Constantinou et al. | |
| 2003/0172548 A1 | 9/2003 | Fuerst | |
| 2005/0015907 A1 | 1/2005 | Georgi et al. | |
| 2005/0183287 A1* | 8/2005 | Schindler | A43B 13/187 36/29 |
| 2011/0206926 A1 | 8/2011 | Marc | |
| 2012/0167416 A1 | 7/2012 | Christensen et al. | |
| 2014/0162050 A1 | 6/2014 | Kodama et al. | |
| 2015/0038605 A1 | 2/2015 | Baghdadi | |
| 2015/0038606 A1 | 2/2015 | Baghdadi | |
| 2017/0253710 A1 | 9/2017 | Smith et al. | |
| 2018/0133995 A1* | 5/2018 | Wan | B29C 44/3415 |
| 2018/0273715 A1 | 9/2018 | Luo et al. | |
| 2019/0343223 A1 | 11/2019 | Mason | |
| 2021/0076772 A1 | 3/2021 | Baghdadi et al. | |

FOREIGN PATENT DOCUMENTS

| | | |
|---|---|---|
| CN | 107075163 A | 8/2017 |
| CN | 107641293 A | 1/2018 |
| DE | 102014003017 A1 | 9/2015 |
| EP | 0402883 A2 | 12/1990 |
| EP | 0608143 A1 | 7/1994 |
| EP | 1225199 A1 | 7/2002 |
| EP | 2508922 A1 | 10/2012 |
| EP | 3244240 A1 | 11/2017 |
| GB | 2114869 A | 9/1983 |
| GB | 2164291 A1 | 3/1986 |
| JP | 2002-361768 A2 | 12/2002 |
| JP | 2007-319356 A2 | 12/2007 |
| JP | 2012159589 A | 8/2012 |
| KR | 101472929 B1 | 12/2014 |
| KR | 20160098772 A | 8/2016 |
| TW | 200628089 A | 8/2006 |
| WO | 03095657 A2 | 11/2003 |
| WO | 2016030333 A1 | 3/2016 |
| WO | 2017042707 A2 | 3/2017 |
| WO | 2017171031 A1 | 10/2017 |
| WO | 2018134166 A1 | 7/2018 |
| WO | 2018222714 A1 | 12/2018 |
| WO | 2019178150 A1 | 9/2019 |
| WO | 2019178154 A1 | 9/2019 |

OTHER PUBLICATIONS

International Preliminary Report on Patentability for PCT/US2019/021931 mailed on Mar. 2, 2020.
International Search Report and Written Opinion for PCT/US2019/021931 mailed on May 9, 2019.
Written Opinion of the International Preliminary Examining Authority for PCT/US2019/021931 mailed on Dec. 16, 2019.
International Search Report and the Written Opinion of the International Searching Authority for PCT/US2020/050360, mailed Nov. 20, 2020.
International Preliminary Report on Patentability for PCT/US2020/050489, mailed Dec. 6, 2021.
International Preliminary Report on Patentability for PCT/US2019/021926, mailed Nov. 26, 2020.
International Search Report and the Written Opinion of the International Searching Authority for PCT/US2020/050484, mailed Dec. 21, 2020.
International Preliminary Report on Patentability for PCT/US2020/050361, mailed on Nov. 29, 2021.
Veenstra, "Formation and stability of co-continuous blends with a poly(ether-ester)block copolymer around its order-disorder temperature," Polymer, vol. 40 (1999) p. 1119-1130. (Year: 1999).
Written Opinion of the International Preliminary Examining Authority for PCT/US2020/050484, mailed Jun. 15, 2021.
Written Opinion of the International Preliminary Examining Authority for PCT/US2020/050489, mailed Apr. 28, 2021.
International Search Report and Written Opinion for PCT/US2020/050489 mailed on Dec. 21, 2020.
International Search Report and Written Opinion for PCT/US2020/050361, mailed Nov. 20, 2020.
International Search Report and Written Opinion for PCT/US2019/021926 mailed on May 9, 2019.
International Preliminary Report on Patentability for PCT/US2019/021926 mailed on Mar. 2, 2020.
Written Opinion of the International Preliminary Examining Authority for PCT/US2019/021926 mailed on Dec. 16, 2019.
International Preliminary Report on Patentability for PCT/US2020/050360, mailed Mar. 24, 2022.
International Preliminary Report on Patentability for PCT/US2020/050484, mailed Dec. 6, 2021.
Chambon, et al., "Is midsole thickness a key parameter for the running pattern?", Gait & Posture, vol. 40 (2014), pp. 58-63.
"Practical Technology of Plastic Injection Molding", Zhiming Jin, May 31, 2009, pp. 141-143, Printing Industry Press.

\* cited by examiner

| COF TEST DATA FOR WOOD COURT | | | | Wood court surface dry | | Wood court surface wet | | |
|---|---|---|---|---|---|---|---|---|
| SAMPLE | Durometer | Density (g/cc) | DIN abrasion loss (mg) | DCOF | 3*SD | DCOF | 3*SD | Comment |
| Estane 2350-75A | 75 A | 1.17 | 67 | 1.74 | 0.1 | 0.4 | 0.02 | nonmarking |
| Kurarity LA2250 | 70 A | | 350 | 1.82 | | 0.44 | | marking |
| Kurarity LA4285 | 90 A | | 264 | 0.51 | | 0.32 | | nonmarking |
| Monoprene IN 15056 | 60 A | 0.89 | 117.5 | 1.67 | 0.43 | 0.64 | 0.17 | marking |
| Monoprene CP 28160 | 65 A | 0.89 | 89 | 1.93 | 0.1 | 0.35 | 0.21 | marking |
| Monoprene IN 15074 | 75 A | 0.777 | 88.000 | 1.98 | 0.18 | 0.27 | 0.14 | marking |
| Sarlink TPV 3160 | 65 A | 0.95 | 213.8 | 1.7 | 0.17 | 0.31 | 0.07 | marking |
| Sarlink TPV 6755B | 60 A | 0.915 | 326.7 | 1.3 | 0.21 | 0.63 | 0.12 | marking |
| Sarlink TPV 6755N | 60 A | 0.915 | 197.5 | 1.5 | 0.15 | 0.57 | 0.16 | marking |
| TPSiV 50A | 50 A | 1.07 | 156 | 1.01 | 0.03 | 0.44 | 0.07 | nonmarking |
| TPSiV 60A | 60 A | 1.08 | 118 | 0.93 | 0.18 | 0.48 | 0.08 | nonmarking |
| Tuftec P1500 | 70 A | | 198 | 2 | | 0.57 | | marking |
| Tuftec P5051 | 90 A | | 350 | low | | low | | nonmarking |
| Zeotherm 100-70B | 70 A / 20 D | 1.05 | 350 | 1.74 | 0.43 | 0.43 | 0.07 | marking |
| Zeotherm 100-80B | 80 A | 1.09 | 183.9 | 1.65 | 0.42 | 0.44 | 0.06 | marking |
| Zeotherm 110-70B | 70 A / 20 D | 1.05 | 246.7 | 1.78 | 0.24 | 0.4 | 0.04 | marking |
| Zeotherm 130-90B | 90 A | 1.07 | 149.8 | 1.45 | 0.23 | 0.41 | 0.07 | marking |

FIG. 11

| 2mm flat plaque geometry | | | | | Smooth Dry Concrete Dynamic COF | Smooth Dry Concrete 3˝ Std Dev | Smooth Wet concrete Dynamic COF | Smooth Wet concrete 3˝ Std Dev | Wet/Dry Smooth | Dry - Wet | (Dry-Wet)/Dry Smooth |
|---|---|---|---|---|---|---|---|---|---|---|---|
| Material Grade | Form | Durometer (Shore A) | Specific Gravity | DIN abrasion mass loss (mg) | | | | | | | |
| Apilon 52 | Solid | 65 A | 1.2 | 124 | 1.420 | 0.168 | 0.650 | 0.063 | 0.17 | 0.17 | 0.17 |
| BT 1030D | Solid | 30 D | 1.07 | 68 | 1.280 | 0.095 | 0.215 | 0.035 | 0.10 | 0.10 | 0.10 |
| Ellastolan b70a | Solid | 70 A | 1.2 | 94 | 1.100 | 0.016 | 0.464 | 0.016 | 0.02 | 0.02 | 0.02 |
| Ellastolan SP9500 | Solid | 70 A | 1.21 | 62 | 1.054 | 0.018 | 0.503 | 0.013 | 0.02 | 0.02 | 0.02 |
| Estane 2358.75a-030 | Solid | 75 A | 1.17 | 67 | 0.988 | 0.015 | 0.486 | 0.014 | 0.01 | 0.01 | 0.01 |
| Estane 58238 | Solid | 75 A | 1.17 | 65 | 1.039 | 0.012 | 0.483 | 0.044 | 0.01 | 0.01 | 0.01 |
| Estane t470a-3 | Solid | 77 A | 1.14 | 74 | 1.055 | 0.017 | 0.463 | 0.010 | 0.02 | 0.02 | 0.02 |
| HPF AD1035 | Solid | 35 D | 0.96 | 86.4 | 0.790 | 0.039 | 0.490 | | 0.04 | 0.04 | 0.04 |
| HPF AD1172 | Solid | | | | | | | | | | |
| Hytrel 3078 | Solid | 30 D | 1.07 | 71 | 0.930 | 0.066 | 0.215 | 0.030 | 0.06 | 0.06 | 0.06 |
| Hytrel 4556 | Solid | 45 D | 1.14 | 26 | 0.700 | 0.070 | 0.300 | 0.040 | 0.07 | 0.07 | 0.07 |
| KP3340 | Solid | 41 D | 1.13 | 34 | 0.660 | 0.028 | 0.340 | 0.060 | 0.03 | 0.03 | 0.03 |
| KP3347 | Solid | 47 D | 1.15 | 30 | 0.596 | 0.075 | 0.330 | 0.050 | 0.08 | 0.08 | 0.08 |
| Kuranty LA2290 | Solid | 70 A | | 350 | | | | | | | |
| Kuranty LA4285 | Solid | 90 D | | 264 | | | | | | | |
| Monprene 66070 | Solid | 76 A | 0.897 | 374 | 1.211 | 0.024 | 0.673 | 0.022 | 0.02 | 0.02 | 0.02 |
| Monprene CP28160-01 | Solid | 65 A | 0.88 | 89 | | | | | | | |
| Monprene IN15056 | Solid | 60 A | 0.89 | 117.5 | | | | | | | |
| Monprene IN15074 | Solid | 75 A | 0.998 | 66 | 1.236 | 0.030 | 0.470 | 0.020 | 0.03 | 0.03 | 0.03 |
| Monprene SP16074H | Solid | 75 A | 0.89 | | 1.635 | 0.020 | 0.549 | 0.060 | 0.02 | 0.02 | 0.02 |
| Monprene SP16975 | Solid | 75 A | 0.94 | 120 | 1.385 | 0.030 | 0.700 | 0.060 | 0.03 | 0.03 | 0.03 |

FIG. 12

| 2mm flat plaque geometry | | | | | Smooth Dry Concrete Dynamic COF | Smooth Dry Concrete 3 * Std Dev | Smooth Wet concrete Dynamic COF | Smooth Wet concrete 3 * Std Dev | Wet/Dry Smooth | Dry - Wet | (Dry-Wet)/Dry Smooth |
|---|---|---|---|---|---|---|---|---|---|---|---|
| Material Grade | Form | Durometer (Shore A) | Specific Gravity | DIN abrasion mass loss (mg) | | | | | | | |
| Santoprene 123-40 | Solid - Herringbone | 41 D | 0.96 | | 0.720 | 0.020 | 0.460 | 0.030 | 0.64 | 0.26 | 0.36 |
| Santoprene 201-64 | Solid - Herringbone | 69 A | 0.97 | 97 | | | | | | 0.00 | |
| Santoprene 103-50 | Solid - Herringbone | 51 D | 0.95 | | 0.580 | 0.020 | 0.440 | 0.010 | 0.76 | 0.14 | 0.24 |
| Sarlink 3160 | Solid | 65 A | 0.95 | 213.8 | | | | | | 0.00 | |
| Sarlink 6753B | Solid | 60 A | 0.915 | 326.7 | | | | | | 0.00 | |
| Sarlink 6753N | Solid | 60 A | 0.915 | 197.5 | | | | | | 0.00 | |
| Septon blends w/PP (16-011-4) | Solid | 60 A | 0.88 | 141 | | | | | | 0.00 | |
| Septon blends w/PP (16-051-1) | Solid | 60 A | 0.88 | 360 | | | | | | 0.00 | |
| Septon blends w/PP (16-078-2) | Solid | 60 A | 0.88 | 300 | | | | | | 0.00 | |
| Surlyn 6150 | Solid | 65 D | 0.97 | 48.5 | 0.410 | 0.042 | 0.410 | | 1.00 | 0.00 | 0.00 |
| Surlyn 6320 | Solid | 36 D | 0.95 | 76 | 0.660 | 0.081 | 0.630 | | 0.95 | 0.03 | 0.05 |
| Surlyn 9320 | Solid | 40 D | 0.96 | 67.2 | 0.870 | 0.089 | 0.680 | | 0.78 | 0.19 | 0.22 |
| Topgreen RH 1502-2 | Solid | 27 D | 1.1 | 118 | 0.700 | 0.330 | 0.300 | 0.040 | 0.43 | 0.40 | 0.57 |
| Topgreen RH1801-7 | Solid | 23 D | 1.09 | 199 | 0.800 | 0.205 | 0.300 | 0.030 | 0.38 | 0.50 | 0.63 |
| TPSiV-50A | Solid | 50 A | 1.07 | 156 | | | | | | 0.00 | |
| TPSiV-60A | Solid | 60 A | 1.08 | 118 | | | | | | 0.00 | |
| Thei 6202SP | Solid | 70 A / 20 D | 1.1 | | 0.823 | 0.019 | 0.397 | 0.071 | 0.48 | 0.43 | 0.52 |
| Thei 6300 | Solid | 30 D | 1.08 | 46 | 0.800 | 0.060 | 0.200 | 0.020 | 0.25 | 0.60 | 0.75 |
| Thei 6401A | Solid | 40 D | 1.12 | 80 | 0.750 | 0.105 | 0.350 | 0.035 | 0.47 | 0.40 | 0.53 |
| Thei SY 6280 | Solid | 28 D | 1.07 | | 1.050 | 0.255 | 0.300 | 0.026 | 0.29 | 0.75 | 0.71 |

FIG. 12, continued

| 2mm flat plaque geometry | | | | | Smooth Dry Concrete Dynamic COF | Smooth Dry Concrete 3 × Std Dev | Smooth Wet concrete Dynamic COF | Smooth Wet concrete 3 × Std Dev | Wet/Dry - Smooth | Dry - Wet | (Dry-Wet)/Dry Smooth |
|---|---|---|---|---|---|---|---|---|---|---|---|
| Material Grade | Form | Durometer (Shore A) | Specific Gravity | DIN abrasion mass loss (mg) | | | | | | | |
| Tuftec P1500 | Solid | 70 A | | 198 | | | | | | 0.00 | 0.00 |
| Tuftec P5051 | Solid | 90 A | | 350 | | | | | | 0.00 | 0.00 |
| Zeotherm 100-70B | Solid | 70 A / 20 D | 1.06 | | | | | | | 0.00 | 0.00 |
| Zeotherm 100-80B | Solid | 80 A | 1.09 | 183.9 | | | | | | 0.00 | 0.00 |
| Zeotherm 110-70B | Solid | 70 A / 20 D | 1.05 | 246.7 | | | | | | 0.00 | 0.00 |
| Zeotherm 130-80B | Solid | 80 A | 1.07 | 149.8 | | | | | | 0.00 | 0.00 |

FIG. 12, continued

| 2mm flat plaque geometry | | | | | | Smooth Dry Concrete | | | Smooth Wet concrete | | | | |
|---|---|---|---|---|---|---|---|---|---|---|---|---|---|
| Material Grade | Form | Supplier | Durometer (Shore A) | Specific Gravity | DIN abrasion mass loss (mg) | Dynamic COF | 3 * Std Dev | | Dynamic COF | 3 * Std Dev | Wet/Dry Smooth Conc. | Dry - Wet | (Dry-Wet)/Dry Smooth Conc. |
| Desmopan 8795A | Foam | Covestro | | 0.715 | | 0.894 | 0.018 | | 0.622 | 0.043 | 0.70 | 0.27 | 0.30 |
| Elastolan SP9339 | Foam | BASF | | 0.7944 | | 1.434 | 0.148 | | 0.629 | 0.062 | 0.44 | 0.80 | 0.56 |
| Hytrel 3078 | Foam | DuPont | | 0.71 | | 1.076 | 0.294 | | 0.285 | 0.025 | 0.26 | 0.79 | 0.74 |
| Hytrel 3078 | Solid | DuPont | 30 D | 1.07 | 71 | 0.930 | 0.055 | | 0.215 | 0.030 | 0.23 | 0.72 | 0.77 |
| Hytrel 4068 | Foam | DuPont | | 0.84 | | 0.913 | 0.182 | | 0.275 | 0.021 | 0.30 | 0.64 | 0.70 |
| Monprene 12990 | Foam | Teknor Apex | | 0.798 | | 0.992 | 0.076 | | 0.439 | 0.030 | 0.44 | 0.55 | 0.56 |
| Monprene IN15074 | Foam | Teknor Apex | 75 A | 0.777 | 88 | 1.291 | 0.024 | | 0.509 | 0.015 | 0.39 | 0.78 | 0.61 |
| Monprene IN15074 | Solid | Teknor Apex | 75 A | 0.898 | 66 | 1.235 | 0.030 | | 0.470 | 0.020 | 0.38 | 0.77 | 0.62 |
| Triel 5202SP | Foam | SamYang | | 0.80 | | 0.952 | 0.074 | | 0.441 | 0.050 | 0.46 | 0.51 | 0.54 |
| Triel 5202SP | Solid | SamYang | 70 A / 20 D | 1.1 | | 0.823 | 0.019 | | 0.397 | 0.071 | 0.48 | 0.43 | 0.52 |

FIG. 13

| Resin | Hardness (Shore) | S.G. | S.G. foamed flat | S.G. foamed waffle | SG reduction flat | SG reduction waffle |
|---|---|---|---|---|---|---|
| Desmopan 8795A | 95 A | 1.21 | 0.715 | 0.8503 | 41% | 30% |
| Ellastolan SP9339 | 70 A | 1.21 | 0.7944 | 0.804 | 34% | 34% |
| Hytrel 3078Q | 30 D | 1.07 | 0.7102 | 0.7677 | 34% | 28% |
| Hytrel 4068 | 40 D | 1.11 | 0.8409 | 0.8425 | 24% | 24% |
| Monprene 12990 | 92 A | 0.89 | 0.798 | 0.7873 | 10% | 12% |
| Monprene IN15074 | 75 A | 0.89 | 0.7767 | 0.7826 | 13% | 12% |
| Triel 5202SP | 70 A | 1.1 | 0.8024 | 0.8607 | 27% | 22% |

FIG. 14

FOAM COMPOSITIONS AND USES THEREOF

CROSS-REFERENCE TO RELATED APPLICATIONS

This application is a continuation application of and claims priority to U.S. nonprovisional application entitled "FOAM COMPOSITIONS AND USES THEREOF" having Ser. No. 17/018,814, filed on Sep. 11, 2020, which claim priority to U.S. provisional applications entitled "FOAM COMPOSITIONS AND USES THEREOF" having Ser. Nos. 62/899,688 and 62/899,696, both filed on Sep. 12, 2019, the contents of which are incorporated by reference in its entirety.

TECHNICAL FIELD

The present disclosure generally relates to foams formed of thermoplastic copolyesters, and in particular to foams formed of thermoplastic copolyesters which are suitable for the footwear and related industries and uses thereof.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

FIG. 11 shows representative coefficient of friction on a wood surface data for various polymeric materials.

FIG. 12 shows representative coefficient of friction on a concrete surface data for various polymeric materials.

FIG. 13 shows representative coefficient of friction on a concrete surface data for various polymeric materials used in a blown outsole.

FIG. 14 shows representative specific gravity data for various polymeric materials in unfoamed samples and various foamed samples.

DETAILED DESCRIPTION

Figure 1:
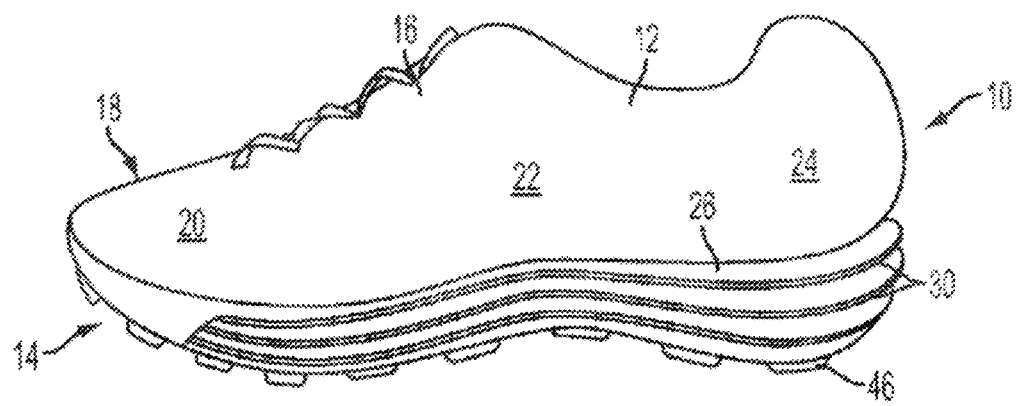
FIG. 1 is an elevation view of an article of footwear with a sole component according to an aspect of the invention.

The present disclosure is directed to a foam article which includes a first component, i.e., a thermoplastic foam component compositionally comprising a foamed first thermoplastic composition. In other words, the foamed first thermoplastic composition retains its thermoplastic properties, and can be recycled by melting the foamed first thermoplastic composition, and re-forming the first thermoplastic composition it into a new foamed article or a new solid (i.e., unfoamed) article. The first component is a foam component that includes a foamed first thermoplastic composition having a multicellular foam structure. In some aspects, the multicellular foam structure is an open-cell foam structure. In other aspects, the multicellular foam structure is a closed-cell foam structure. In some aspects, the foamed first thermoplastic composition comprises one or more copolyesters, such as, for example, one or more copolyester elastomers. In some aspects, the first thermoplastic composition further comprises one or more non-polymeric ingredients, such as a filler or a nucleating agent or a pigment. The one or more non-polymeric ingredients can comprise 5 weight percent or less of the first thermoplastic composition based on the total weight of the first thermoplastic composition. It has been found, for thermoplastic foams, particularly thermoplastic foams compositionally comprising at least one thermoplastic copolyester elastomer, that including low levels (e.g., 5 weight percent or less) of non-polymeric ingredients such as fillers, nucleating agents and pigments can improve the consistency of the sizes of the cells in the multicellular thermoplastic foam. In addition to improving the cell structure, including low levels of non-polymeric ingredients in the first thermoplastic composition can also increase recyclability of the first thermoplastic composition, due to the high polymeric content of these thermoplastic compositions. The first thermoplastic composition can be free of or essentially free of fillers. The first thermoplastic composition can be free of or essentially free of nucleating agents. The first thermoplastic composition can be free or essentially free of pigments. The first thermoplastic composition can be free of or essentially free of fillers and nucleating agents, or can be free or essentially free of fillers, nucleating agents, and pigments. The first thermoplastic composition can be free of or essentially free of non-polymeric ingredients. The foam article is particularly useful as a cushioning element.

In some aspects, the disclosed foam article also includes a second component comprising a second thermoplastic composition. In such aspects, the second component can be disposed on or in at least a portion of the first component. The second component can comprise a polymeric layer disposed on at least a portion of an external surface of the foamed first thermoplastic composition of the first component. The second component comprises a second thermoplastic composition which retains its thermoplastic properties and can be recycled by melting the second thermoplastic composition, and re-forming the second thermoplastic composition it into a new foamed article or a new solid (i.e., unfoamed) article. As both the first component and the second component are formed of thermoplastic compositions, the first and the second components need not be separated before being recycled. For example, the foam article can be recycled by grinding or shredding the entire article and forming a molten polymeric composition which is a mixture of both the first thermoplastic composition and the second thermoplastic composition. The second thermoplastic composition can comprise a thermoplastic elastomer or a thermoplastic vulcanizate material. The second thermoplastic composition can comprise a one or more thermoplastic styrene copolymer elastomers, including styrene-ethylene-butene-styrene (SEBS) copolymer elastomers. The second thermoplastic composition can comprise one or more thermoplastic polyurethane elastomers, alone or blended with other polymers such as, for example, an ethylene-vinyl alcohol copolymer, or a styrene copolymer elastomer. Second thermoplastic compositions which comprise a thermoplastic copolyester elastomer, or a thermoplastic polyurethane elastomer, or a thermoplastic styrene copolymer elastomer, or a thermoplastic vulcanizate material, have been found to form strong thermal bonds with foamed first thermoplastic compositions comprising one or more thermoplastic copolyester elastomers. The foam article disclosed herein is particularly useful as a cushioning element. The foam article including the first component and the second component is particularly useful as a cushioning element for an article of footwear, apparel or sporting equipment. For example, the first component of the foam article can be a midsole or a midsole component. The second component of the foam article can be a ground contacting component such as an outsole, or a protective element such as a rand, on an article of footwear, which provides a greater level of abrasion resistance or provides better traction or which provides both, as compared to the first foam component alone. The second component of the foam article can be a protective or reinforcing layer or a containment layer on the first foam component, such as when the first foam component is a cushioning element, or in other applications. In some aspects, when the first component has an open-cell foam structure, the second component can be a water-resistant barrier to reduce or prevent water uptake by the open cell structure of the foam.

Conventionally, vulcanized and peroxide-cured natural and synthetic rubbers such as isoprene and polybutadiene rubbers have been used to form durable, abrasion-resistant outer protective layers for a wide variety of articles, including outsoles for articles of footwear. Rubber formulations used for outsoles also typically provide traction. One disadvantage of using conventional rubber materials is that these materials are highly crosslinked during the curing process, rendering the cured rubber a thermoset material and making it difficult to recycle or reuse the cured rubber. Also, it can be difficult to bond other materials to the cured rubber. Both the rubber materials and foam materials typically used in a wide variety of consumer good are highly crosslinked materials, which are formed and cured separately and then adhered to each other using an adhesive system. These adhesive systems require several manually-intensive processing steps, such as cleaning the surfaces, priming the surfaces, applying adhesive to the surfaces, and pressing the surfaces together to bond them.

It has been found that thermoplastic compositions (e.g., thermoplastic compositions comprising one or more thermoplastic copolyester elastomer) can be used to form multicellular foams having advantageous properties for use in consumer articles such as cushioning elements.

When foamed as described herein, these foams retain thermoplastic properties, making it possible to readily recycle and reuse the thermoplastic compositions. Additionally, it has been found that these foams can be directly molded and foamed onto other polymeric materials (i.e., onto second thermoplastic compositions as described herein), which bonds the foam securely to the second thermoplastic composition with a thermal bond without the need for additional adhesives, or the manual process steps of applying an adhesive system. The second thermoplastic composition which is bonded to the thermoplastic foam can be a thermoplastic elastomeric material, such as a second thermoplastic composition as described herein. Examples of both second thermoplastic compositions which, when used either in solid form or in a lightly foamed form (e.g., having a specific gravity of 0.85 or greater) have been found which both bond well to the thermoplastic copolyester-based foam during a molding and foaming process, and which also provide high levels of abrasion resistance and traction under wet and dry conditions, are described herein. When the second thermoplastic composition comprises a second thermoplastic copolyester, the fact that the foam comprises a first thermoplastic copolyester and that the polymeric layer comprises a second thermoplastic copolyester composition provides the advantage that the entire article can easily be melted down and the combined material can be recycled. In this scenario, the second copolyester composition can each individually include one or more of the same individual copolyesters present in the first thermoplastic copolyester composition, either in the same proportions or in different proportions. Alternatively, the first and second copolyester compositions can each individually comprise different copolyesters.

The foam components disclosed herein are formed by foaming thermoplastic compositions comprising one or more thermoplastic elastomer into a multicellular foam having an open-cell or closed-cell foam structure. In some examples, the one or more thermoplastic elastomer can comprise or consist essentially of a thermoplastic copolyester elastomer. Examples of thermoplastic copolyester elastomers include polymers which have one or more carboxylic acid moieties present in the polymeric backbone, on one or more side chains, or both in the polymeric backbone and on one or more side chains. The one or more carboxylic acid moieties of the thermoplastic copolyester can include a free carboxylic acid, a salt of a carboxylic acid, or an anhydride of a carboxylic acid. In particular examples, the carboxylic acid moiety can be an acrylic acid moiety or a methacrylic acid moiety. The foam articles comprising a multicellular open-cell or closed-cell thermoplastic foam and a polymeric layer of the present disclosure are suitable for use in a variety of articles including for athletic equipment and apparel, particularly footwear (e.g., athletic footwear midsoles/outsoles). As discussed below, the multicellular open-cell or closed-cell thermoplastic foam exhibits a unique balance of properties such as high energy efficiency or energy return, and low specific gravity. In some examples, the multicellular foam also exhibits a high split tear and low compression set. The presence of the polymeric layer on at least a portion of the exterior surface of the foam can reduce or prevent liquid uptake by the multicellular foams, particularly multicellular open-cell foams, increasing their performance when used under conditions where the foam come into contact with liquids. Furthermore, the thermoplastic foam can also be reprocessed with minimal loss in physical properties (e.g., for recycling), providing a solution for materials sustainability.

The second thermoplastic composition of the polymeric layer can be selected to allow the entire foam article to be recycled in a single step, without the need to remove or separate the polymeric layer from the foam. For example, the second thermoplastic composition can comprise one or more thermoplastic copolyesters.

The foam article or foam component comprising the thermoplastic c foam can be formed by injection molding and foaming the thermoplastic composition as described herein, or by injection molding and foaming the thermoplastic composition as described herein into a foam preform and subsequently compression molding the foam-preform into a finished foam. The second thermoplastic composition can be disposed onto an exterior surface of the foam component during an injection molding and foaming process, in which the first thermoplastic composition is injected into a mold which includes the second thermoplastic composition, and the second thermoplastic composition bonds to the foam during the molding process. Alternatively or additionally, the second thermoplastic composition can be disposed onto the exterior surface of the foam component during a compression molding step, in which the foam component is compression molded in a mold which includes the second thermoplastic composition, and the second thermoplastic composition bonds to the foam during the molding process. Alternatively or additionally, the second thermoplastic composition can be disposed onto the foam component after the foam component has been formed, such as, for example, by vacuum forming a film comprising the second thermoplastic composition to the foam component.

Articles Manufactured Using the Disclosed Foams.

Footwear 10 is an exemplary article of athletic footwear that includes the thermoplastic foam of the present disclosure. While illustrated as a running shoe, footwear 10 may alternatively be configured for any suitable athletic performance, such as baseball shoes, basketball shoes, soccer/global football shoes, American football shoes, running shoes, cross-trainer shoes, cheerleading shoes, golf shoes, and the like. While an athletic shoe is exemplified in FIG. 1, it will be readily understood that some of the terminology employed will also apply to other articles of footwear or to other styles of shoe. Footwear 10 includes an upper 12 and a sole component 14 secured to upper 12. Sole component 14 can be secured to upper 12 by adhesive or any other suitable means. As used herein, the sole component 14 can be a monolithic component formed entirely of the thermoplastic foam material as described herein, or a multi-component assembly formed of a plurality of monolithic components, where at least one of the monolithic components is formed entirely of the thermoplastic foam material as described herein.

Footwear 10 has a medial, or inner, side 16 and a lateral, or outer, side 18. For ease of discussion, footwear 10 can be divided into three portions: a forefoot portion 20, a midfoot portion 22, and a heel portion 24. Portions 20, 22, and 24 are not intended to demarcate precise areas of footwear 10. Rather, portions 20, 22, and 24 are intended to represent respective areas of footwear 10 that provide a frame of reference during the following discussion. Unless indicated otherwise, directional terms used herein, such as rearwardly, forwardly, top, bottom, inwardly, downwardly, upwardly, etc., refer to directions relative to footwear 10 itself. Footwear 10 is shown in FIG. 1 in a substantially horizontal orientation, as it would be positioned on a horizontal surface when worn by a wearer. However, it is to be appreciated that footwear 10 need not be limited to such an orientation. Thus, in FIG. 1, rearwardly is toward heel portion 24 (to the right as seen in FIG. 1), forwardly is toward forefoot portion 20 (to the left as seen in FIG. 1), and downwardly is toward the bottom of the page as seen in FIG. 1. Top refers to elements toward the top of the view in FIG. 1, while bottom refers to elements toward the bottom of the view in FIG. 1. Inwardly is toward the center of footwear 10, and outwardly is toward the outer peripheral edge of footwear 10.

The component can be a sole component, such as a sole component 14 depicted in FIGS. 1-5, that includes a thermoplastic foam, including a thermoplastic copolyester foam, as described herein. The component can be an insert such as insert 36 or insert 60 depicted in FIGS. 4-5 that includes a thermoplastic foam described herein. The sole components and inserts for sole components can be made partially or entirely of a thermoplastic foam described herein. Any portion of a sole component or an insert for a sole component can be made of a thermoplastic foam described herein. For example, first portion 26 of the sole component (optionally including the ground engaging lower surface 44, such as the plurality of projections 46 and/or the groove 48 surrounding the projections), the entire insert 36, portions 62 or 64 of insert 60, a separate outsole component, or any combination thereof, can include a thermoplastic foam as described herein. The sole components and inserts can be made by foaming thermoplastic compositions as described herein, for example by injection molding or by injection molding, optionally followed by compression molding, as described herein. In some aspects, the thermoplastic foams can be formed by physical foaming of the thermoplastic compositions. The thermoplastic foams and components can demonstrate improved physical properties including one or more of an enhanced energy efficiency or energy return, an enhanced split tear, a decreased specific gravity, or a combination thereof.

Sole component 14, which is generally disposed between the foot of the wearer and the ground, provides attenuation of ground reaction forces (i.e., imparting cushioning), traction, and may control foot motions, such as pronation. As with conventional articles of footwear, sole component 14 can include an insole (not shown) located within upper 12. In some aspects, the sole component is an insole or sockliner or is a multi-component assembly including an insole or sockliner, can further include an insole or sockliner located within the upper, where the insole or sockliner is formed entirely or partially of a thermoplastic foam described herein. Articles of footwear described herein can include an insole or sockliner formed entirely or partially of a thermoplastic foam described herein.

Figure 2:
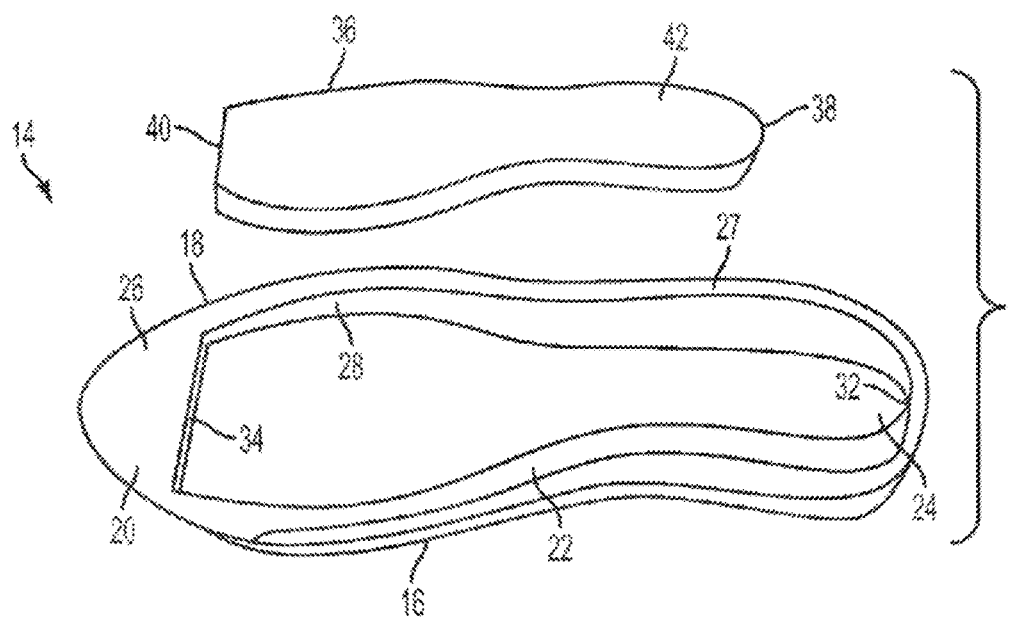
FIG. 2 is an exploded view of the sole component of the article of footwear of FIG. 1.

As can be seen in FIG. 2, sole component 14 consists of a first portion 26 having an upper surface 27 with a recess 28 formed therein. Upper surface 27 is secured to upper 12 with adhesive or other suitable fastening means. A plurality of substantially horizontal ribs 30 is formed on the exterior of first portion 26. In certain aspects, ribs 30 extend from a central portion of forefoot portion 20 on medial side 16 rearwardly along first portion 26, around heel portion 24 and forwardly on lateral side 18 of first portion 26 to a central portion of forefoot portion 20.

First portion 26 provides the external traction surface of sole component 14. In certain aspects it is to be appreciated that a separate outsole component could be secured to the lower surface of first portion 26. When a separate outsole component is secured to the lower surface of first portion 26, the first portion 26 is a midsole component. In some aspects, the article is a midsole component for an article of footwear. In other aspects, the article is a combination midsole-outsole component for an article of footwear.

The article can be an insert. An insert 36 can be received in recess 28. As illustrated in FIG. 2, insert 36 can provide cushioning or resiliency in the sole component. First portion 26 can provide structure and support for insert 36. In such aspects, first portion 26 can be formed of a material of higher specific gravity and/or hardness as compared to insert 36 such as, for example, non-foam materials including rubber and thermoplastic polyurethane, as well as foam materials. In certain aspects, insert 36 can be formed of a thermoplastic foam as disclosed herein.

Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means. For example, when there is an insert 36, a recess 28 can extend from heel portion 24 to forefoot portion 20. In certain aspects, the rear surface 32 of recess 28 is curved to substantially follow the contour of the rear of heel portion 24 and the front surface 34 of recess 28 extends transversely across first portion 26.

Figure 3:
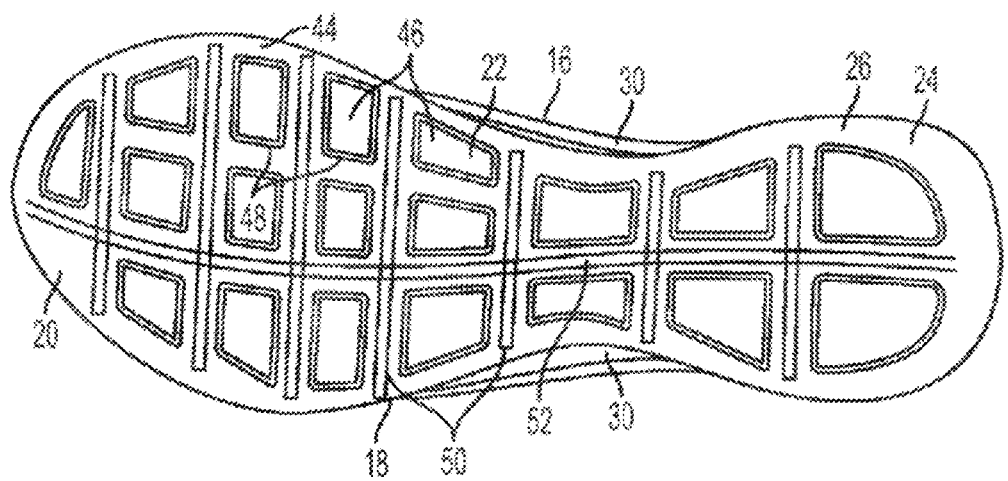
FIG. 3 is a plan view of the bottom of the sole component of the article of footwear of FIG. 1.

As seen best in FIG. 3, a ground engaging lower surface 44 of first portion 26 includes a plurality of projections 46. Each projection 46 is surrounded by a groove 48. A plurality of transverse slots 50 are formed in lower surface 44, extending between adjacent projections 46. A longitudinal slot 52 extends along lower surface 44 from heel portion 26 to forefoot portion 20.

Figure 4:
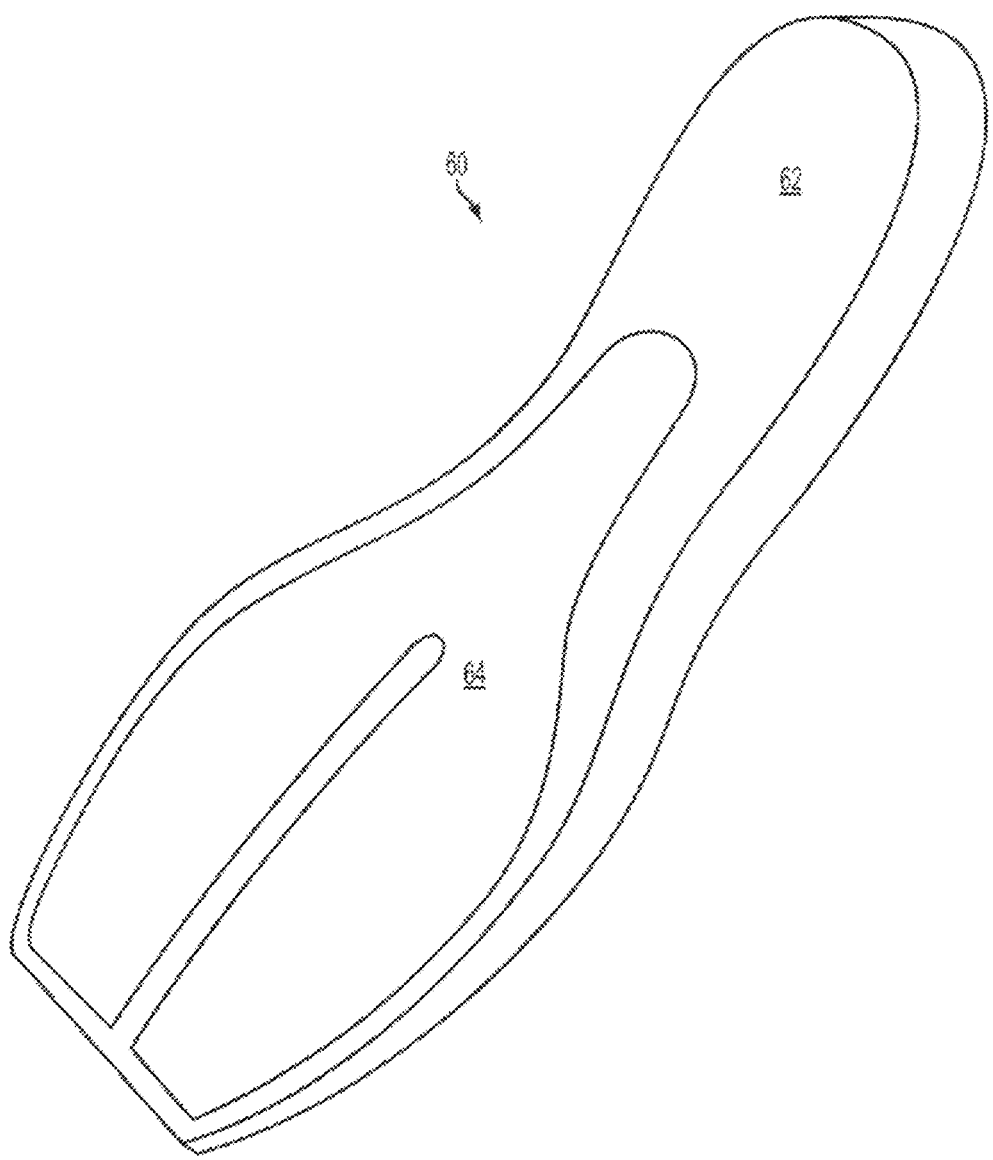
FIG. 4 is a bottom view of an insert for use in a sole component of an article of footwear.
Figure 5:
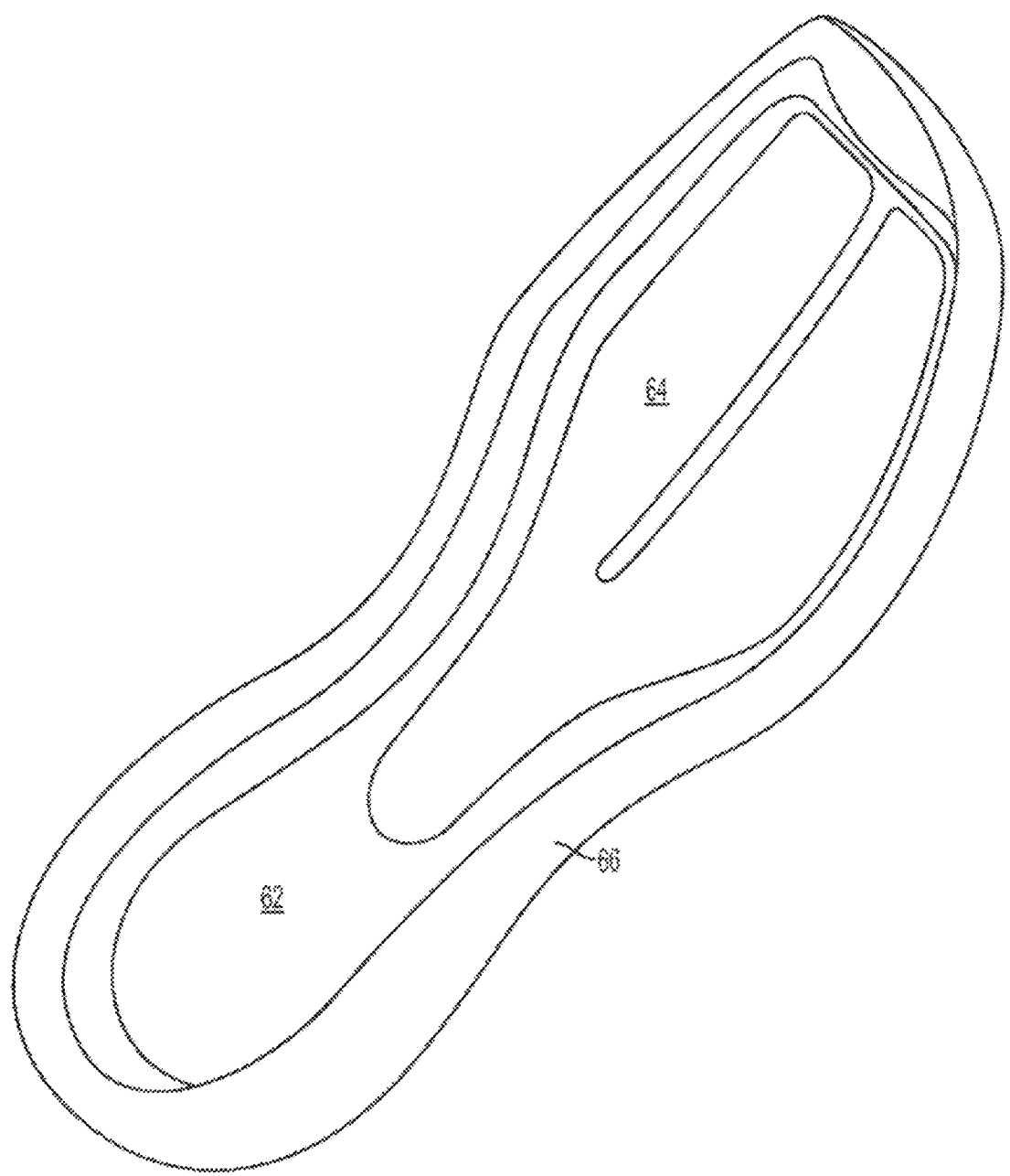
FIG. 5 is a top view of the insert of FIG. 4 inserted in a first portion to form a sole component.

FIGS. 4 and 5 show bottom and top views of an insert 60 which can be used in a sole component as described herein. Insert 60 is similar to insert 36, but as illustrated in FIGS. 4 and 5, insert 60 is formed of two types of materials 62 and 64, where at least one of the materials is a thermoplastic foam as disclosed herein. FIG. 4 shows a bottom view of insert 60, while FIG. 5 shows a top view of insert 60 formed of two types of materials 62 and 64, with the insert placed inside a first portion 66 to form a sole component 14. Inserts with more than two types of materials, at least one of which is a thermoplastic foam as disclosed herein, can also be used. In the example illustrated in FIGS. 4 and 5, a portion of a first material 62 can be used in the heel region of the insert, and a portion of a second material 64 can be used in the toe region of the insert. A higher specific gravity material can be used to support the heel region, while a lower specific gravity material can be used to support the toe region. For example, the specific gravity of the first material can be at least 0.02 units greater than the specific gravity of the second material. The shape of the portions of the two materials 62 and 64 of the insert can be any suitable shape. For example, the heel region can be in the shape of a wedge. Inserts formed of two types of materials can be useful in running shoes, as well as in basketball shoes.

Figure 7:
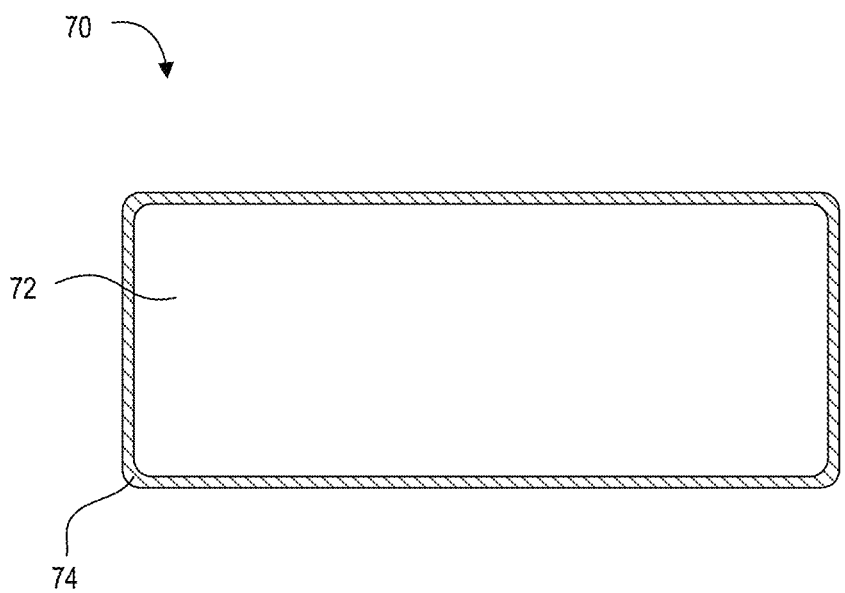
FIG. 7 shows a representative schematic illustrating a disclosed foam component or article with a second thermoplastic composition.

In the articles comprising the foam articles or components including the thermoplastic foam, for example a thermoplastic copolyester foam having an open cell structure, and the layer of a second thermoplastic composition disposed on at least a portion of an exterior surface of the foam as described herein. Referring to FIG. 7, in an aspect, a foam component 70 can have a foam portion 72, comprising a polymeric material that comprises a thermoplastic copolyester multicellular foam having an open-cell or closed-cell foam structure. The foam portion 72 has one or more sides that, when the foam component 70 is disposed in an article such as an article of footwear, are oriented toward an exterior facing side or surface of the article (e.g. an outer peripheral edge of article of footwear 10 of FIG. 1). A polymeric layer 74 is disposed on at least a portion of an exterior facing side or surface of the foam portion 72. The polymeric layer 74 comprises a second thermoplastic composition that may be the same as or different from the first thermoplastic composition of the foam portion 72. According to aspects, the polymeric layer 74 is not a foamed material. The polymeric layer 74 can function as an outsole, for example, which can provide improved abrasion resistance on one or more surfaces of the foam portion 72.

In some aspects, the article can be something other than a sole component. For example, the article can be an upper or an upper component. An upper component refers to a piece that is stitched or otherwise joined with one or more other pieces to form an upper portion for an article of footwear. The materials in the upper generally contribute to characteristics such as breathability, conformability, weight, and suppleness or softness. A lower component refers to a piece that is joined with one or more other pieces to form the lower portion of an article of footwear. The lower can include, for example, the outsole and midsole. The choice of outsole materials and design will contribute, for instance, to the durability, traction, as well as to the pressure distribution during use. The midsole materials and design contribute to factors such as the cushioning and support. Grindery components include all of the additional components that can be attached to the upper, lower, or both. Grindery components can include, for example, eyelets, toe puffs, shanks, nails, laces, velcro, catches, backers, linings, padding, heel backings, heel foxings, toe caps, etc.

The upper can be a lasted upper. A "lasted upper," as used herein, refers to an upper that is formed into the shoe shape prior to attachment to the sole by one or more mechanical means. The lasted upper can include a heel counter formed to shape the heel of the upper. The lasted upper can include a strobel or a strobel board attached to the upper, typically via a strobel stitch.

While the thermoplastic foams described herein, including the thermoplastic copolyester foams described herein, can be used for making any of a variety of components, including a variety of components for an article of footwear, in particular aspects the components include a midsole, an outsole, an insole, or an insert. Additional articles can include a tongue padding, a collar padding, and a combination thereof. As described above and detailed more completely below, the articles comprising the thermoplastic foams described herein can exhibit a unique balance of beneficial physical properties such as high energy efficiency or energy return, and low specific gravity. Furthermore, the thermoplastic foam can also be reprocessed with minimal loss in physical properties (e.g., for recycling), providing a solution for materials sustainability.

In some instances a disclosed article can comprise a first component comprising a foamed thermoplastic composition, such as a foamed thermoplastic copolyester composition, and a second component comprising a second thermoplastic composition. An article comprising the first component with the second thermoplastic composition can be characterized by good bonding strength between the second thermoplastic composition and the foam component. The ply adhesion strength between the second thermoplastic composition and the foam component is greater than 2.5 kg force/centimeter or greater than 3.0 kg force/centimeter, when determined using the Ply Adhesion Test method described herein.

First Components

The first component is a foam component comprising a thermoplastic composition comprising one or more thermoplastic elastomers. In one aspect, the thermoplastic composition is a thermoplastic copolyester composition comprising one or more thermoplastic copolyester elastomers. The first component can be a component such as, but not limited to, a component of a midsole or a midsole component. It is understood that the first component comprises a foamed thermoplastic composition. For example, a thermoplastic composition includes at least 90 weight percent, or at least 95 weight percent, or at least 99 weight percent of thermoplastic polymers, such as, for example, the thermoplastic copolyester disclosed herein, based on the total weight of the thermoplastic composition. In some instances, the polymeric component of the thermoplastic composition, which includes all the polymers present in the thermoplastic composition, includes or consists essentially of one or more thermoplastic elastomers, such as one or more of the disclosed thermoplastic copolyester elastomers. In other words, the only polymers present in the thermoplastic composition can be thermoplastic elastomers, or the only polymers present in the thermoplastic composition can be thermoplastic copolyester elastomers.

Second Components

The second component comprising a second thermoplastic composition can be a component such as, but not limited to, a component of an outsole or an outsole component. It is understood that the second component can be foamed, partially foamed, or essentially unfoamed. In some instances the second component is a foamed component, i.e., a second foam component. In other instances, the second component is an unfoamed component, i.e., a solid component. In some instances, the second thermoplastic composition is a disclosed thermoplastic composition, such as a thermoplastic copolyester composition. For example, a second thermoplastic composition can include at least 90 weight percent, or at least 95 weight percent, or at least 99 weight percent of thermoplastic elastomers as disclosed herein, based on the total weight of the second thermoplastic composition. In some instances, the second thermoplastic composition includes a polymeric component consisting essentially of one or more disclosed thermoplastic elastomers, including one or more disclosed copolyester elastomers. In other instances, the second thermoplastic composition can include a polymeric component which is essentially free of a thermoplastic copolyester, e.g., the polymeric component can consist essentially of a thermoplastic polyurethane elastomer or a thermoplastic vulcanizate material as disclosed herein. In still other instances, a second thermoplastic composition can include a mixture of a disclosed thermoplastic copolyester and a polymeric material that is not a disclosed thermoplastic copolyester, e.g., a thermoplastic elastomer or thermoplastic vulcanizate material.

Characteristics of Thermoplastic Copolyester Foam Components.

As discussed herein above, a first component can be foam component, i.e., a first foam component, comprising a disclosed first thermoplastic composition. In some instances, a second component can be foam component, i.e., a second foam component, comprising a disclosed second thermoplastic composition. That is, each of the first or second foam components can independently comprise a disclosed thermoplastic foam component. It is understood herein throughout that reference to a "thermoplastic foam" is inclusive of a first foam component, a second component, or both a first and a second foam components, and that each of the first and second foam components can independently comprise one or more disclosed thermoplastic compositions as disclosed herein below. A disclosed thermoplastic foam can exhibit various beneficial properties.

For example, the thermoplastic foam can exhibit a beneficial split tear, for example a high split tear for a sole component in an article of footwear. In some aspects, the thermoplastic foam can have a split tear value of greater than about 1.5 kilogram/centimeter (kg/cm), or greater than about 2.0 kg/cm, or greater than about 25 kg/cm, when determined using the Split Tear Test Method described herein. In some aspects, the thermoplastic foam can have about 1.0 kg/cm to 4.5 kg/cm, about 1.5 kg/cm to 4.0 kg/cm, about 2.0 kg/cm to 4.0 kg/cm, about 2.0 kg/cm to 3.5 kg/cm, or about 2.5 kg/cm to 3.5 kg/cm, when determined using the Split Tear Test method described herein. In some aspects, the thermoplastic foam is injection molded, or is injection molded and subsequently compression molded in a separate compression mold having different dimensions than the mold used in the injection molding step. The thermoplastic foam can have a split tear of about 0.08 kg/cm to 4.0 kg/cm, about 0.9 kg/cm to 3.0 kg/cm, about 1.0 to 2.0 kg/cm, about 1.0 kg/cm to 1.5 kg/cm, or about 2 kg/cm. In some aspects, the thermoplastic foam the thermoplastic foam is injection molded, and has have a split tear of about 0.07 kg/cm to 2.0 kg/cm, or about 0.8 kg/cm to 1.5 kg/cm, or about 0.9 to 1.2 kg/cm, about 1.5 kg/cm to 2.2 kg/cm.

The specific gravity of a disclosed thermoplastic foam is also an important physical property to consider when using a foam for in an article of footwear or athletic equipment. As discussed above, the thermoplastic foam of the present disclosure exhibits a low specific gravity, which beneficially reduces the weight of midsoles or other components containing the thermoplastic foam. The thermoplastic foams of the present disclosure can have a specific gravity of from 0.02 to 0.22, or of from 0.03 to 0.12, or of from 0.04 to 0.10, or from 0.11 to 0.12, or from 0.10 to 0.12, from 0.15 to 0.2; 0.15 to 0.30, when determined using the Specific Gravity Test Method described herein. Alternatively or in addition, the thermoplastic foam can have a specific gravity of from 0.01 to 0.10, or of from 0.02 to 0.08, or of from 0.03 to 0.06; 0.08 to 0.15; or from 0.10 to 0.12, when determined using the Specific Gravity Test Method described herein. For example, the specific gravity of the thermoplastic foam can be from or from 0.15 to 0.20, or can be from 0.10 to 0.12. The thermoplastic foam can be injection molded, or can be injection molded and subsequently compression molded. In some aspects, the thermoplastic foam has a specific gravity of about 0.7 or less, or 0.5 or less, or 0.4 or less, or 0.3 or less, when determined using the Specific Gravity Test Method described herein. In some aspects, the thermoplastic foam, including thermoplastic foam present in midsoles and midsole components, can have a specific gravity of about 0.05 to 0.25, about 0.05 to 0.2, about 0.05 to 0.15, about 0.08 to 0.15, about 0.08 to 0.20, about 0.08 to 0.25, or about 0.1 to 0.15, when determined using the Specific Gravity Test Method described herein. In some aspects the thermoplastic foam has a specific gravity of about 0.15 to 0.3, about 0.2 to 0.35, or about 0.15 to 0.25, when determined using the Specific Gravity Test Method described herein.

In a particular example, the first component is a cushioning element for an article of footwear, and the thermoplastic foam of the first component has a specific gravity from 0.05 to 0.25, or from 0.17 to 0.22, or from 0.18 to 0.20, when determined using the Specific Gravity Test Method described herein. The thermoplastic foam can be a physically foamed thermoplastic foam, such as physically foamed thermoplastic foam formed using a single-phase solution of a supercritical fluid and a thermoplastic composition described herein. The thermoplastic composition can be a thermoplastic copolyester composition comprising one or more thermoplastic copolyester elastomer.

The thermoplastic foam portion of the article or component of an article can have a stiffness of about 200 kPa to about 1000 kPa, or about 300 to about 900 kPa or about 400 to about 800 kPa or about 500 to about 700 kPa, when determined using the Cyclic Compression Test with the 45-millimeter diameter cylindrical sample. The thermoplastic foam portion of the article or component of an article can have a stiffness of about 200 kPa to about 1000 kPa, or about 300 to about 900 kPa or about 400 to about 800 kPa or about 500 to about 700 kPa, when determined using the Cyclic Compression Test with the footform sample. The thermoplastic foam article or article component can be formed by injection molding, or by injection molding and subsequently compression molding.

The thermoplastic foam portion of the article or component of an article can have an Asker C durometer hardness of from about 30 to about 50, or from about 35 to about 45, or from about 30 to about 45, or from about 30 to about 40, when determined using the Durometer Hardness Test described herein The energy input of a foam is the integral of the force displacement curve during loading of the foam during the Cyclic Compression test. The energy return of a foam is the integral of the force displacement curve during unloading of the foam during the Cyclic Compression test. The thermoplastic foam portion of the article or component of an article can have an energy return of about 200 millijoules (mJ) to about 1200 mJ, or from about 400 mJ to about 1000 mJ, or from about 600 mJ to about 800 mJ, when determined using the Cyclic Compression Test with a 45-millimeter diameter cylindrical sample.

The energy efficiency, a measure of the percentage of energy the thermoplastic foam portion of the article or component returns when it is released after being compressed under load, can provide improved performance for athletic shoes, e.g. for reducing energy loss or dissipation when running. This is especially true for running and other athletic shoes. In some aspects, the thermoplastic foam portion of the articles and components provided herein have an energy efficiency of about 50 percent to 97 percent, about 60 percent to 95 percent, about 60 percent to 90 percent, about 60 percent to 85 percent, about 65 percent to 85 percent, or about 70 percent to 85 percent, when determined using the Cyclic Compression Test with a 45-millimeter diameter cylindrical sample.

By modifying the conditions and components used to make the foams one or more properties of the foam can be modified. In one aspect, when the foam is the physically foamed product of a single-phase solution of a supercritical fluid and the first thermoplastic composition in a molten state, the resulting foam can have a reduced specific gravity as well as high energy efficiency or energy return. In one aspect, additives such as nucleating agents and fillers are not used or are used at low levels, as it has been found that the use of non-polymeric ingredients can decrease the consistency of the size of the cells in the multicellular foam, particularly when foaming thermoplastic copolyester compositions. Additionally, the inclusion of higher levels of non-polymeric additives such as fillers, nucleating agents and pigments, can make recycling the foams more challenging.

In other aspects, the temperature at which the molten first thermoplastic composition is foamed can modify the properties of the foam. In one aspect, the foaming temperature of the thermoplastic composition, i.e., the temperature of the thermoplastic composition at the point that foaming is initiated, is from about the melting temperature of the thermoplastic composition to about 50 degrees centigrade, or about 40 degrees centigrade, or about 30 degrees centigrade, or about 20 degrees centigrade above the tail temperature of the thermoplastic composition.

Alternatively, the foaming temperature can be from the crystallization temperature of the thermoplastic composition to about 50 degrees centigrade, or about 40 degrees centigrade, or about 30 degrees centigrade, or about 20 degrees centigrade above the crystallization temperature of the thermoplastic composition. The melting temperature, the tail temperature, and the crystallization temperature of the thermoplastic composition can be determined using differential scanning calorimetry (DSC). In this aspect, properties such as reduced specific gravity, consistent foam cell size, and/or high energy efficiency or energy return can be achieved, particularly when foaming thermoplastic copolyester compositions.

The resulting foams can have a multicellular closed cell or open cell foam structure. Cells are the hollow structures formed during the foaming process, in which bubbles are formed in the polymeric material by the blowing agents. The cell walls are generally defined by the polymeric material. The cells can be entirely enclosed by the polymeric material, or they can be at least partially open, e.g., interconnected with one or more adjacent cells. "Closed cell" structures refer to structures in which at least 60 percent or more of the cells are closed cells, or at least 80 percent of the cells are closed cells, or at least 90 percent of the cells are closed cells, or at least 95 percent of the cells are closed cells. As described herein "open cell" structures refers to foam structures in which less than about 15 percent or less than about 10 percent or 5 percent or less than 4 percent, or less than 3 percent or less than 1 percent of the cells are closed cells.

The disclosed thermoplastic foams may have an average cell diameter of from about 50 micrometers to about 1000 micrometers, or from about 80 micrometers to about 800 micrometers, or from about 100 micrometers to about 500 micrometers. The disclosed thermoplastic foams can have an average cell diameter of from about 50 micrometers to about 500 micrometers, or from about 70 micrometers to about 300 micrometers, or from about 80 micrometers to about 200 micrometers, or from about 50 micrometers to about 200 micrometers.

The proportion of cells in the foam having an average cell diameter of about 50 micrometers to about 300 micrometers is preferably not less than 40 percent relative to all the cells, or not less than 50 percent or not less than 60 percent relative to all the cells. If the proportion of cells is less than 40 percent, the cell structure will tend to be nonuniform and/or have a coarse cell structure. As used herein, a "coarse cell structure" refers to a foam structure in which the average cell diameter is greater than 1 millimeter, and/or for greater than 20 percent of the cells, a 1 millimeter line drawn across the largest dimension of the cell, will not cross a cell wall or a strut (i.e., an open cell wall or portion thereof).

The number of open cells and/or closed cells and cell diameter of the cells of the foam can be determined visually, for example by capturing an image of a cut surface with a camera or digital microscope, determining the number of cells, number of open cells and/or number of closed cells, and determining the average cell diameters of a cross-section of a sample of the foam. For cells of a closed cell foam, the diameters are determined from cell wall to cell wall. For cells of an open cell foam, the diameters are determined between planes formed by the intersections of supporting struts between cells (i.e., an open cell wall or portion thereof). In one aspect, a portion of the foam can be cut and the cells in the cross-sectional area can be examined visually under a microscope or by software to determine the percentage of the cells within a region which are open or closed and to determine the average size of the cells. In one aspect, a sample from a region of the foam article which represents from about 75 percent to about 100 percent of the maximum thickness of the foam article can be used to determine the nature and size of the cells.

Methods of Manufacturing Disclosed Foams.

In some examples, the disclosed foams can be prepared by various methods as disclosed herein and as known in the art. That is, disclosed articles or components of articles such as midsoles, midsole components, inserts and insert components can be prepared by injection molding a melt composition comprising a first thermoplastic composition as described herein using a physical blowing agent and/or chemical blowing agent. A disclosed foam component, e.g., a disclosed first foam component or a disclosed foam second foam component, can be prepared by the methods disclosed herein below.

Disclosed herein are methods for making a foam article or component, the method comprising: forming a mixture of molten first thermoplastic composition and a blowing agent, wherein the first thermoplastic composition comprises a disclosed thermoplastic elastomer; injecting the mixture into a mold cavity; foaming the molten first thermoplastic composition, thereby forming a foamed molten first thermoplastic composition; solidifying the foamed molten first thermoplastic composition, thereby forming a foam article having a multicellular foam structure; and removing the foam article from the mold cavity. In one aspect, the first thermoplastic composition is a first thermoplastic copolyester composition comprising a disclosed thermoplastic copolyester elastomer, and the multicellular foam structure is an open cell multicellular foam structure.

Also disclosed are methods for making a foam article or component, the method comprising: forming a mixture of molten first thermoplastic composition and a blowing agent, wherein the first thermoplastic composition comprises a disclosed thermoplastic elastomer; injecting the mixture into a mold cavity; foaming the molten first thermoplastic composition, thereby forming a foamed molten first thermoplastic composition; solidifying the foamed molten first thermoplastic composition, thereby forming a foam article having a multicellular foam structure; and removing the foam article from the mold cavity; wherein, during the injecting, the mixture has an injection temperature; and wherein the injection temperature is from about the melting temperature of the thermoplastic elastomer to about 50 degrees centigrade above the tail temperature of the thermoplastic composition. In one aspect, the first thermoplastic composition is a first thermoplastic copolyester composition comprising a disclosed thermoplastic copolyester elastomer, and the multicellular foam structure is an open cell multicellular foam structure.

Also disclosed are methods for making a foam article or component, the method comprising: forming a mixture of molten first thermoplastic composition and a blowing agent, wherein the first thermoplastic composition comprises a disclosed thermoplastic elastomer; injecting the mixture into a mold cavity; foaming the molten first thermoplastic composition, thereby forming a foamed molten first thermoplastic composition; solidifying the foamed molten first thermoplastic composition, thereby forming a foam article having a multicellular foam structure; and removing the foam article from the mold cavity; wherein the foaming occurs at a foaming temperature; and wherein the foaming temperature is from about the melting temperature of the thermoplastic elastomer to about 50 degrees centigrade above the tail temperature of the thermoplastic elastomer. In one aspect, the first thermoplastic composition is a first thermoplastic copolyester composition comprising a disclosed thermoplastic copolyester elastomer, and the multicellular foam structure is an open cell multicellular foam structure.

Figure 8:
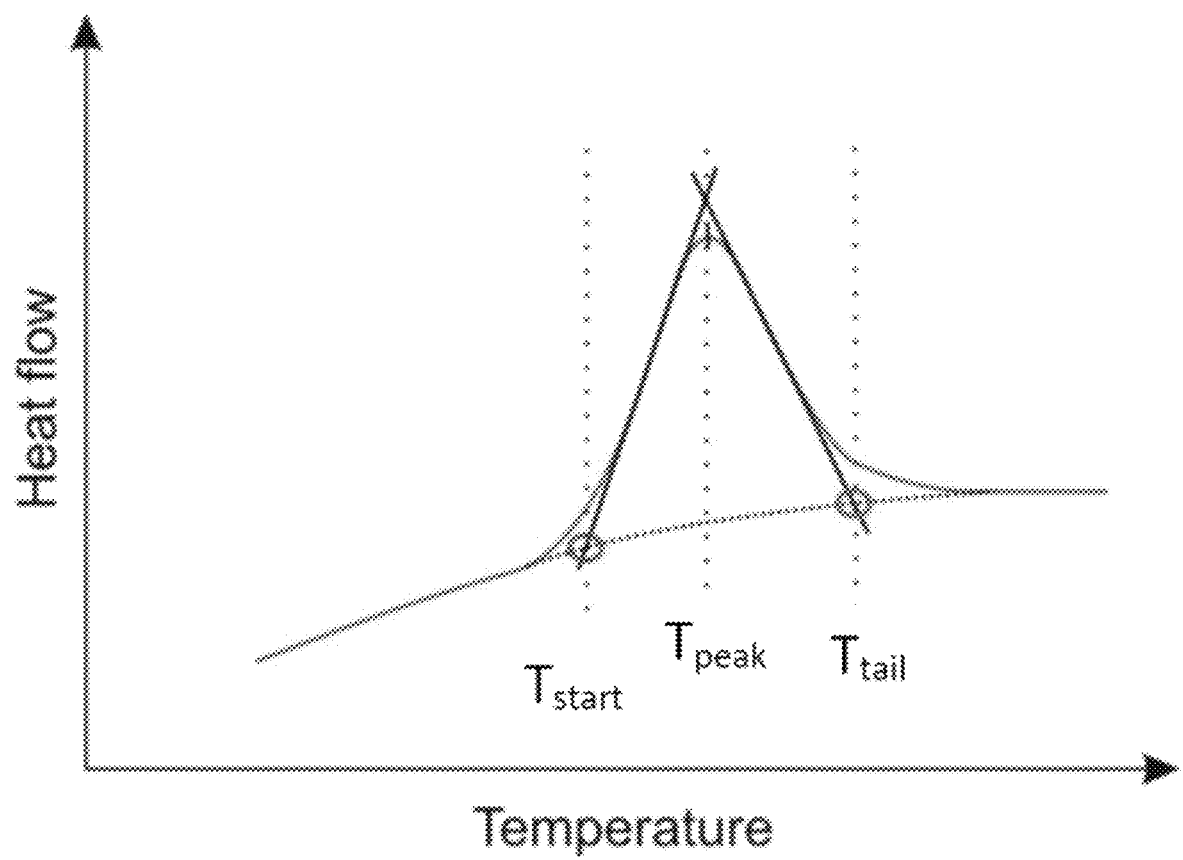
FIG. 8 shows a representative schematic illustrating a disclosed method for determining peak and tail temperatures.
Figure 9A:
FIGS. 9A-9D show representative images of cross-sectional views of foam plaques prepared using a disclosed thermoplastic copolyester elastomer at different temperatures. Each image shows a scalar bar (500 micrometers). Foamed plaques were prepared at the following temperatures: 175 degrees centigrade (FIG. 9A); 190 degrees centigrade (FIG. 9B); 205 degrees centigrade (FIG. 9C); and 245 degrees centigrade (FIG. 9D).
Figure 9B:
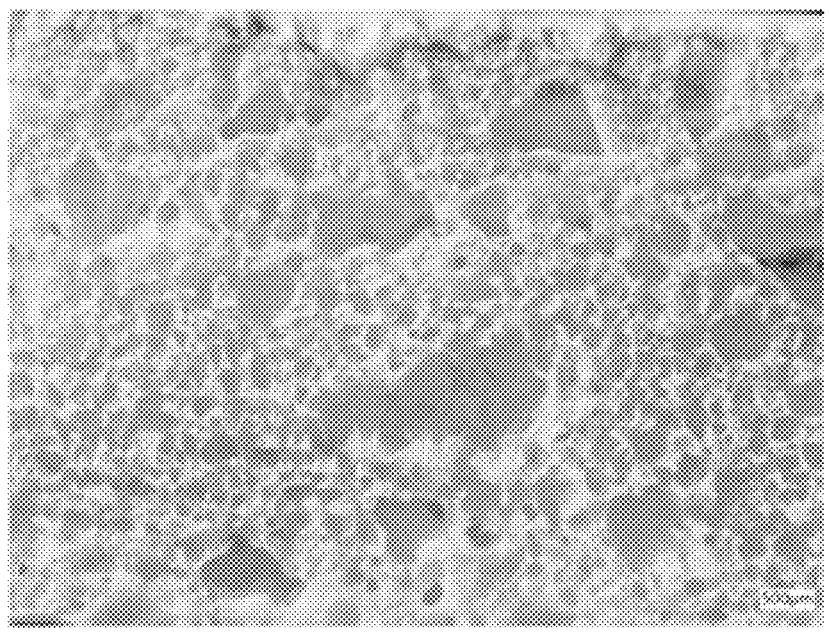
Figure 9C:
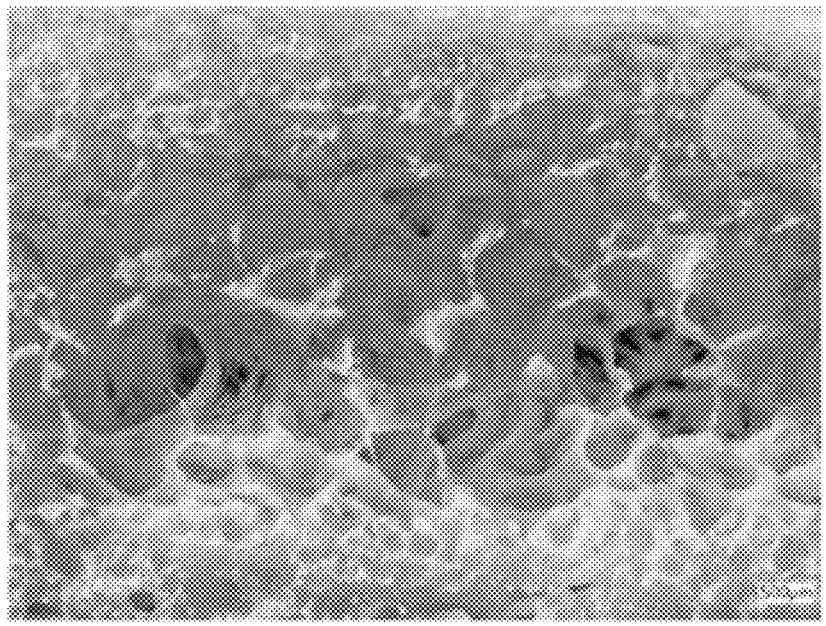
Figure 9D:
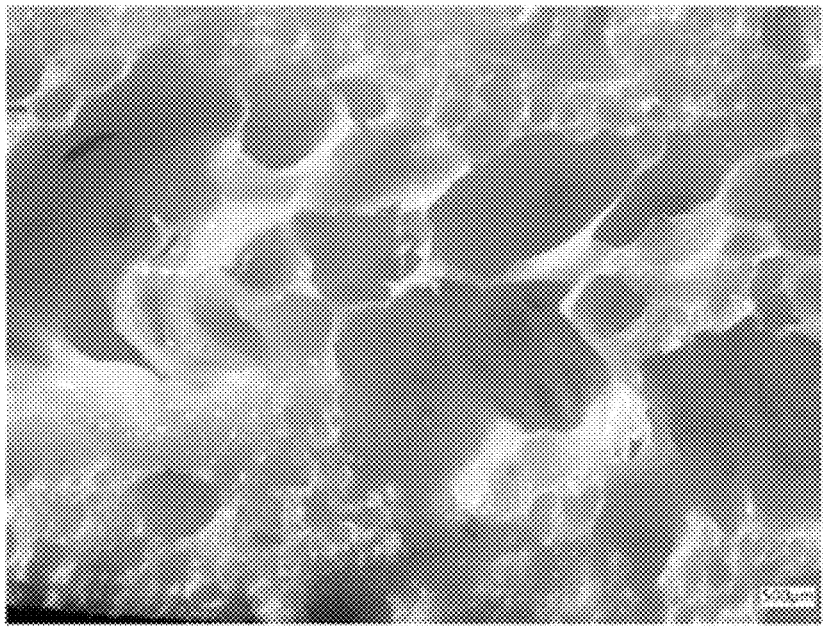

Dynamic scanning calorimetry (DSC) is used to determine the melting temperature, the tail temperature, and the crystallization temperature of a thermoplastic elastomer, and an exemplary method is described herein below. Briefly, 10-30 mg pieces of undried resin pellets are cycled from −90 degrees centigrade to 225 degrees centigrade at 20 degrees centigrade/min and cooled to −90° C. at 10° C./min. In some instances, experiments are run using a heat-cool-heat profile with a ramp rate of 10 degrees centigrade per min, minimum temperature of 0 degrees centigrade and maximum temperature of 250 degrees centigrade. Analyses should be determined in duplicate and averaged. The melting temperature and crystallization temperature values are recorded. The melt "peak" is and the crystallization "peak" are identified as the local maximum of the melting or crystallization. If there is more than one peak in the DSC curve, the peak occurring at hotter temperatures is chosen as the temperature reference. The tail is identified as the intersection of the tangent of the line of the higher temperature side of the peak with the extrapolated baseline. A schematic illustrating the method for determining melting peak and tail temperatures is shown in FIG. 8.

For example, the disclosed foamed first thermoplastic compositions can be prepared using a suitable extruder. An extruder (e.g., single or twin screw) can be used to provide a composition. The extruder can have a motor to turn a screw inside the extruder. Extruder may be a single screw or twin screws made of individual elements of various sizes and pitches appropriate for mixing or kneading the specific materials used. In some examples, the extruder has a twin screw.

The various components that make up the first thermoplastic composition used to form the thermoplastic foam of the various examples described herein are added into the extruder through one or more port. The various components can be added as a melt or as appropriately-sized solid particles, for example chips or pellets, that are melted in section as they are mixed in the barrel of the extruder. The contents of the extruder can be heated to melt the composition. A supercritical fluid can be added into the melt as a physical blowing agent. In particular examples, the thermoplastic foam is prepared by using a physical blowing agent which foams the thermoplastic composition after the pressure is dropped to a level at which the supercritical fluid phase transitions into a gas, such as after it exits the extruder, and the thermoplastic foam is thus substantially free of a chemical blowing agent or decomposition product thereof.

The compositions can be added as a melt at a temperature close to the melting temperature of the first thermoplastic composition.

If a chemical blowing agent is used, the processing temperature within the extruder used can be sufficiently below the temperature that would trigger the blowing agent. In order to foam the first thermoplastic composition, the temperature near the exit of the extruder or within the barrel of the injector can be increased in order to heat the thermoplastic composition to a temperature close to or at the triggering temperature of a chemical blowing agent, thereby producing a chemically foamed thermoplastic foam as the composition exits the extruder (e.g., as the composition is injected into an injection mold).

Alternatively or in addition, a physical blowing agent can be used to foam the composition to form a physically foamed thermoplastic foam, or a physically and chemically foamed thermoplastic foam. For example, a supercritical fluid such as supercritical carbon dioxide or supercritical nitrogen can be mixed with the molten first thermoplastic composition in the barrel of the extruder to form a single-phase solution. As used herein, "single-phase" refers to a composition where two or more components are present where there is no discernible phase separation amongst the components. For example, when a supercritical fluid is mixed with molten first thermoplastic composition, the resulting composition is a homogeneous solution where droplets of supercritical fluid are not detected. As the single-phase solution exits the extruder or the injector, the pressure drop between the higher pressure in the extruder or injector and the lower pressure outside the extruder or injector causes the supercritical fluid to transition to the gas phase and foam the first thermoplastic composition.

Various examples include methods of manufacturing an article of footwear or components for an article of footwear. In some examples, the methods of manufacturing an article of footwear include injection molding a first thermoplastic composition to form a thermoplastic foam described herein to produce a foam article or component of an article, such as an article of footwear. The article or component of an article can be a midsole or a component of a midsole, and the method can include providing an upper and an outsole for an article of footwear; and combining the midsole or midsole component, the upper, and the outsole to make an article of footwear. In some examples, the method of manufacturing the article of footwear includes combining an article comprising a thermoplastic foam and an upper to make an article of footwear.

The articles or components of articles such as midsoles, midsole components, inserts and insert components can be prepared by injection molding a molten first thermoplastic composition described herein using a physical blowing agent. The injection molding can use a screw-type injector that allows for maintaining and controlling the pressure in the injector barrel. The injection molding machine can allow metering and delivering a supercritical fluid such as supercritical carbon dioxide or nitrogen into the composition prior to injection. The supercritical fluid can be mixed into the first thermoplastic composition within the injection barrel to form a single-phase solution, and then the single-phase solution can be injected into the mold cavity. A drop in pressure within the mold cavity can cause the supercritical fluid to expand to create cell nuclei and expand the cells to form the foam within the mold cavity. The injection molding system used to form the thermoplastic foam can include a physical foaming process, such as, for example the "MUCELL" process (Trexel, Wilmington, DE, USA).

The thermoplastic r foams described herein can be made using a process that involves impregnating a first thermoplastic composition (e.g., at or above a softening temperature of the composition) with a physical blowing agent at a first concentration or first pressure. As used herein, the term "impregnating" generally means dissolving or suspending a physical blowing agent in a first thermoplastic composition. The impregnated first thermoplastic composition can then be foamed, or can be cooled (when applicable) and re-softened (when applicable) for foaming at a later time. In particular examples, the impregnated first thermoplastic composition is a single-phase solution comprising supercritical carbon dioxide or nitrogen and the molten thermoplastic composition.

The impregnated first thermoplastic composition is foamed by reducing the solubility of the physical blowing agent in the single-phase solution through pressure or temperature changes. The reduction in solubility of the physical blowing agent can release additional amounts (e.g., to create a secondary expansion of an originally-formed foam) of the impregnated physical blowing agent from the first thermoplastic composition, to further foam the first thermoplastic composition, forming a thermoplastic foam having a multicellular foam structure.

In addition to injection molding, the thermoplastic foam of the present disclosure can be foamed and molded using various processes known in the art. For example, the thermoplastic foam can be formed into slab foam, filament or strand foams, particulate (e.g., bead) foams of various shapes and sizes, etc. These various forms of foam can then be used in different ways. For example, like injection molded foam, slab foam and filament or strand foam can be used directly as a finished foam article, or can be shaped (e.g., cut, buffed, or trimmed) to form a finished foam article, or can be compression molded to form a finished foam article. Optionally, the thermoplastic foam can be subjected to annealing processes as part of forming the finished foam article. Pellets of the compositions can be used to form individual particulate thermoplastic foams, or can be foamed and molded to form unitary molded foam articles composed of individual portions of foam affixed to each other.

The thermoplastic foams of the various examples described herein may be further shaped or molded by any of the methods known for forming articles from thermoplastic materials. Optionally, the thermoplastic foams of the present disclosure which have been foamed using any suitable foaming process (e.g., foaming using a physical and/or chemical blowing agent), including by injection molding using only a physical blowing agent, can then be compression molded to form a compression molded foam.

The thermoplastic foam of the present disclosure can be prepared by a process comprising (i) softening a first thermoplastic composition (e.g., by heating at a first temperature at or above a softening temperature of the composition); (ii) simultaneously or sequentially with the softening (when applicable), contacting the first thermoplastic composition with a first concentration or first pressure of a physical blowing agent sufficient to drive an amount of the physical blowing agent into the first thermoplastic composition or combine the physical blowing agent with the first thermoplastic composition; (iii) changing the concentration or pressure (e.g., decreasing the pressure or concentration) of the physical blowing agent to a second concentration or second pressure that is effective to foam the first thermoplastic composition, thereby forming a thermoplastic foam (e.g., a thermoplastic foam having a multicellular structure); and, (iv) following the changing, cooling (when applicable) the thermoplastic foam to (e.g., cooling to a temperature below the softening temperature of the composition), to form a solidified thermoplastic foam.

The thermoplastic foam of the present disclosure can be prepared by (i) contacting (e.g., dissolving or suspending) the first thermoplastic composition with a first concentration of a chemical blowing agent, in some examples, at or above a softening temperature of the first thermoplastic composition (ii) triggering the chemical blowing agent to foam the first thermoplastic composition, thereby forming a thermoplastic foam (e.g., a thermoplastic foam having a multicellular structure); and, (iii) following the triggering, in some examples, cooling the thermoplastic foam to, e.g., a temperature below its softening temperature, to form a solidified thermoplastic foam. In some examples, the "triggering" of the chemical blowing agent is performed by any suitable method, including heating the composition comprising a concentration of the chemical blowing agent to a temperature sufficient to "trigger" the chemical blowing agent, wherein the concentration of the chemical blowing agent is effective to foam the first thermoplastic composition, thereby forming a thermoplastic foam (e.g., a thermoplastic foam having a multicellular structure). In some examples, the contacting comprises contacting at a pressure of from about 10 MPa to about 100 MPa (e.g., from about 30 MPa to about 100 MPa, about 20 MPa to about 80 MPa, about 30 MPa to about 60 MPa or about 40 MPa to about 70 MPa).

Chemical blowing agents may be endothermic or exothermic, which refers to a type of decomposition they undergo to produce the gas for foaming. The decomposition may be a result of inputting thermal energy into the system. Endothermic blowing agents absorb energy and typically release a gas, such as carbon dioxide, upon decomposition. Exothermic blowing agents release energy and generate a gas, such as nitrogen, when decomposed. Regardless of the chemical blowing agent used, thermal variables of the first thermoplastic composition being molded and thermal variables of the blowing agent to be decomposed are coupled together such that process parameters are selected so that the first thermoplastic composition can be molded and the blowing agent can decompose at an appropriate phase of the molding operation.

The disclosed foamed first thermoplastic compositions and articles can be prepared by using all or some of the elements of conventional injection molding systems such as those disclosed in U.S. Patent Appl. No. 62/734,912, which is incorporated herein by reference. Briefly, the system provides for decreased pressure losses across the system as well as to control (e.g., deliberately increase or decrease) the elongation, apparent shear, and/or zero shear viscosities of the molten first thermoplastic composition that is flowed into the mold. The method can include flowing a molten first thermoplastic composition into a shot tuning chamber from an upstream device and adjusting a temperature, a pressure, or both, within the shot tuning chamber to create a tuned molten first thermoplastic composition. The method additionally includes flowing the tuned molten first thermoplastic composition into a mold cavity from the shot tuning chamber. It will be appreciated that fine-tuning the temperature of and/or pressure applied to the molten first thermoplastic composition enables the system to have a desired impact on the physical and mechanical properties of the molded article. In particular, the temperature of the molten first thermoplastic composition may be controlled to achieve a desired range of shear/extensional viscosities, which reduces (e.g., substantially eliminates) uncontrolled bubble growth and/or nucleation. In one example, the method may also include adjusting (e.g., increasing and/or decreasing) a pressure in the mold cavity via a gas counter pressure (GCP) assembly prior to or while the molten first thermoplastic composition is flowed from the shot tuning chamber or directly from the injector into the mold cavity. In such an example, the molten first thermoplastic composition may be flowed into the mold cavity at pressures well above ambient pressure. Furthermore, GCP may be introduced into the mold cavity to control nucleation and bubble growth during polymer foaming as well as increase surface quality of the molded article. Nucleation and bubble growth control can enhance cell density uniformity, consistency of cell diameters, and mechanical properties of the thermoplastic foam. In some examples, the improvement in cell density homogeneity or consistency of cell diameters may be particularly beneficial in thermoplastic foams having low specific gravities such less than or equal to 0.3 and/or in foam components having large dimensions such as articles having a thickness that is 1.0 cm, for instance.

The system can include a shot tuning chamber configured to receive a molten first thermoplastic composition from an upstream device. The shot tuning chamber is also configured to adjust one or more of a temperature of and a pressure applied to the molten first thermoplastic composition to create an adjusted molten first thermoplastic composition and to dispense the adjusted molten first thermoplastic composition. In this way, the system can selectively adjust tuning chamber temperature and/or pressure to achieve desired properties, as previously mentioned. In one example, the system may further include an adjustable mold runner configured to regulate fluidic communication between the shot tuning chamber and a mold cavity in a mold.

In another example, the system can comprise a GCP assembly coupled to the mold cavity and configured to regulate an amount of counter pressure gas flow into and out of the mold cavity. Providing GCP adjustment allows for tuning of the first thermoplastic composition as it enters and cools in the mold.

Alternatively, the disclosed foams and articles can be prepared using methods and systems as described in International Patent Appl. No. PCT/US2018/035128. Briefly, the method can comprise a method for molding a single-phase solution comprised of a thermoplastic composition and a supercritical fluid. The single-phase solution is maintained under pressure during the molding operation to prevent a cellular structure from being formed by the supercritical fluid in the single-phase composition coming out of solution. The mold cavity in which the single-phase solution is introduced for molding purposes is pressurized to a mold pressure that is sufficient to maintain the single-phase solution as a single-phase solution as the mold cavity is filled. Subsequent to filling the mold cavity with the single-phase solution under pressure, the single-phase solution may solidify, entrapping the supercritical fluid. Alternatively, before being solidified, the single-phase solution may be exposed to a reduction in pressure causing the entrapped supercritical fluid to phase transition to a gas and expand the softened thermoplastic composition to form a multicellular structure before the thermoplastic composition is solidified into a solidified multicellular foam.

The method can include forming the single-phase solution, such as through introduction of a supercritical fluid with a first thermoplastic composition that is melted, e.g., at a temperature of from about the melting temperature of the thermoplastic elastomer of the thermoplastic composition up to about 50 degrees centigrade above the melting tail temperature of the thermoplastic elastomer as described herein, in an injection molding apparatus's barrel (e.g., screw) that is effective to mix the supercritical fluid and the molten thermoplastic composition, forming a single-phase solution while under pressure. The method continues with pressurizing a mold cavity of a mold above atmospheric pressure to a mold pressure. Atmospheric pressure is a pressure of the environment in which the mold cavity is exposed (e.g., general environment pressure). The mold pressure is at least a pressure to maintain the single-phase solution as a single single-phase. The method further includes injecting the single-phase solution into the pressurized mold cavity. The method also includes maintaining at least the mold pressure in the mold cavity during the injecting of the single-phase solution. As a result, the pressure in the mold cavity prevents the supercritical fluid from phase-transitioning to a gas and from coming out of solution to form a two-phase mixture (e.g., foaming) upon exit from the injection molding apparatus. As the pressure is maintained, premature foaming as the thermoplastic composition is injected from the injection molding apparatus is avoided to allow a decoupling of process parameters associated with the blowing agent and the thermoplastic composition.

A molding system can be utilized to prepare the disclosed foams that includes a device configured to receive a first thermoplastic composition and heat the first thermoplastic composition to form a molten first thermoplastic composition or a single-phase solution. The molding system optionally can include a shot tuning chamber configured to receive the molten first thermoplastic composition or the single-phase solution from the device and adjust a temperature of or a pressure applied to the molten first thermoplastic composition or the single-phase solution. The molding system optionally can also include an adjustable mold runner configured to regulate the flow of the molten first thermoplastic composition or the single-phase solution between the shot tuning chamber and a mold cavity. In one example, the device may be an injection device or an extrusion device. The molding system allows the characteristics of the first thermoplastic composition or the single-phase solution to be adapted to achieve desired end-use goals, such as, for example, to achieve a desired injection temperature or a desired foaming temperature or to achieve both.

In some aspects, the present disclosure is directed to a compression molded thermoplastic foam, and to a method of forming compression molded thermoplastic foam for, among other applications, articles of footwear or athletic equipment. In some examples, the method can be a process comprising providing (e.g., preparing) a thermoplastic foam preform and then compression molding the thermoplastic foam preform to form a compression molded thermoplastic foam. For example, the thermoplastic foam can be compression molded by placing the thermoplastic foam preform in a compression mold having a height less than the initial height of the thermoplastic foam preform and closing the mold, thereby compressing the thermoplastic foam preform to the height of the mold. Simultaneously or sequentially with the compressing, the thermoplastic foam preform can be heated in the closed compression mold. During the compression molding, the temperature of at least a portion of the thermoplastic foam preform in the closed mold can be raised to a temperature within ±30 degrees centigrade of the softening temperature of the composition. The temperature can be raised by heating the closed mold. Following the raising of the temperature, while the thermoplastic foam preform remains closed in the compression mold, the temperature of at least a portion of the thermoplastic foam preform can be lowered. The temperature can be lowered by cooling the closed mold. The lowering can lower the temperature of at least a portion of the thermoplastic foam preform to a temperature at least 35 degrees centigrade below the softening temperature of the composition, thereby forming the compression molded thermoplastic foam. Following the cooling, the compression mold can be opened, and the compression molded thermoplastic foam can be removed from the compression mold.

Examples contemplated herein are directed to methods of manufacturing articles of footwear, apparel, or athletic equipment. For example, the method can comprise providing components such as midsoles and inserts of an article of footwear in accordance with the present disclosure, and combining the component with a footwear upper and an outsole to form the article of footwear.

The thermoplastic foam can be made using a process that involves impregnating a first thermoplastic composition (e.g., at or above a softening temperature of the composition) with a physical blowing agent at a first concentration or first pressure. The impregnated first thermoplastic composition can then be foamed, or can be cooled (when applicable) and re-softened (when applicable) for blowing at a later time. In some instances, the impregnated first thermoplastic composition is foamed by reducing the temperature or pressure, impacting the solubility of the physical blowing agent. The reduction in solubility of the physical blowing agent can release additional amounts of the impregnated physical blowing agent from the first thermoplastic composition to further blow the composition forming a thermoplastic foam (e.g., a thermoplastic foam having a multicellular structure).

The thermoplastic foam can have a closed skin. A closed skin can be formed by foaming and molding a thermoplastic copolyester foam in a closed mold. A closed skin can also be formed by compression molding a thermoplastic foam preform in a compression mold. However, care should be taken during the compression molding not to subject the thermoplastic foam preform to conditions such that more than a desired amount of the cell structures of the foam collapse. One way to avoid collapsing more than a desired amount of the cell structures is to control the temperature of the thermoplastic foam during the compression molding process, for example, by controlling the temperature of the mold. For example, during the compression molding step, the heating of the thermoplastic foam preform in the compression mold can be conducted for time of from 100 seconds to 1,000 seconds, or of from 150 seconds to 700 seconds.

Once the thermoplastic foam has been heated in the compression mold at the appropriate temperature for the desired length of time to soften the thermoplastic foam to the desired level, the softened preform is cooled, for example, to a temperature at least 35 degrees centigrade below its softening temperature, or at least 50 degrees centigrade below its softening temperature, or at least 80 degrees centigrade below its softening temperature, to re-solidify the softened foam, thereby forming the compression molded foam. Once cooled, the compression molded thermoplastic foam is removed from the compression mold. Following the heating, the cooling of the foam preform in the compression mold can be conducted for a time of from 50 to 1,000 seconds, or for a time of from 100 to 400 seconds.

The thermoplastic foam can be foamed using any one of the methods described above. The thermoplastic foam can be included in components of articles of footwear as described above, for example a midsole 146 as depicted in FIGS. 1A-1B.

Methods of Manufacturing Disclosed Articles.

Various examples include methods of manufacturing an article comprising a first component and a second component. As discussed herein above, the first component can be a foam component, e.g., a first foam component, and the second component can be a foam component, e.g., a second foam component. The first component can be, but is not limited to, a midsole or component of a midsole. The second component can be, but is not limited to, an outsole or an upper. It is understood that the second component can be foamed, partially foamed, or essentially unfoamed. In some instances, the second thermoplastic composition comprises one or more disclosed thermoplastic elastomers. For example, a second thermoplastic composition includes at least 90 weight percent, or at least 95 weight percent, or at least 99 weight percent of the thermoplastic elastomer disclosed herein, based on the total weight of the second thermoplastic composition. In some instances, the second thermoplastic composition includes a greater concentration of fillers, pigments or dyes as compared to the first thermoplastic composition of the first foam component. The disclosed methods of manufacturing an article comprising a first component and a second component may further comprise steps or adjustments as known to the skilled artisan.

In some aspects, the methods of manufacturing an article of footwear include injection molding a first thermoplastic composition to form a thermoplastic foam described herein to produce a foam article or component of an article, such as a cushioning element for an article of footwear. The methods can further comprise manufacturing an article or component of an article comprising providing a midsole or a component of a midsole, then providing an upper and/or an outsole or outsole component for an article of footwear; and followed by combining the midsole or midsole component with the upper and/or the outsole or outsole component to make an article of footwear. In some instances, the method of manufacturing the article of footwear includes combining an article comprising a thermoplastic foam, an upper, and an outsole to make an article of footwear. In various aspects, the upper and/or outsole can comprise the same or a different thermoplastic composition, a second thermoplastic composition, or combinations thereof. In some instances, the outsole used in the method can be foamed, partially foamed, or substantially unfoamed. It is understood that a midsole, midsole component, outsole, or outsole component can be foamed or partially foamed using the methods disclosed herein for the preparation of a foam article.

The various disclosed methods can include coupling a first component to a second component. In certain aspects, the disclosed methods comprise forming the first component and second component together. For example, the first thermoplastic composition for the first component, i.e., a disclosed thermoplastic composition, and the second thermoplastic composition can be added to a mold sequentially during an injection molding process to provide a unitary component having a first component, i.e., a foam portion comprising the first thermoplastic composition and a second component, e.g., a polymeric layer comprising the second thermoplastic composition. In this aspect, a mold can be provided having a first mold portion having a mold surface. The second thermoplastic composition can be added to the mold, so as to form a polymeric layer on at least a portion of the mold surface. The second thermoplastic composition can be added to the mold as a film or coating applied to a mold surface. The process of adding the second thermoplastic composition can comprise injecting the second thermoplastic composition into the mold cavity prior to injecting the first thermoplastic composition into the mold cavity. Optionally, after injecting the second thermoplastic composition into the mold cavity but before injecting the first thermoplastic composition into the mold cavity, the pressure within the mold cavity, or the temperature of the mold cavity, or both, can be altered. For example, after injecting the second thermoplastic composition into the mold, the pressure within the mold can be increased in order to better cover the surfaces of the mold cavity with the second thermoplastic composition and create a polymeric layer on the surfaces of the mold cavity. The first thermoplastic composition for the first component, i.e., a disclosed thermoplastic composition, can be injected into the mold containing the second component, i.e., the polymeric layer comprising the second thermoplastic composition, and foamed while in contact with the polymeric layer. The resultant injection-molded component is a unitary component, with the second component, i.e., the polymeric layer, thermally bonded to the first component, i.e., the foam component.

In one example, when injecting the second thermoplastic composition and the first thermoplastic composition to form a unitary component as described above, the second thermoplastic composition can be free of blowing agents or essentially free of blowing agents, in order to form a unitary foamed article including an unfoamed polymer layer comprising the second thermoplastic composition covering the thermoplastic foam having a multicellular foam structure compositionally comprising the first thermoplastic composition. For example, the step of injecting the second thermoplastic composition can comprise injecting a molten second thermoplastic composition that is free of or essentially free of physical or chemical blowing agents, and the step of injecting the first thermoplastic composition can comprise injecting a single-phase solution of the first thermoplastic composition and a supercritical fluid. In this way, the second thermoplastic composition can be used to form a decorative layer or a protective layer on the thermoplastic foam. One advantage of this method is that the detail level of the unfoamed polymeric layer can be greater, as an unfoamed material will retain a greater level of mold detail than a foamed layer. Another advantage of this method is that the second thermoplastic composition can have different physical properties or coloration or both physical properties and coloration as compared to the first thermoplastic composition, or the second thermoplastic composition and the first thermoplastic composition can be structurally different as described herein. For example, the second thermoplastic composition can have a greater Durometer hardness, or a greater level of abrasion resistance, or a greater coefficient of friction in order to provide a greater level of traction, as compared to the thermoplastic foam comprising the first thermoplastic composition. In another example, the second thermoplastic composition can comprise a greater concentration of pigments or dyes or both as compared to the first thermoplastic composition. For example, the second thermoplastic composition can comprise greater than 3 weight percent, or greater than 4 weight percent, or greater than 5 weight percent, or greater than 6 weight percent or greater than 10 weight percent of pigments, while the first thermoplastic composition can be free of or essentially free of pigments. This can reduce the total amount of pigments used to impart coloration to the unitary component without the need to include pigments in both the first and second thermoplastic compositions, which increases the recyclability of the unitary component.

Alternatively or additionally, the second component comprising the second thermoplastic composition can be disposed onto the exterior surface of the first component comprising the first thermoplastic composition during a compression molding step, or during a vacuum forming step. For example, a first component can be made such as by injection molding, and the foam component can thereafter be compression molded or vacuum formed in a mold which includes the second component (optionally with heating), such that the first component bonds to the surface of the second component during the compression molding or vacuum forming process. As described above, the second thermoplastic composition can have a greater Durometer hardness, or a greater level of abrasion resistance, or a greater coefficient of friction in order to provide a greater level of traction, as compared to the thermoplastic foam comprising the first thermoplastic composition. The second and the first thermoplastic compositions can be structurally different. In another example, the second thermoplastic composition can comprise a greater concentration of pigments or dyes or both as compared to the first thermoplastic composition.

The second component can be provided as an already formed component, e.g., a second component, to the injection mold or compression mold. For example, the second component, e.g., a film, can be inserted into an injection mold and held in place against a target surface of the mold via vacuum ports, electrostatic charge or other method. The second component may be conformed to the target surface of the mold, for example, with the application of heat or vacuum before or after it is inserted into the mold. The first thermoplastic composition for the first component, i.e., a disclosed thermoplastic copolyester composition, can then be injected into the mold containing the film, and foamed as described herein. As a result the second component becomes an integral part of the molded component.

Alternatively or additionally, the second component can be disposed onto the foam component after the foam component has been formed. According to some of the disclosed methods, the second component that is provided separately from the first component, and are thereafter operably coupled so that the second component is in contact with a targeted portion of an exterior surface of the first component. The second component may be coupled with the exterior surface of a first component using any suitable method. In an aspect, the second component may be adhesively laminated to the first component. In another aspect, the second component may be coupled with the first component may be thermally laminated to an exterior surface of the first component. For example, heat may be applied to an exterior surface of the first component, to a surface of the second component, or both, to soften or melt the heated surface(s), and the two surfaces may be joined when one or both are in the softened or melted state. In an aspect, the second component may be coupled with the first component using a flame lamination process.

The second component can be provided as a polymeric layer. For example, a polymeric coating can be formed by applying a liquid second thermoplastic composition onto the foam component, such as by spraying, dip coating, tumble-coating, brushing, or a combination thereof. The liquid polymeric material can then be dried or cured while in contact with the first component.

The polymeric layer can be disposed on at least one exterior surface of the foam component. For example, where the foam article is a midsole, the coating can be on all or part of the sidewall of the midsole, or on all or part of a ground-facing (bottom) surface of the midsole, or on all or part of an upper-facing (top) surface of the midsole, or any combination thereof. The polymeric layer can be disposed on at least one surface that may be exposed to moisture during normal use of the finished article, e.g., an article of footwear.

As disposed on the foam component, the polymeric layer has an average thickness of about 0.01 millimeter to about 3 millimeter, or about 0.03 millimeter to about 2 millimeter, or from about 0.1 millimeter to about 1 millimeter.

According to various aspect, the foam component or article having the disclosed polymeric layer has similar physical properties when compared to an equivalent foam component or article that lacks the polymeric layer.

In a particular aspect, when the second thermoplastic composition is a film, the film can be a multi-layer film. The multi-layer film can include one or more layers of the second thermoplastic composition, and one or more layers of a different (i.e., third) thermoplastic composition. The third thermoplastic composition can be a material having a lower level of oxygen transmission or water vapor transmission or both, as compared to the second thermoplastic composition. For example, the third thermoplastic composition can comprise a barrier polymer such as ethylene-vinyl alcohol (EVOH). One example of a multi-layer film includes a first layer comprising a second thermoplastic composition including TPU, and a second layer comprising a third thermoplastic composition including EVOH. Alternatively, the third thermoplastic composition can be an adhesive layer comprising one or more adhesive polymers, such as one or more hot melt adhesive polymers. Another example of a multi-layer film includes a first layer comprising a second thermoplastic composition including a first TPU, and a second layer comprising a third thermoplastic composition including a second hot melt adhesive TPU having a lower melting temperature than the first TPU.

The polymeric layer can be formed by applying a powdered second thermoplastic composition onto the foam component, such as by spraying, powder-coating, electrostatically coating, tumble-coating, or a combination thereof. In some aspects, an adhesive could be used to affix the powder to the midsole, and/or a coating can be applied over the powder to hold it in place on the foam component. Once the powder is affixed to the midsole, it can be left in the form of a powder, or it can be treated so as to form a more uniform coating, such as by heating it to melt it, by applying a solvent to solubilize it, etc.

Alternatively, the polymeric layer can take the form of a separate element which is applied to all or a portion of an exterior surface of the foam component when incorporating the midsole into an article of footwear. For example, the foam component can be a midsole component of an article of footwear, and the polymeric layer can be a rand or foxing tape applied around a perimeter of the midsole. The polymeric layer can be an extension of an outsole covering all or a portion of the bottom surface of the midsole, and which wraps up and covers at least a portion of the sidewall of the midsole. The polymeric layer can be the "shell" portion of a core-shell sole structure, which covers both the bottom surface and the sidewalls of the midsole, and which is attached to the upper of the article of footwear.

The foam articles and components can be foamed using any one of the methods described above.

In various aspects, the disclosed methods of manufacturing articles comprising a first component and a second component, the second component comprising a second thermoplastic composition can be produced separately via injection molding with or without the addition of compressed gas, supercritical fluids or other blowing agents upon which the foam article is produced.

In some instances, the disclosed methods of manufacturing articles comprising a first component and a second component comprise injection via overmolding. In some instances, overmolding can comprise sequential injection of a polymeric material for the first component, i.e., a disclosed thermoplastic copolyester, and a second thermoplastic composition in the same process, or wherein the second thermoplastic composition was produced in a separate process, and subsequently inserted into the mold after which foam article from the first thermoplastic composition is over molded. The second component can be produced separately via injection molding with only sufficient compressed gas, supercritical fluids or other blowing agents to achieve a density of 0.90 grams per cubic centimeter, 0.85 grams per cubic centimeter, or 0.80 grams per cubic centimeter.

In some instances, the disclosed methods of manufacturing articles comprising a first component and a second component comprise a step of corona treatment. That is, for example, the second component can be a film or an outsole or a rand that is pretreated with a plasma or corona treatment prior to receiving the overmolding assembly described herein.

In some instances, the disclosed methods of manufacturing articles comprising a first component and a second component comprise a step of pretreatment with a primer. That is, for example, the second component can be a film or an outsole or a rand that is pretreated with a primer alone, or a primer plus and an adhesive prior to receiving the overmolding assembly method described herein.

In some instances, the disclosed methods of manufacturing articles comprising a first component and a second component comprise a step of fused deposition 3D printing. That is, for example, the second component can be fused deposition 3D printed onto a first component. In such instances, a second thermoplastic composition can be extruded into a fused deposition 3D printing filament of about 1.5 mm, about 1.75 mm, about 1.85 mm, about 2.85 mm, about 3.0 mm, or other relevant diameter for deposition and attachment to first component in such a way that it comprises the ground contact layer, print-on outsole, or other exterior features. Any grade commonly used in injection molding will typically suffice for 3D print filament for fused deposition applications.

The resulting article comprising the first and second components can be characterized by good bonding strength between the first and the second components. The ply adhesion strength between the polymeric layer and the foam component is greater than 2.5 kg force/centimeter or greater than 3.0 kg force/centimeter, when determined using the Ply Adhesion Test method described herein. Alternatively additionally, the bonding strength between the first and the second components can be determined according to the Hand Pull Test, described herein. The disclosed articles or components can have a bond between the first and the second components that has an average hand pull test result of greater than or equal to 2.0, or greater than or equal to 2.5, or greater than or equal to 3.0, or greater than or equal to 3.5, or greater than or equal to 4.0, or greater than or equal to 4.5, when determined according to the Hand Pull Test method described herein.

Each of the first and/or the second components can be characterized by one or more properties. For example, a first and/or a second component can have an Akron abrasion of less than 0.50 cubic centimeters lost, optionally less than 0.40 cubic centimeters lost, less than 0.30 cubic centimeters lost, less than 0.20 cubic centimeters lost, or less than 0.10 cubic centimeters lost as determined using the Akron Abrasion Test. The first and/or the second components can have an Akron abrasion of about 0.05 cubic centimeters lost, about 0.10 cubic centimeters lost, about 0.15 cubic centimeters lost, about 0.20 cubic centimeters lost, about 0.25 cubic centimeters lost, about 0.30 cubic centimeters lost, about 0.35 cubic centimeters lost, about 0.40 cubic centimeters lost, about 0.45 cubic centimeters lost, or about 0.50 cubic centimeters lost as determined using the Akron Abrasion Test, any range of abrasion values encompassed by any of the foregoing values, or any combination of the foregoing abrasion values.

The first and/or a second component can have an Akron abrasion of less than 500 milligrams lost, optionally less than 400 milligrams lost, less than 300 milligrams lost, less than 200 milligrams lost, or less than 100 milligrams lost as determined using the Akron Abrasion Test. The first and/or a second component can have an can have an Akron abrasion of about 50 milligrams lost, about 100 milligrams lost, about 150 milligrams lost, about 200 milligrams lost, about 250 milligrams lost, about 300 milligrams lost, about 350 milligrams lost, about 400 milligrams lost, about 450 milligrams lost, or about 500 milligrams lost as determined using the Akron Abrasion Test, any range of abrasion values encompassed by any of the foregoing values, or any combination of the foregoing abrasion values.

The first and/or a second component can have a DIN abrasion of less than 0.30 cubic centimeters lost, optionally less than 0.20 cubic centimeters lost, less than 0.10 cubic centimeters lost, less than 0.05 cubic centimeters lost, or less than 0.03 cubic centimeters lost as determined using the DIN Abrasion Test. The first and/or a second component can have a DIN abrasion of about 0.01 cubic centimeters lost, about 0.05 cubic centimeters lost, about 0.10 cubic centimeters lost, about 0.15 cubic centimeters lost, about 0.20 cubic centimeters lost, about 0.25 cubic centimeters lost, or about 0.30 cubic centimeters lost as determined using the DIN Abrasion Test, any range of abrasion values encompassed by any of the foregoing values, or any combination of the foregoing abrasion values.

The first and/or a second component can have a DIN abrasion of less than 300 milligrams lost, optionally less than 250 milligrams lost, optionally less than 200 milligrams lost, optionally less than 150 milligrams lost, optionally less than 100 milligrams lost, optionally less than 80 milligrams lost, optionally less than 50 milligrams lost, or optionally less than 30 milligrams as determined using the DIN Abrasion Test. The first and/or a second component can have a DIN abrasion of about 10 milligrams lost, about 50 milligrams lost, about 100 milligrams lost, about 150 milligrams lost, about 200 milligrams lost, about 250 milligrams lost, or about 300 milligrams lost as determined using the DIN Abrasion Test, any range of abrasion values encompassed by any of the foregoing values, or any combination of the foregoing abrasion values.

The first and/or a second component described herein when incorporated into an article the product can have improved traction properties. In one aspect, the coefficient of friction of the polymer layer can be used to measure traction properties.

The first and/or a second component can have a dry dynamic coefficient of friction (COF) on a dry surface (e.g., a smooth, flat, or textured surface such as, for example, wooden parquet court, concrete, asphalt, laminate, brick, or ceramic tile) of greater than 0.5, optionally of greater than 0.7, greater than 0.8, greater than 0.9, greater than 1.0, as determined using the Dry Outsole Coefficient of Friction Test. The polymer layer can have a dry dynamic COF of greater than 0.15, optionally of greater than 0.2, greater than 0.25, or greater than 0.3, using the Dry Upper Coefficient of Friction Test.

The first and/or a second component can have a wet dynamic COF of greater than 0.25, optionally of greater than 0.30, greater than 0.35, greater than 0.40, or greater than 0.50, as determined using the Wet Outsole Coefficient of Friction Test. The polymer layer can have a wet dynamic COF of greater than 0.15, optionally of greater than 0.2, greater than 0.25, or greater than 0.3, using the Wet Upper Coefficient of Friction Test.

It may be desirable for the dynamic coefficient of friction for the same dry and wet surface (e.g., smooth concrete or court) to be as close as possible. In one aspect, the difference between the dynamic coefficient of friction of the dry surface and the wet surface is less than 15 percent. In another aspect, the difference between the dynamic coefficient of friction of the dry surface and the wet surface is about 0 percent, about 1 percent, about 2 percent, about 3 percent, about 4 percent, about 5 percent, about 6 percent, about 7 percent, about 8 percent, about 9 percent, about 10 percent, about 11 percent, about 12 percent, about 13 percent, about 14 percent, or about 15 percent, any range of percentage values encompassed by any of the foregoing values, or any combination of the foregoing percentage values.

The first and/or a second component can have a durometer Shore A hardness of less than 90 or less than 85 or less than 80. The polymer layer can have a durometer Shore A hardness of greater than 60 or greater than 65. The polymer layer can have a durometer Shore A hardness of about 50 to about 90 Shore A, optionally from about 55 to about 85 Shore A, from about 60 to about 80 Shore A, or from about 60 to about 70 Shore A. The polymer layer can have a durometer Shore A hardness of about 50 A, about 55 A, about 60 A, about 65 A, about 70 A, about 75 A, about 80 A, about 85 A, or about 90 A, any range of Shore A hardness values encompassed by any of the foregoing values, or any combination of the foregoing Shore A hardness values.

Thermoplastic Copolyester Composition

The thermoplastic compositions disclosed herein (i.e., the polymeric material for the first component of the foam portion and/or the second thermoplastic composition) can include or consist essentially of one or more thermoplastic copolyesters, including one or more thermoplastic copolyester elastomers. In some aspects, the first thermoplastic composition for the first component includes at least 90 percent or at least 95 weight percent, or at least 99 weight percent of a thermoplastic copolyester disclosed herein, based on the total weight of the first thermoplastic composition.

The thermoplastic copolyester compositions include or consist essentially of one or more thermoplastic copolyesters. The disclosed thermoplastic copolyester composition can include at least about 90 weight percent or at least about 95 weight percent or at least about 99 weight percent of the one or more thermoplastic copolyesters, based on the total weight of the thermoplastic copolyester composition. In some aspects, the polymeric component of the thermoplastic copolyester composition, which is comprised of all the polymeric materials present in the thermoplastic copolyester composition, consists essentially of the one or more thermoplastic copolyesters. The thermoplastic copolyesters can include chain units derived from one or more olefins and chain units derived from one or more ethylenically-unsaturated acid groups.

The thermoplastic copolyester compositions can have a melt flow index of from about 5 to about 40, or about 10 to about 20, or about 20 to about 30 as determined at 210 degrees centigrade using a 2.16 kilogram weight. Alternatively or additionally, the thermoplastic copolyester compositions can have a melt flow index of from about 5 to about 40, or about 10 about 20, or about 20 to about 30 as determined at 220 degrees centigrade using a 2.16 kilogram weight. Alternatively or additionally, the thermoplastic copolyester compositions can have a melt flow index of from about 5 to about 40, or about 10 to about 20, or about 20 to about 30 as determined at 230 degrees centigrade using a 2.16 kilogram weight.

The thermoplastic copolyesters can be terpolymers of moieties derived from ethylene, acrylic acid, and methyl acrylate or butyl acrylate. In some aspects, a ratio of a total parts by weight of the acrylic acid in the thermoplastic copolyesters to a total weight of the thermoplastic copolyesters is about 0.05 to about 0.6, about 0.1 to about 0.6, about 0.1 to about 0.5, about 0.15 to about 0.5, or about 0.2 to about 0.5.

The thermoplastic compositions provided herein can include a thermoplastic copolyester comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. In various aspects, the thermoplastic copolyester is a block copolymer. In some aspects, the thermoplastic copolyester is a segmented copolymer. In further aspects, the thermoplastic copolyester is a random copolymer. In still further aspects, the thermoplastic copolyester is a condensation copolymer.

The thermoplastic copolyester can have a weight average molecular weight of about 50,000 Daltons to about 1,000,000 Daltons; about 50,000 Daltons to about 500,000 Daltons; about 75,000 Daltons to about 300,000 Daltons; about 100,000 Daltons to about 250,000 Daltons; about 100,000 Dalton to about 500,000 Dalton; or a value or values of weight average molecular weight within any of the foregoing ranges or a weight average molecular weight range encompassing any sub-range of the foregoing ranges.

The thermoplastic copolyester can have a ratio of first segments to third segments from about 1:1 to about 1:5 based on the weight of each of the first segments and the third segments; about 1:1 to about 1:3 based on the weight of each of the first segments and the third segments; about 1:1 to about 1:2 based on the weight of each of the first segments and the third segments; about 1:1 to about 1:3 based on the weight of each of the first segments and the third segments; or a value or values of have a ratio of first segments to third segments within any of the foregoing ranges or a have a range of ratio of first segments to third segments encompassing any sub-range of the foregoing ranges.

The thermoplastic copolyester can a ratio of second segments to third segments from about 1:1 to about 1:2 based on the weight of each of the first segments and the third segments; about 1:1 to about 1:1.52 based on the weight of each of the first segments and the third segment; or a value or values of have a ratio of second segments to third segments within any of the foregoing ranges or a have a range of ratio of second segments to third segments encompassing any sub-range of the foregoing ranges.

The thermoplastic copolyester can have first segments derived from a poly(alkylene oxide)diol having a number-average molecular weight of about 250 Daltons to about 6000 Daltons; about 400 Daltons to about 6,000 Daltons; about 350 Daltons to about 5,000 Daltons; about 500 Daltons to about 3,000 Daltons; about 2,000 Daltons to about 3,000 Daltons; or a value or values of weight average molecular weight within any of the foregoing ranges or a weight average molecular weight range encompassing any sub-range of the foregoing ranges.

The thermoplastic copolyester can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof. In a still further aspect, the thermoplastic copolyester can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol. In a yet further aspect, the thermoplastic copolyester can have first segments derived from a poly(tetramethylene ether)diol.

The thermoplastic copolyester can have second segments derived from a diol having a molecular weight of less than about 250. The diol from which the second segments are derived can be a C2-C8 diol. In a still further aspect, the second segments can be derived from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof. In a yet further aspect, the second segments can be derived from 1,2-ethanediol, 1,3-propanediol, 1,4-butanediol, 1,6-hexanediol, and mixtures thereof. In an even further aspect, the second segments can be derived from 1,2-ethanediol. In a still further aspect, the second segments can be derived from 1,4-butanediol.

The thermoplastic copolyester can have third segments derived from an aromatic C5-C16 dicarboxylic acid. The aromatic C5-C16 dicarboxylic acid can have a molecular weight less than about 300 Daltons; about 120 Daltons to about 200 Daltons; or a value or values of molecular weight within any of the foregoing ranges or a molecular weight range encompassing any sub-range of the foregoing ranges. In some instances, the aromatic C5-C16 dicarboxylic acid is terephthalic acid, phthalic acid, isophthalic acid, or a derivative thereof. In a still further aspect, the aromatic C5-C16 dicarboxylic acid is a diester derivative of the terephthalic acid, phthalic acid, or isophthalic acid. In a yet further aspect, the aromatic C5-C16 dicarboxylic acid is terephthalic acid or the dimethyl ester derivative thereof.

The thermoplastic copolyester can comprise: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

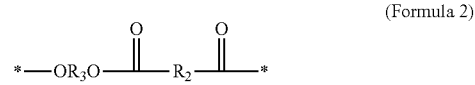
(Formula 1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the second copolyester unit has a structure represented by a Formula 2:

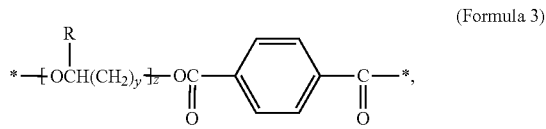
(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

The thermoplastic copolyester can comprise a plurality of first copolyester units having a structure represented by a Formula 3:

(Formula 3)

$$*-\!\!+\!\!OCH(CH_2)_y\!-\!\!+_z\!-\!OC\!-\!\!\!\!\raisebox{-2pt}{\includegraphics{}}\!\!\!\!-C-*,$$

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

The thermoplastic copolyester can comprise a plurality of first copolyester units having a structure represented by a Formula 4:

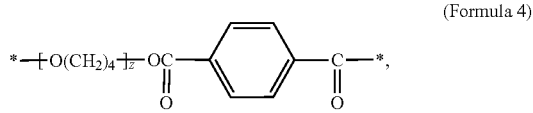
(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any integer value or set of integer values within the foregoing ranges or values, or any range of integer values encompassing a sub-range the foregoing integer value ranges.

The thermoplastic copolyester can comprise a plurality of first copolyester units having a weight average molecular weight from about 400 Daltons to about 6,000 Daltons; about 400 Daltons to about 5,000 Daltons; about 400 Daltons to about 4,000 Daltons; about 400 Daltons to about 3,000 Daltons; about 500 Daltons to about 6,000 Daltons; about 500 Daltons to about 5,000 Daltons; about 500 Daltons to about 4,000 Daltons; about 500 Daltons to about 3,000 Daltons; about 600 Daltons to about 6,000 Daltons; about 600 Daltons to about 5,000 Daltons; about 600 Daltons to about 4,000 Daltons; about 600 Daltons to about 3,000 Daltons; about 2,000 Daltons to about 3,000 Daltons; or a value or values of weight average molecular weight within any of the foregoing ranges or a weight average molecular weight range encompassing any sub-range of the foregoing ranges.

The thermoplastic copolyester can comprise a plurality of second copolyester units, each second copolyester unit of the plurality having represented by a Formula 5:

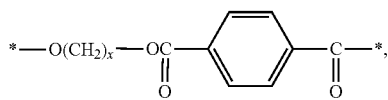

(Formula 5)

wherein x is an integer having a value from 1 to 20; wherein the foam article has a multicellular closed-cell or open-cell foam structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range the foregoing integer value ranges. In a further aspect, x is an integer having a value of 2, 3, or 4.

The thermoplastic copolyester can comprise a plurality of second copolyester units, each second copolyester unit of the plurality having represented by a Formula 6:

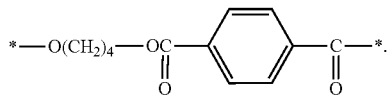

(Formula 6)

The thermoplastic copolyester can comprise a weight percent range of the plurality of first copolyester units based on total weight of the thermoplastic copolyester such that the weight percent range is about 30 weight percent to about 80 weight percent; about 40 weight percent to about 80 weight percent; about 50 weight percent to about 80 weight percent; about 30 weight percent to about 70 weight percent; about 40 weight percent to about 70 weight percent; about 50 weight percent to about 70 weight percent; about 40 weight percent to about 65 weight percent; about 45 weight percent to about 65 weight percent; about 50 weight percent to about 65 wt; about 55 weight percent to about 65 weight percent; about 40 weight percent to about 60 weight percent; about 45 weight percent to about 60 weight percent; about 50 weight percent to about 60 weight percent; about 55 weight percent to about 60 weight percent; or any weight percent value or set of weight percent values within any of the foregoing ranges of weight percent, or any range of weight percent values encompassing a sub-set of any of the foregoing ranges.

In some aspects, when in solid form, the thermoplastic copolyester can comprise phase separated domains. For example, a plurality of first segments derived from a dihydroxy-terminated polydiol can phase-separate into domains comprising primarily the first segments. Moreover, a plurality of second segments derived from a diol can phase-separate into domains comprising primarily the second segments. In other aspects, the thermoplastic copolyester can comprise phase-separated domains comprising primarily of a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

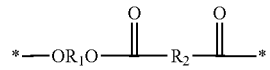

(Formula 1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and other phase-separated domains comprising primarily of a plurality of second copolyester units, each second copolyester unit of the plurality comprising the second segment derived from a diol and the third segment derived from an aromatic dicarboxylic acid, wherein the second copolyester unit has a structure represented by a Formula 2:

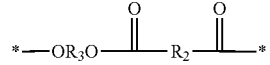

(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

In other aspects, when in solid form, the thermoplastic copolyester can comprise phase-separated domains comprising primarily of a plurality of first copolyester units, each first copolyester unit of the plurality having a structure represented by a Formula 3:

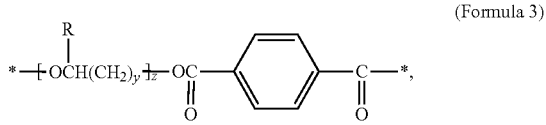

(Formula 3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

In other aspects, when in solid form, the thermoplastic copolyester can comprise phase-separated domains comprising primarily of a plurality of first copolyester units, each first copolyester unit of the plurality having a structure represented by a Formula 4:

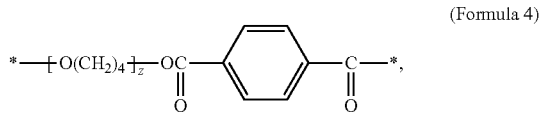

(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any integer value or set of integer values within the foregoing ranges or values, or any range of integer values encompassing a sub-range the foregoing integer value ranges.

When in solid form, the thermoplastic copolyester can comprise phase-separated domains comprising primarily of a plurality of first copolyester units having a weight average molecular weight from about 400 Daltons to about 6,000 Daltons; about 400 Daltons to about 5,000 Daltons; about 400 Daltons to about 4,000 Daltons; about 400 Daltons to about 3,000 Daltons; about 500 Daltons to about 6,000 Daltons; about 500 Daltons to about 5,000 Daltons; about 500 Daltons to about 4,000 Daltons; about 500 Daltons to about 3,000 Daltons; about 600 Daltons to about 6,000 Daltons; about 600 Daltons to about 5,000 Daltons; about 600 Daltons to about 4,000 Daltons; about 600 Daltons to about 3,000 Daltons; about 2,000 Daltons to about 3,000 Daltons; or a value or values of weight average molecular weight within any of the foregoing ranges or a weight average molecular weight range encompassing any sub-range of the foregoing ranges.

In other aspects, when in solid form, the thermoplastic copolyester can comprise phase-separated domains comprising a plurality of second copolyester units, each second copolyester unit of the plurality having represented by a Formula 5:

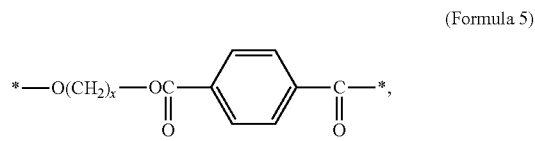

(Formula 5)

wherein x is an integer having a value from 1 to 20; wherein the foam article has a multicellular closed-cell or open-cell foam structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range the foregoing integer value ranges. In a further aspect, x is an integer having a value of 2, 3, or 4.

In other aspects, when in solid form, the thermoplastic copolyester can comprise phase-separated domains comprising a plurality of second copolyester units, each second copolyester unit of the plurality having represented by a Formula 6:

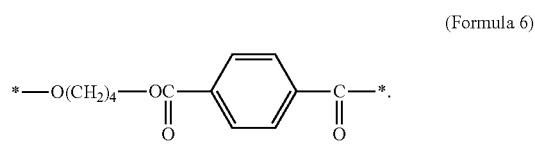

(Formula 6)

When in solid form, the thermoplastic copolyester can comprise phase-separated domains comprising a weight percent range of the plurality of first copolyester units based on total weight of the thermoplastic copolyester such that the weight percent range is about 30 weight percent to about 80 weight percent; about 40 weight percent to about 80 weight percent; about 50 weight percent to about 80 weight percent; about 30 weight percent to about 70 weight percent; about 40 weight percent to about 70 weight percent; about 50 weight percent to about 70 weight percent; about 40 weight percent to about 65 weight percent; about 45 weight percent to about 65 weight percent; about 50 weight percent to about 65 wt; about 55 weight percent to about 65 weight percent; about 40 weight percent to about 60 weight percent; about 45 weight percent to about 60 weight percent; about 50 weight percent to about 60 weight percent; about 55 weight percent to about 60 weight percent; or any weight percent value or set of weight percent values within any of the foregoing ranges of weight percent, or any range of weight percent values encompassing a sub-set of any of the foregoing ranges.

The disclosed thermoplastic copolyester composition, the polymeric component of the composition or an individual thermoplastic copolyester copolymer in neat form can be characterized by one or more properties. In some aspects, the thermoplastic copolyester composition or the polymeric component, or the polymer has a maximum load of about 10 newtons to about 100 newtons, or from about 15 newtons to about 50 newtons, or from about 20 newtons to about 40 newtons; or any load value or set of load values within any of the foregoing ranges of load value, or any range of load values encompassing a sub-set of any of the foregoing ranges, when determined using the Cyclic Tensile Test method described herein.

The tensile strength of the thermoplastic copolyester composition or of the component of the thermoplastic copolyester composition or of a thermoplastic copolyester copolymer in neat form is another important physical characteristic. The thermoplastic copolyester composition or component or copolymer can have a tensile strength of from 5 kilograms per square centimeter to 25 kilograms per square centimeter, or of from 10 kilograms per square centimeter to 23 kilograms per square centimeter, or of from 15 kilograms per square centimeter to 22 kilograms per square centimeter; or any load value or set of load values within any of the foregoing ranges of load value, or any range of load values encompassing a sub-set of any of the foregoing ranges, when determined using the Cyclic Tensile Test method described herein.

The thermoplastic copolyester composition or polymeric component of the thermoplastic copolyester composition or a thermoplastic copolyester copolymer in neat form can have a tensile modulus of about 2 megapascals to about 20 megapascals or from about 5 megapascals to about 15 megapascals when determined using the Cyclic Tensile Test method described herein; or any load value or set of load values within any of the foregoing ranges of load value, or any range of load values encompassing a sub-set of any of the foregoing ranges.

Exemplary, but non-limiting, thermoplastic polyester elastomers, including thermoplastic copolyesters, that can be used in the disclosed methods, foams, and articles include "HYTREL" 3078, "HYTREL" 4068, and "HYTREL" 4556 (DuPont, Wilmington, Delaware, USA); "PELPRENE" P30B, P40B, and P40H (Toyobo U.S.A. Inc., New York, New York, USA); "TRIEL" 5300, "TRIEL" 5400, and blends thereof (Samyang Corporation, Korea); "KEYFLEX" BT1028D, BT1033D, BT1035D, BT1040D, BT1045D, and BT1047D (LG Chem, Korea); and "KOPEL" KP3340, KP3346, KP3347, KP3942 (Kolon Plastics, Inc., Korea).

The disclosed thermoplastic copolyester compositions can further include one or more ionomers, such as any of the "SURLYN" polymers (DuPont, Wilmington, Delaware, USA). Ionic foams described herein can be made by a process/method including receiving a composition described herein, and physically foaming the composition to form a thermoplastic copolyester foam having a density of about 0.7 gram per cubic centimeter or less, or 0.5 gram per cubic centimeter or less, or 0.4 gram per cubic centimeter or less, or 0.3 gram per cubic centimeter or less. The process can include blowing the composition to produce an article or component comprising the thermoplastic copolyester foam. In some examples, the process for forming the thermoplastic copolyester foam comprises injection molding a mixture including a composition as described herein and a supercritical fluid (e.g., supercritical carbon dioxide or supercritical nitrogen) in a mold, and removing the thermoplastic copolyester foam from the mold.

The disclosed thermoplastic copolyester compositions can further include one or more thermoplastic polyurethanes, including thermoplastic polyurethane elastomers, such as "FORTIMO" (Mitsui Chemicals, Inc., Tokyo, Japan); "TEXIN" (Covestro LLC, Pittsburgh, Pennsylvania, USA); and "BOUNCELL-X" (Lubrizol Advanced Materials, Inc., Brecksville, Ohio, USA).

The disclosed thermoplastic copolyester compositions can further include one or more olefinic polymers. Olefinic polymers can include ethylene-based copolymers, propylene-based copolymers, and butene-based copolymers. In some aspects, the olefinic polymer is an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; any copolymer thereof, and any blend thereof. In some aspects, a ratio V of a total parts by weight of the olefinic polymers present in the composition to a total parts by weight of the thermoplastic copolyesters in the composition is about 0.0 to about 0.6, about 0.0 to about 0.4, about 0.01 to about 0.4, or about 0.01 to about 0.6, or about 0.1 to about 0.4.

The disclosed thermoplastic copolyester compositions can further include an ethylene-vinyl acetate (EVA) copolymer. The ethylene-vinyl acetate (EVA) copolymer can have a range of vinyl acetate contents, for example about 50 percent to about 90 percent, about 50 percent to about 80 percent, about 5 percent to about 50 percent, about 10 percent to about 45 percent, about 10 percent to about 30 percent, about 30 percent to about 45 percent, or about 20 percent to about 35 percent, based on a total weight of the copolymer.

The disclosed thermoplastic copolyester compositions can further include an ethylene-vinyl alcohol (EVOH) copolymer. The EVOH copolymer can have a range of vinyl alcohol contents, for example about 50 percent to about 90 percent, about 50 percent to about 80 percent, about 5 percent to about 50 percent, about 10 percent to about 45 percent, about 10 percent to about 30 percent, about 30 percent to about 45 percent, or about 20 percent to about 35 percent, based on a total weight of the copolymer.

Second Thermoplastic Compositions

Having described the foams and methods of forming them, we turn to the second thermoplastic composition. According to the various aspects, the disclosed foam article has a second thermoplastic composition disposed on at least one exterior surface of the foam. For example, the second thermoplastic composition can be a polymeric layer or a polymeric coating or a polymeric film. In some aspects, the second thermoplastic composition has a higher abrasion resistance than the foam component. In another aspect, the second thermoplastic composition has a higher coefficient of friction than the first thermoplastic composition of the foam component. In another aspect, the second thermoplastic composition has a higher Durometer hardness than the foam component. In other aspects, the second thermoplastic composition has a higher specific gravity than the foam component. In other aspect, the second thermoplastic composition comprises a higher concentration of non-polymeric ingredients, such as fillers and pigments, than the first thermoplastic composition of the foam component. In yet another aspect, the second thermoplastic composition has two or more of a higher abrasion resistance, a higher coefficient of friction, a higher Durometer hardness, a higher specific gravity, and a higher concentration of non-polymeric ingredients, as compared to the foam component or the first thermoplastic composition of the foam component. In one aspect, the second thermoplastic composition is structurally different than the first thermoplastic composition as described below. Alternatively, the second thermoplastic composition is structurally the same as the first thermoplastic composition. The second thermoplastic composition may be integral with the foam component, or may be a separate component that is operably coupled with the foam component, as described herein.

In one aspect, the first thermoplastic composition can be structurally the same as or structurally different from the second thermoplastic composition. Here, the first thermoplastic composition has one or more structural chemical features that are the same as or different than the second thermoplastic composition. In one aspect, the structural difference is based on the chemical structure of the first thermoplastic elastomer being different from the chemical structure of all of the second thermoplastic elastomers present in the second thermoplastic composition (e.g., different positional or stereochemical groups). In another aspect, the structural difference is based on a number-average molecular weight of the first thermoplastic elastomer being different from a number-average molecular weight of second thermoplastic elastomer, where the first and second thermoplastic elastomers have the same chemical structure. In another aspect, the first structural difference is based on a concentration of the first thermoplastic elastomer in the first thermoplastic composition being different from a concentration of the second thermoplastic elastomer in the second thermoplastic composition, where the first and second thermoplastic elastomers have the same chemical structure and the same number average molecular weights. In yet another aspect, the structural difference is based on any combination of the chemical structure, the number-average molecular weight, and the concentration being different. For example, a first thermoplastic composition comprising a thermoplastic copolyester elastomer is structurally different from a second thermoplastic composition comprising a thermoplastic styrene copolymer elastomer, or comprising a thermoplastic polyurethane elastomer, based on the first and second thermoplastic compositions comprising thermoplastic elastomers having different chemical structures In another example, a first thermoplastic composition comprising a first 50,000 Dalton thermoplastic copolyester elastomer is structurally different than a second thermoplastic composition comprising a second 100,000 Dalton thermoplastic copolyester elastomer having the same chemical structure as the first 50,000 Dalton thermoplastic copolyester, based on the number average molecular weight. In another example, a second thermoplastic composition comprising the second 100,000 Dalton thermoplastic copolyester elastomer having the same chemical structure as the first 50,000 Dalton thermoplastic copolyester and also comprising the first 50,000 Dalton thermoplastic copolyester would still be structurally different from the first thermoplastic composition, due to the presence of the 100,000 Dalton thermoplastic composition in the second thermoplastic composition. In yet another example, a first thermoplastic elastomer comprising 5 weight percent of a first 50,000 Dalton thermoplastic copolyester is structurally different than a second thermoplastic elastomer comprising 95 weight percent of the first 50,000 Dalton thermoplastic copolyester.

In some aspects, a second thermoplastic composition includes at least 90 weight percent, or at least 95 weight percent, or at least 99 weight percent of a thermoplastic copolyester as disclosed herein, based on the total weight of the second thermoplastic composition. In some instances, the polymeric component of the second thermoplastic composition consists essentially of only one or more disclosed thermoplastic copolyester.

The second thermoplastic composition can be disposed on at least one exterior surface of the foam component. For example, where the foam article is a midsole, the second thermoplastic composition can be on all or part of the ground-facing (bottom) surface of the midsole, or on all or part of a side surface of the midsole, or any combination thereof.

In certain aspects, the disclosed methods comprise forming the second thermoplastic composition integrally with the first component. For example, the polymeric material for the first component, e.g., a disclosed first thermoplastic copolyester composition, and the second thermoplastic composition can be added to a mold sequentially during an injection molding process to provide a unitary component having a foam portion and a second portion comprising the second thermoplastic composition. In this aspect, a mold can be provided having a first mold portion having a mold surface. The second thermoplastic composition can be added to the mold, so as to form a layer of second thermoplastic composition on at least a portion of the mold surface. The first thermoplastic composition for the first component, e.g., a disclosed thermoplastic copolyester composition, can be injected into the mold containing the second thermoplastic composition, and foamed while in contact with the second thermoplastic composition. The resultant injection-molded component is a unitary component, with the second thermoplastic composition bonded to the foam component. Alternatively or additionally, the second thermoplastic composition can be disposed onto the exterior surface of the foam component during a compression molding step. For example, a foam component can be made such as by injection molding, and the foam component can thereafter be compression molded in a mold which includes the second thermoplastic composition, and the second thermoplastic composition bonds to the surface of the foam during the compression molding process.

The second thermoplastic composition can be provided as a discrete layer or film to the injection mold or compression mold. For example, the layer or film forming the second thermoplastic composition can be inserted into an injection mold and held in place against a target surface of the mold via vacuum ports, electrostatic charge or other method. The layer or film may be conformed to the target surface of the mold, for example, with the application of heat or vacuum before or after it is inserted into the mold. The first thermoplastic composition can then be injected into the mold containing the film, and foamed as described herein. As a result the second thermoplastic composition of the layer or film becomes an integral part of the molded component.

Alternatively or additionally, the second thermoplastic composition can be disposed onto the foam component after the foam component has been formed. According to some of the disclosed methods, the second thermoplastic composition is provided as a layer or film that is provided separately from the foam component, and are thereafter operably coupled so that the second thermoplastic composition forms a layer on the targeted portion of the exterior surface of the foam. The second thermoplastic composition may be coupled with the exterior surface of a foam component or article using any suitable method. In an aspect, the second thermoplastic composition may be adhesively laminated to the foam component. In another aspect, the second thermoplastic composition may be coupled with the foam component such as by thermally laminating to an exterior surface of the foam. For example, heat may be applied to an exterior surface of the foam component, to a surface of the second thermoplastic composition, or both, to soften or melt the respective heated surface(s), and the two surfaces may be joined when one or both are in the softened or melted state. In an aspect, the second thermoplastic composition may be coupled with the foam component using a flame lamination process.

The second thermoplastic composition can be provided as a polymeric coating. For example, a polymeric coating can be formed by applying a liquid polymeric material onto the foam component, such as by spraying, dip coating, tumble-coating, brushing, or a combination thereof. The liquid second thermoplastic composition can then be dried or cured while in contact with the midsole.

The polymeric coating can be formed by applying a powdered second thermoplastic composition onto the foam component, such as by spraying, powder-coating, electrostatically coating, tumble-coating, or a combination thereof. In some aspects, an adhesive could be used to affix the powder to the midsole, and/or a coating can be applied over the powder to hold it in place on the foam component. Once the powder is affixed to the midsole, it can be left in the form of a powder, or it can be treated so as to form a more uniform coating, such as by heating it to melt it, by applying a solvent to solubilize it, etc.

Alternatively, the second thermoplastic composition can take the form of a separate element which is applied to all or a portion of an exterior surface of the foam component when incorporating the midsole into an article of footwear. For example, the foam component can be a midsole component of an article of footwear, and the second thermoplastic composition can be a rand or foxing tape applied around a perimeter of the midsole. The second thermoplastic composition can be an extension of an outsole covering all or a portion of the bottom surface of the midsole, and which wraps up and covers at least a portion of the sidewall of the midsole. The second thermoplastic composition can be the "shell" portion of a core-shell sole structure, which covers both the bottom surface and the sidewalls of the midsole, and which is attached to the upper of the article of footwear.

The resulting article comprising the first component with the second thermoplastic composition can be characterized by good bonding strength between the second thermoplastic composition and the foam component. The ply adhesion strength between the second thermoplastic composition and the foam component is greater than 2.5 kg force/centimeter or greater than 3.0 kg force/centimeter, when determined using the Ply Adhesion Test method described herein.

Second Thermoplastic Composition Properties

The disclosed second thermoplastic composition can be characterized by one or more properties.

In one aspect, the polymeric layer composed of the second thermoplastic composition forms a water-resistant barrier on the at least a portion of the exterior surface of the first foam component. Here, the second thermoplastic composition of the polymeric layer reduces or prevents water uptake by the open cell foam microstructure of first foam component.

In one aspect, the foams and articles described herein having the polymeric layer exhibit a beneficial Water Uptake Capacity. In other words, the foam articles having a polymeric layer as disclosed herein do not uptake either any water or a significant amount of water during the use of the article. For example, the foam articles or foam components having the polymeric layer have a Water Uptake Capacity at 2 hours of less than 5 percent, or less than 4 percent, or less than 3 percent, or less than 2 percent, when determined using the Water Uptake Capacity Test method described herein. In comparison, an equivalent foam article or foam component that lacks the polymeric layer may have a water uptake capacity at 2 hours of greater than 2 percent, or from about 2 percent to about 30 percent, or from about 3 percent to about 25 percent or from about 5 percent to about 20 percent, when determined using the Water Uptake Capacity Test method described herein. The disclosed foam component or article having the disclosed polymeric layer can have a reduced water uptake when compared to an equivalent foam component or article that lacks the polymeric layer. For example, the disclosed foam component or article can have a water uptake capacity at 2 hours that is about 20 percent less, or about 30 percent less, or about 50 percent less than a water uptake capacity at 5 minutes for an equivalent foam component or article that lacks the polymeric layer, when determined using the Water Uptake Capacity Test method describe herein. The disclosed foam component or article can have a water uptake capacity at 5 minutes that is at least 2 percentage points less, or at least 3 percentage points less, or at least 4 percentage points less, or at least 5 percent less, or at least 6 percentage points less, or at least 7 percentage points less, or at least 8 percentage points less, or at least 9 percentage points less, or at least 10 percentage points less, or at least 11 percentage points less, or at least 12 percentage points less, or at least 13 percentage points less, or at least 14 percentage points less, or at least 15 percentage points less, or at least 20 percentage points less, or at least 25 percentage points less, or at least 30 percentage points less than a water uptake capacity at 5 minutes for an equivalent foam component or article that lacks the polymeric layer, when determined using the Water Uptake Capacity Test method describe herein In some aspects, the second thermoplastic composition or the second thermoplastic elastomer has a maximum load of about 10 newtons to about 100 newtons, or from about 15 newtons to about 50 newtons, or from about 20 newtons to about 40 newtons; or any load value or set of load values within any of the foregoing ranges of load value, or any range of load values encompassing a sub-set of any of the foregoing ranges, when determined using the Cyclic Tensile Test method described herein.

The tensile strength of the second thermoplastic composition or second thermoplastic elastomer is another important physical characteristic. The second thermoplastic composition or resin can have a tensile strength of from 5 kilograms per square centimeter to 25 kilograms per square centimeter, or of from 10 kilograms per square centimeter to 23 kilograms per square centimeter, or of from 15 kilograms per square centimeter to 22 kilograms per square centimeter; or any load value or set of load values within any of the foregoing ranges of load value, or any range of load values encompassing a sub-set of any of the foregoing ranges, when determined using the Cyclic Tensile Test method described herein.

The second thermoplastic composition or second thermoplastic elastomer can have a tensile modulus of about 2 megapascals to about 20 megapascals or from about 5 megapascals to about 15 megapascals when determined using the Cyclic Tensile Test method described herein; or any load value or set of load values within any of the foregoing ranges of load value, or any range of load values encompassing a sub-set of any of the foregoing ranges.

The second thermoplastic composition can have an Akron abrasion of less than 0.50 cubic centimeters lost, optionally less than 0.40 cubic centimeters lost, less than 0.30 cubic centimeters lost, less than 0.20 cubic centimeters lost, or less than 0.10 cubic centimeters lost as determined using the Akron Abrasion Test. The second thermoplastic composition can have an Akron abrasion of about 0.05 cubic centimeters lost, about 0.10 cubic centimeters lost, about 0.15 cubic centimeters lost, about 0.20 cubic centimeters lost, about 0.25 cubic centimeters lost, about 0.30 cubic centimeters lost, about 0.35 cubic centimeters lost, about 0.40 cubic centimeters lost, about 0.45 cubic centimeters lost, or about 0.50 cubic centimeters lost as determined using the Akron Abrasion Test, any range of abrasion values encompassed by any of the foregoing values, or any combination of the foregoing abrasion values.

The second thermoplastic composition can have an Akron abrasion of less than 500 milligrams lost, optionally less than 400 milligrams lost, less than 300 milligrams lost, less than 200 milligrams lost, or less than 100 milligrams lost as determined using the Akron Abrasion Test. The second thermoplastic composition can have an Akron abrasion of about 50 milligrams lost, about 100 milligrams lost, about 150 milligrams lost, about 200 milligrams lost, about 250 milligrams lost, about 300 milligrams lost, about 350 milligrams lost, about 400 milligrams lost, about 450 milligrams lost, or about 500 milligrams lost as determined using the Akron Abrasion Test, any range of abrasion values encompassed by any of the foregoing values, or any combination of the foregoing abrasion values.

The second thermoplastic composition can have a DIN abrasion of less than 0.30 cubic centimeters lost, optionally less than 0.20 cubic centimeters lost, less than 0.10 cubic centimeters lost, less than 0.05 cubic centimeters lost, or less than 0.03 cubic centimeters lost as determined using the DIN Abrasion Test. The second thermoplastic composition can have a DIN abrasion of about 0.01 cubic centimeters lost, about 0.05 cubic centimeters lost, about 0.10 cubic centimeters lost, about 0.15 cubic centimeters lost, about 0.20 cubic centimeters lost, about 0.25 cubic centimeters lost, or about 0.30 cubic centimeters lost as determined using the DIN Abrasion Test, any range of abrasion values encompassed by any of the foregoing values, or any combination of the foregoing abrasion values.

The second thermoplastic composition can have a DIN abrasion of less than 300 milligrams lost, optionally less than 250 milligrams lost, optionally less than 200 milligrams lost, optionally less than 150 milligrams lost, optionally less than 100 milligrams lost, optionally less than 80 milligrams lost, optionally less than 50 milligrams lost, or optionally less than 30 milligrams as determined using the DIN Abrasion Test. The second thermoplastic composition can have a DIN abrasion of about 10 milligrams lost, about 50 milligrams lost, about 100 milligrams lost, about 150 milligrams lost, about 200 milligrams lost, about 250 milligrams lost, or about 300 milligrams lost as determined using the DIN Abrasion Test, any range of abrasion values encompassed by any of the foregoing values, or any combination of the foregoing abrasion values.

The second thermoplastic composition described herein when incorporated into an article the product has improved traction properties. In one aspect, the coefficient of friction of the second thermoplastic composition can be used to measure traction properties.

The second thermoplastic composition can have a dry dynamic coefficient of friction (COF) on a dry surface (e.g., a smooth, flat, or textured surface such as, for example, wooden parquet court, concrete, asphalt, laminate, brick, or ceramic tile) of greater than 0.5, optionally of greater than 0.7, greater than 0.8, greater than 0.9, or greater than 1.0, as determined using the Dry Outsole Coefficient of Friction Test. The second thermoplastic composition can have a dry dynamic COF of greater than 0.15, optionally of greater than 0.2, greater than 0.25, or greater than 0.3, using the Dry Upper Coefficient of Friction Test.

The second thermoplastic composition can have a wet dynamic COF of greater than 0.25, optionally of greater than 0.30, greater than 0.35, greater than 0.40, or greater than 0.50, as determined using the Wet Outsole Coefficient of Friction Test. The second thermoplastic composition can have a wet dynamic COF of greater than 0.15, optionally of greater than 0.2, greater than 0.25, or greater than 0.3, using the Wet Upper Coefficient of Friction Test.

It may be desirable for the dynamic coefficient of friction for the same dry and wet surface (e.g., smooth concrete or court) to be as close as possible. In one aspect, the difference between the dynamic coefficient of friction of the dry surface and the wet surface is less than 15 percent. In another aspect, the difference between the dynamic coefficient of friction of the dry surface and the wet surface is about 0 percent, about 1 percent, about 2 percent, about 3 percent, about 4 percent, about 5 percent, about 6 percent, about 7 percent, about 8 percent, about 9 percent, about 10 percent, about 11 percent, about 12 percent, about 13 percent, about 14 percent, or about 15 percent, any range of percentage values encompassed by any of the foregoing values, or any combination of the foregoing percentage values.

The second thermoplastic composition can have a melting temperature from about 100 degrees centigrade to about 210 degrees centigrade, optionally from about 110 degrees centigrade to about 195 degrees centigrade, from about 120 degrees centigrade to about 180 degrees centigrade, or from about 120 degrees centigrade to about 170 degrees centigrade. The melting temperature of the second thermoplastic composition can be within about 50 degrees centigrade, or about 40 degrees centigrade, or about 30 degrees centigrade, or about 20 degrees centigrade of the first thermoplastic composition.

The second thermoplastic composition can have a melt flow rate of at least 0.2 grams per 10 minutes, optionally at least 5, at least 10, at least 15, at least 20, at least 25, at least 30, at least 40, or at least 50 grams per 10 minutes, as determined using ASTM D1238-13 at 160 degrees centigrade using a weight of 2.16 kg. The second thermoplastic composition can have a melt flow rate of at least 0.2 grams per 10 minutes, optionally at least 5, at least 10, at least 15, at least 20, at least 25, at least 30, at least 40, or at least 50 grams per 10 minutes, as determined using ASTM D1238-13 at 200 degrees centigrade using a weight of 10 kg.

The second thermoplastic composition can have a melting temperature from about 100 degrees centigrade to about 210 degrees centigrade, optionally from about 110 degrees centigrade to about 195 degrees centigrade, from about 120 degrees centigrade to about 180 degrees centigrade, or from about 120 degrees centigrade to about 170 degrees centigrade.

The second thermoplastic composition can have a melt flow index of from about 5 to about 40, or about 10 to about 20, or about 20 to about 30 as determined at 210 degrees centigrade using a 2.16 kilogram weight. Alternatively or additionally, the second thermoplastic composition can have a melt flow index of from about 5 to about 40, or about 10 about 20, or about 20 to about 30 as determined at 220 degrees centigrade using a 2.16 kilogram weight. Alternatively or additionally, the second thermoplastic composition can have a melt flow index of from about 5 to about 40, or about 10 to about 20, or about 20 to about 30 as determined at 230 degrees centigrade using a 2.16 kilogram weight.

The second thermoplastic composition can have a durometer Shore A hardness of less than 90 or less than 85 or less than 80. The second thermoplastic composition can have a durometer Shore A hardness of greater than 60 or greater than 65. The second thermoplastic composition can have a durometer Shore A hardness of about 50 to about 90 Shore A, optionally from about 55 to about 85 Shore A, from about 60 to about 80 Shore A, or from about 60 to about 70 Shore A.

In the foamed article, the second thermoplastic composition can have a specific gravity from about 0.8 to about 1.5, optionally from about 0.85 to about 1.30, or from about 0.88 to about 1.20. Alternatively, in the foamed article, the second thermoplastic composition can be a multicellular foam having a specific gravity of from about 0.15 to about 0.60, or from about 0.15 to about 0.40, or from about 0.15 to about 0.25.

The second thermoplastic composition can have two or more of the first properties, or optionally three or more, four or more, five or more, six or more, seven or more, or all ten first properties provided above.

In addition to the first properties, the second thermoplastic composition can have one or more second properties. The second thermoplastic composition can have a glass transition temperature less than 50 degrees centigrade, optionally less than 30 degrees centigrade, less than 0 degrees centigrade, less than −10 degrees centigrade, or less than −20 degrees centigrade. The second thermoplastic composition can have a stress at break greater than 7 megapascals, optionally greater than 8 megapascals, or greater than 8 megapascals as determined using ASTM DE-412 at 25 degrees centigrade The second thermoplastic composition can have a tensile stress at 300 percent modulus greater than 2 megapascals, optionally greater than 2.5 megapascals, or greater than 3 megapascals as determined using ASTM DE-412 at 25 degrees centigrade The second thermoplastic composition can have an elongation at break greater than 450 percent, optionally greater than 500 percent, or greater than 550 percent as determined using ASTM DE-412 at 25 degrees centigrade. The second thermoplastic composition can have two or more of the second properties, or optionally three or more, or all four second properties.

According to the various aspects, the disclosed foam article has a polymeric layer disposed on at least one exterior surface of the foam component. For example, the polymeric layer can be a polymeric coating or a polymeric film. In some aspects, the polymeric layer acts as a fluid barrier that controls or prevents water uptake by the foam article. The polymeric layer may be integral with the foam component, or may be a separate component that is operably coupled with the foam component, as described herein.

The polymeric layer can be disposed on at least one exterior surface of the foam component. For example, where the foam article is a midsole, the coating can be on all or part of the sidewall of the midsole, or on all or part of a ground-facing (bottom) surface of the midsole, or on all or part of an upper-facing (top) surface of the midsole, or any combination thereof. The polymeric layer can be disposed on at least one surface that may be exposed to moisture during normal use of the finished article, e.g., an article of footwear.

As disposed on the foam component, the polymeric layer has an average thickness of about 0.01 millimeter to about 3 millimeter, or about 0.03 millimeter to about 2 millimeter, or from about 0.1 millimeter to about 1 millimeter.

Thermoplastic Elastomers

The first and second thermoplastic compositions described herein can comprise one or more thermoplastic elastomers. Exemplary thermoplastic elastomers include thermoplastic homo-polymer elastomer and thermoplastic co-polymer elastomers. The thermoplastic elastomer can be a thermoplastic random co-polymer elastomer. The thermoplastic elastomer can be a thermoplastic block co-polymer elastomer. The term "polymer" refers to a polymerized molecule having one or more monomer species, and includes homopolymers and copolymers. The term "copolymer" refers to a polymer having two or more monomer species, and includes terpolymers (i.e., copolymers having three monomer species). For example, the thermoplastic elastomer can be a block co-polymer having repeating blocks of polymeric units of the same chemical structure (segments) which are relatively harder (hard segments), and repeating blocks of polymeric segments which are relatively softer (soft segments). In various aspects, in block co-polymers, including block co-polymers having repeating hard segments and soft segments, physical crosslinks can be present within the blocks or between the blocks or both within and between the blocks. Particular examples of hard segments include isocyanate segments and polyamide segments. Particular examples of soft segments include polyether segments and polyester segments. As used herein, the polymeric segment can be referred to as being a particular type of polymeric segment such as, for example, an isocyanate segment, a polyamide segment, a polyether segment, a polyester segment, and the like. It is understood that the chemical structure of the segment is derived from the described chemical structure. For example, an isocyanate segment is a polymerized unit including an isocyanate functional group. When referring to a block of polymeric segments of a particular chemical structure, the block can contain up to 10 mol percent of segments of other chemical structures. For example, as used herein, a polyether segment is understood to include up to 10 mol percent of non-polyether segments.

The thermoplastic elastomer can include one or more of a thermoplastic polyester elastomer, a thermoplastic polyurea elastomer, a thermoplastic polyimide elastomer, a thermoplastic polyamide elastomer, a thermoplastic polyether elastomer, a thermoplastic polyurethane elastomer, a thermoplastic polyolefin elastomer, a thermoplastic ionomer elastomer, any copolymer thereof, or any blend thereof. It should be understood that other thermoplastic polymeric materials not specifically described below are also contemplated for use in the coated fiber as described herein and/or the uncoated fiber.

The second thermoplastic composition can include one or more of thermoplastic polyamide elastomers, such as PEBA or polyether block polyamides. The second thermoplastic composition can comprise one or more metallocene-catalyzed block copolymers of ethylene and α-olefins having 4 to about 8 carbon atoms. The second thermoplastic composition can comprise one or more thermoplastic styrene copolymers, including styrene block copolymers such as poly(styrene-butadiene-styrene), poly(styrene-ethylene-co-butylene-styrene), and poly(styrene-isoprene-styrene), and combinations thereof.

The second thermoplastic composition can include at least one thermoplastic polyester, including at least one thermoplastic copolyester. Exemplary, but non-limiting, thermoplastic copolyester elastomers, including thermoplastic copolyesters, that can be used in the disclosed methods, foams, and articles include "HYTREL" 3078, "HYTREL" 4068, and "HYTREL" 4556 (DuPont, Wilmington, Delaware, USA); "PELPRENE" P30B, P40B, and P40H (Toyobo U.S.A. Inc., New York, New York, USA); "TRIEL" 5300, "TRIEL" 5400, and blends thereof (Samyang Corporation, Korea); "KEYFLEX" BT1028D, BT1033D, BT1035D, BT1040D, BT1045D, and BT1047D (LG Chem, Korea); and "KOPEL" KP3340, KP3346, KP3347, KP3942 (Kolon Plastics, Inc., Korea). The polymeric component of second thermoplastic composition (i.e., the component consisting of all the polymers present in the second polymeric material) can comprise at least 80 weight percent of thermoplastic copolyester elastomers, or at least 90 weight percent of thermoplastic copolyester elastomers, or at least 95 weight percent of thermoplastic copolyester elastomers, based on a total weight of the second thermoplastic composition.

The second thermoplastic composition can include one or more thermoplastic polyurethanes (TPUs), such as "FORTIMO" (Mitsui Chemicals, Inc., Tokyo, Japan); "TEXIN" (Covestro LLC, Pittsburgh, Pennsylvania, USA); and "BOUNCELL-X" (Lubrizol Advanced Materials, Inc., Brecksville, Ohio, USA). The polymeric component of second thermoplastic composition (i.e., the component consisting of all the polymers present in the second thermoplastic composition) can comprise at least 80 weight percent of TPU elastomers, or at least 90 weight percent of TPU elastomers, or at least 95 weight percent of TPU elastomers, based on a total weight of the second thermoplastic composition. The second thermoplastic composition can include one or more thermoplastic polyurethane hot-melt adhesives, such as, for example, "NASA-T" hot-melt film (Sambu Fine Chemicals, Gimhae-si, Gyeongsangdam-do, Korea).

The second thermoplastic composition can comprise a blend of one or more thermoplastic polyurethane elastomers with one or more thermoplastic polymers having a different chemical structure. In one aspect, the second thermoplastic composition comprises one or more thermoplastic polyurethane elastomers and one or more ethylene-vinyl alcohol copolymers. In another aspect, the second thermoplastic composition comprises one or more thermoplastic elastomers and one or more thermoplastic polystyrene elastomers, such as, for example, one or more SEBS copolymer elastomers.

The thermoplastic composition can include one or more olefinic polymers. Olefinic polymers can include ethylene-based copolymers, propylene-based copolymers, and butene-based copolymers. The olefinic polymer can be an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene-vinyl alcohol (EVOH) copolymer; an ethylene alkyl acrylate (EAA) copolymer; an ethylene alkyl methacrylate (EAMA) copolymer; any copolymer thereof, and any blend thereof.

The thermoplastic composition can include one or more olefinic polymers. Olefinic polymers can include ethylene-based copolymers, propylene-based copolymers, and butene-based copolymers. In some aspects, the olefinic polymer is an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; any copolymer thereof, and any blend thereof. In some aspects, a ratio of a total parts by weight of the olefinic polymers present in the composition to a total parts by weight of the thermoplastic copolyesters or of the second thermoplastic composition in the composition is about 0.0 to about 0.6, about 0.0 to about 0.4, about 0.01 to about 0.4, or about 0.01 to about 0.6, or about 0.1 to about 0.4.

The thermoplastic composition can include an ethylene-vinyl acetate (EVA) copolymer. The ethylene-vinyl acetate (EVA) copolymer can have a range of vinyl acetate contents, for example about 50 percent to about 90 percent, about 50 percent to about 80 percent, about 5 percent to about 50 percent, about 10 percent to about 45 percent, about 10 percent to about 30 percent, about 30 percent to about 45 percent, or about 20 percent to about 35 percent.

The second thermoplastic composition can include one or more ionomers, such as any of the "SURLYN" polymers (DuPont, Wilmington, Delaware, USA).

The thermoplastic elastomer can have a melting temperature greater than about 110 degrees centigrade and less than about 210 degrees centigrade or less than about 170 degrees centigrade.

The thermoplastic elastomer can have a glass transition temperature less than 50 degrees centigrade, or less than 20 degrees centigrade, or less than 0 degrees centigrade, or less than −10 degrees centigrade, when determined in accordance with ASTM D3418-97 as described herein below.

Thermoplastic Polyurethane Elastomers

The thermoplastic elastomer can be a thermoplastic polyurethane elastomer. The thermoplastic polyurethane elastomer can be a thermoplastic block polyurethane co-polymer. The thermoplastic block polyurethane co-polymer can be a block copolymer having blocks of hard segments and blocks of soft segments. The hard segments can comprise or consist of isocyanate segments. The soft segments can comprise or consist of polyether segments, or polyester segments, or a combination of polyether segments and polyester segments. The thermoplastic material can comprise or consist essentially of an elastomeric thermoplastic polyurethane having repeating blocks of hard segments and repeating blocks of soft segments.

One or more of the thermoplastic polyurethane elastomer can be produced by polymerizing one or more isocyanates with one or more polyols to produce copolymer chains having carbamate linkages (—N(CO)O—) as illustrated below in Formula 7 below,

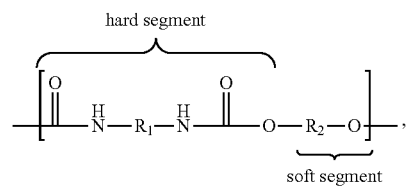

(Formula 7)

where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units). In these aspects, each $R_1$ and $R_2$ independently is an aliphatic or aromatic segment. Optionally, each $R_2$ can be a hydrophilic segment.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent).

Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Additionally, the isocyanates can also be chain extended with one or more chain extenders to bridge two or more isocyanates. This can produce polyurethane copolymer chains as illustrated below in Formula 8,

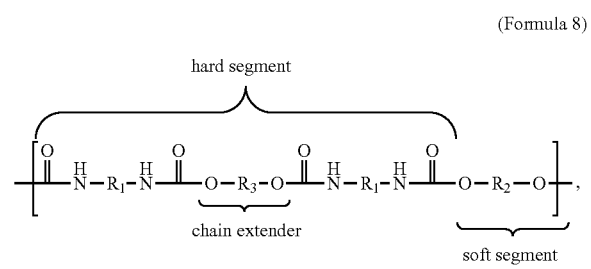

(Formula 8)

wherein $R_3$ includes the chain extender. As with each $R_1$ and $R_3$, each $R_3$ independently is an aliphatic or aromatic segment.

Each segment $R_1$, or the first segment, in Formulas 7 and 8 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5 percent to 85 percent by weight, from 5 percent to 70 percent by weight, or from 10 percent to 50 percent by weight, based on the total weight of the reactant monomers.

In aliphatic aspects (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane copolymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In aromatic aspects (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane copolymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some aspects, the copolymer chains are substantially free of aromatic groups.

The polyurethane copolymer chains can be produced from diisocyanates including HMDI, TDI, MDI, $H_{12}$ aliphatics, and combinations thereof. For example, the coated fiber as described herein of the present disclosure can comprise one or more polyurethane copolymer chains are produced from diisocynates including HMDI, TDI, MDI, $H_{12}$ aliphatics, and combinations thereof.

Commercially available thermoplastic polyurethane elastomers having greater hydrophilicity suitable for the present use include, but are not limited to those under the tradename "TECOPHILIC", such as TG-500, TG-2000, SP-80 A-150, SP-93 A-100, SP-60D-60 (Lubrizol, Countryside, IL), "ESTANE" (e.g., 58238, T470 A-, 2350-75 A-030; Lubrizol, Countryside, IL), and "ELASTOLLAN" (e.g., 9500, B70 A; BASF).

The thermoplastic polyurethane elastomer can be partially covalently crosslinked, as previously described herein.

The second thermoplastic composition can include one or more thermoplastic polyurethanes (TPUs), such as "FORTIMO" (Mitsui Chemicals, Inc., Tokyo, Japan); "TEXIN" (Covestro LLC, Pittsburgh, Pennsylvania, USA); and "BOUNCELL-X" (Lubrizol Advanced Materials, Inc., Brecksville, Ohio, USA). The polymer component of second thermoplastic composition (i.e., the component consisting of all the polymers present in the second thermoplastic composition) can comprise at least 80 weight percent of TPUs, or at least 90 weight percent of TPUs, or at least 95 weight percent of TPUs, based on a total weight of the second thermoplastic composition. The second thermoplastic composition can include one or more thermoplastic polyurethane hot-melt adhesives, such as, for example, "NASA-T" hot-melt film (Sambu Fine Chemicals, Gimhae-si, Gyeongsangdam-do, Korea).

Thermoplastic Block Co-Polyamide Elastomers

In various aspects, the second thermoplastic composition as described herein can comprise one or more thermoplastic elastomers comprising a thermoplastic block co-polyamide elastomer. The thermoplastic block co-polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The block co-polyamide can have repeating blocks of hard segments, and repeating blocks soft segments. The hard segments can comprise polyamide segments, and the soft segments can comprise non-polyamide segments. The thermoplastic elastomer can be an elastomeric thermoplastic co-polyamide comprising or consisting of block co-polyamides having repeating blocks of hard segments and repeating blocks of soft segments. In block co-polymers, including block co-polymers having repeating hard segments and soft segments, physical crosslinks can be present within the blocks or between the blocks or both within and between the blocks.

The polyamide segments of the block co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating blocks. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments.

The co-polyamide can be a block co-polyamide, or can be a random co-polyamide. The thermoplastic copolyamide can be formed from the polycodensation of a polyamide oligomer or prepolymer with a second oligomer prepolymer to form a block copolyamide (i.e., a block co-polymer including polyamide segments). Optionally, the second prepolymer can be a hydrophilic prepolymer.

Exemplary commercially available copolymers include, but are not limited to, those available under the tradenames of VESTAMID® (Evonik Industries); PELATAMID® (Arkema), e.g., product code H2694; PEBAX® (Arkema), e.g., product code "PEBAX MH1657" and "PEBAX MV1074"; PEBAX® RNEW (Arkema); GRILAMID® (EMS-Chemie AG), or also to other similar materials produced by various other suppliers.

Thermoplastic Polyolefin Elastomers

In some aspects, the thermoplastic elastomers can comprise or consist essentially of a thermoplastic polyolefin. Exemplary of thermoplastic polyolefins useful in the disclosed second thermoplastic compositions can include, but are not limited to, thermoplastic olefin elastomers (e.g., metallocene-catalyzed block copolymers of ethylene and α-olefins having 4 to about 8 carbon atoms). The thermoplastic polyolefin can be a polymer comprising an ethylene-α-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary thermoplastic polyolefins useful in the disclosed second thermoplastic compositions are polymers of cycloolefins such as cyclopentene or norbornene.

The polyolefin can be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 wt percent vinyl acetate-derived composition.

The thermoplastic polyolefin can be a mixture of thermoplastic polyolefins, such as a mixture of two or more polyolefins disclosed herein above. For example, a suitable mixture of thermoplastic polyolefins can be a mixture of polypropylene with polyisobutylene, polypropylene with polyethylene (for example PP/HDPE, PP/LDPE) or mixtures of different types of polyethylene (for example LDPE/HDPE).

The thermoplastic polyolefin can be a copolymer of suitable monolefin monomers or a copolymer of a suitable monolefin monomer and a vinyl monomer. Exemplary thermoplastic polyolefin copolymers include, but are not limited to, ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefin can be a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin can be a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

Thermoplastic Ionomer Elastomers

In certain aspects, the thermoplastic elastomer can be one or more ionomeric polymers. The ionomeric polymers can include chain units derived from one or more olefins and chain units derived from one or more ethylenically-unsaturated acid groups. The compositions can also include a plurality of cations ionically crosslink anionic form of the acid groups in the ionomeric copolymers. The compositions can be essentially just the ionomeric copolymers and metal cations. The ionomeric copolymers can have a melt flow index of about 30 or less, about 20 or less, about 15 or less, about 10 or less, or about 5 or less.

The ionomeric copolymers can be terpolymers of ethylene, acrylic acid, and methyl acrylate or butyl acrylate. In some aspects, a ratio Ill of a total parts by weight of the acrylic acid in the ionomeric copolymers to a total weight of the ionomeric copolymers is about 0.05 to about 0.6, about 0.1 to about 0.6, about 0.1 to about 0.5, about 0.15 to about 0.5, or about 0.2 to about 0.5.

The second thermoplastic composition can include one or more ionomers, such as any of the "SURLYN" polymers (DuPont, Wilmington, Delaware, USA.

The second thermoplastic composition can include acrylic block copolymer elastomers, such as block copolymers comprising a first PMMA block, an acrylate block, and a second PMMA block.

Thermoplastic Styrenic Copolymer Elastomers

In certain aspects, the thermoplastic elastomer is a thermoplastic elastomeric styrenic copolymer. Examples of these copolymers include, but are not limited to, styrene butadiene styrene (SBS) block copolymer, a styrene ethylene/butylene styrene (SEBS) resin, a polyacetal resin (POM) or a styrene acrylonitrile resin (SAN). Exemplary commercially available thermoplastic elastomeric styrenic copolymers include MONOPRENE IN5074, SP066070, and SP16975 (Teknor Apex), which are styrene ethylene/butylene styrene (SEBS) resins.

Thermoplastic Vulcanizate Materials

The second thermoplastic composition can include an injection processible thermoplastic vulcanizate (TPV) material. Injection-processible TPV materials are typically cross-linked or partially cross-linked rubbers dispersed into thermoplastic host phases. Exemplary TPV materials include ethylene propylene diene rubber in polypropylene hosts (EPDM/PP), such as "SARLINK" or "SANTOPRENE" TPV materials. Other exemplary TPV materials include alkyl acrylic copolymer rubbers in polyamide hosts (ACM/PA), such as "ZEOTHERM" TPVs. Yet other exemplary TPV materials include silicone rubbers dispersed in "HYTREL" based copolyesters (e.g., so-called TSiPVs).

Additives

In various aspects, the disclosed first thermoplastic composition and second thermoplastic composition can independently further comprise an additive. The additive can be incorporated directly into the disclosed first thermoplastic composition or second thermoplastic composition, or alternatively, applied thereto, prior to foaming the first thermoplastic composition or second thermoplastic composition. Additives that can be used in the disclosed compositions and materials include, but are not limited to, dyes, pigments, colorants, ultraviolet light absorbers, hindered amine light stabilizers, antioxidants, processing aids or agents, plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, fillers, or mixtures of two or more of the foregoing. In some aspects, the additive can be a wax, an anti-oxidant, a UV-absorbing agent, a coloring agent, or combinations thereof.

The additive can be present in an amount from about 0.1 weight percent to about 10 weight percent, or from 0.1 to 6 weight percent, based on the total weight of the first or second thermoplastic composition. In a particular aspect, the additive can be present in the first or second thermoplastic composition in an amount from about 0.1 weight percent to about 4 weight percent, based on a total weight of the first or second thermoplastic composition. The first or second thermoplastic composition can comprise less than 4 weight percent, or less than 3 weight percent, or less than 2 weight percent, or less than 1 weight percent of additives, based on a total weight of the first or second thermoplastic composition.

The first and/or second thermoplastic composition can be essentially free of additives, where the amount of additive is less than about 0.1 weight percent, about 0.08 weight percent, about 0.06 weight percent, about 0.04 weight percent, or about 0.02 weight percent of the first and/or second thermoplastic composition. In another aspect, the first and/or second thermoplastic composition is free of any additives (i.e., contains no additives).

In some instances, an additive can be present in an amount of from about 0.01 weight percent to about 10 weight percent, about 0.025 weight percent to about 5 weight percent, or about 0.1 weight percent to 3 weight percent, where the weight percent is based upon the sum of the material components in the first thermoplastic composition or second thermoplastic composition.

Individual components can be mixed together with the other components of the first thermoplastic composition or second thermoplastic composition in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

The first thermoplastic composition and second thermoplastic composition can independently further comprise a solid non-polymeric material such as a chemical blowing agent, nucleating agent, filler, pigment, or a combination thereof. The solid non-polymeric material can be present in an amount from about 0.05 weight percent to about 20 weight percent based on the total weight of the first thermoplastic composition and/or second thermoplastic composition; about 0.1 weight percent to about 10 weight percent based on the total weight of the first thermoplastic composition and/or second thermoplastic composition; or 0.5 weight percent to about 5 weight percent based on the total weight of the first thermoplastic composition and/or second thermoplastic composition. The first or the second thermoplastic composition can comprise about 5 weight percent or less, or about 3 weight percent or less, or about 2 weight percent or less, or about 1 weight percent or less of solid non-polymeric material, based on the total weight of the first thermoplastic composition and/or second thermoplastic composition. The foamed polymeric material can comprise less than about 5 weight percent, or less than 4 weight percent, or less than 3 weight percent, or less than 2 weight percent, or less than 1 weight percent of solid non-polymeric material, based on the total weight of the first thermoplastic composition and/or second thermoplastic composition.

The first thermoplastic composition and/or second thermoplastic composition can comprise essentially no, or can comprise no non-polymeric materials such as chemical blowing agents, nucleating agents, fillers, pigments, or a combination thereof. In other words, the first thermoplastic composition and/or second thermoplastic composition can be essentially free of non-polymeric materials. In other aspects, the first thermoplastic composition and/or second thermoplastic composition can comprise 5 weight percent or less of a non-polymeric material such as a chemical blowing agent, nucleating agent, filler, pigment, or a combination thereof. The first thermoplastic composition and/or second thermoplastic composition can comprise less than 4 weight percent, less than 3 weight percent, less than 2 weight percent, less than 1 weight percent, less than 0.5 weight percent, less than 0.1 weight percent, less than 0.08 weight percent, less 0.06 weight percent, less than 0.04 weight percent, or less than 0.02 weight percent of non-polymeric material, based on a total weight of the first thermoplastic composition and/or second thermoplastic composition. In other aspects, the first thermoplastic composition and/or second thermoplastic composition is free of (i.e., contains no) non-polymeric material such as a chemical blowing agent, nucleating agent, filler, or a combination thereof.

In some instances, the solid non-polymeric material is a filler. The filler can be a particulate filler. In further aspects, the filler is a carbonaceous filler. The carbonaceous filler can be carbon black, activated carbon, graphite, carbon fibers, carbon fibrils, carbon nanoparticles, or combinations thereof. In various aspects, the carbonaceous filler can be chemically-modified. Alternatively, the filler can be an inorganic filler. The inorganic filler can be an oxide, a hydroxide, a salt, a silicate, a metal, or combinations thereof. Examples of an inorganic filler include, but are not limited to, glass spheres, glass fibers, glass hollow spheres, glass flakes, MgO, $SiO_2$, $Sb_2O_3$, $Al_2O_3$, ZnO, talc, mica, kaolin, wollastonite, or combinations thereof.

Nucleating agents are widely used to modify the properties of various polymers. Nucleating agents can aid in decreasing foam specific gravity, increasing the number of cells present in the foam, and decreasing cell size in the foam by providing a surface for heterogeneous nucleation of gas bubbles from the supercritical fluid state. For the first thermoplastic compositions and second thermoplastic compositions of the present disclosure, nucleating agents can influence the properties of the final foam article by modifying the quantity, distribution and rate of supercritical fluid conversion from a liquid to a gas during the foaming process as lower pressures. The addition of nucleating agents provides a surface on which the supercritical fluid can be transformed from a liquid to a gas. As a consequence, many nucleation sites will result in many gas cell domains. In a particular example, the nucleating agent can include a metal salt of a fatty acid. In some aspects, the nucleating agent is zinc stearate. In some aspects, the composition or material contains about 0.1 weight percent to about 10 weight percent, about 0.1 weight percent to about 5 weight percent, about 0.1 weight percent to about 2 weight percent, or about 0.5 weight percent to about 2 weight percent of the nucleating agent based upon a total weight of the composition or material.

In some aspects, the additive is a nucleating agent such as talcum, metal oxides such as titanium dioxide or magnesium oxide, phosphates, carbonates or sulfates of, preferably, alkaline earth metals, or mixtures thereof. Alternatively, the nucleating agent can be a mono- or polycarboxylic acids, and the salts thereof, e.g., 4-tert-butylbenzoic acid, adipic acid, diphenylacetic acid, sodium succinate, sodium benzoate, or mixtures thereof. In a further aspect, the additive can be a nucleating agent comprising both an inorganic and an organic material as disclosed herein above.

In some aspects, the rheology modifier can be a nanoparticles having comparatively high aspect ratios, nanoclays, nano-carbon, graphite, nano-silica, and the like.

In some aspects, the additive is a filler or reinforcing agent such as clay, kaolin, talc, asbestos, graphite, glass (such as glass fibers, glass particulates, and glass bulbs, spheres, or spheroids), mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), metal hydroxides, particulate synthetic plastics (such as polyethylene, polypropylene, polystyrene, polyamide, polyester, polyurethane, polyimide, and the like), synthetic fibers (such as fibers comprising high molecular weight polyethylene, polypropylene, polystyrene, polyamide, polyester, polyurethane, polyimide, and the like), particulate carbonaceous materials (such as carbon black and the like), wood flour and flours or fibers of other natural products, as well as cotton flock, non-cotton cellulose flock, cellulose pulp, leather fiber, and combinations of any of the above. Non-limiting examples of heavy density filler components that can be used to increase the specific gravity of the cured elastomer composition can include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light density filler components that can be used to decrease the specific gravity of the elastomer compound can include particulate plastics, hollow glass spheres, ceramics, and hollow spheres, regrinds, and foams, which can be used in combinations.

In some examples, the non-polymeric materials can also include a nanofiller. Nanofillers can not only serve as mechanical reinforcement but also nucleating agents. A variety of nanofillers can be used in lieu of or in addition to the zinc stearate. Nanofillers can include nanomaterials having one-dimensional structures such as of plates, laminas and/or shells; two-dimensional structures such as nanotubes and nanofibres having a diameter lower than 0.1 micrometer; or three-dimensional nanostructures such as nanoparticles or beads. Nanoplate fillers can be natural or synthetic clays, as well as phosphates of transition metals. Clay-based nanocomposites generate an overall improvement in physical performances. The most widely used ones are the phyllosilicates. Nanofillers can include nano-oxides such as nanoparticles of Titanium dioxide or Rutile. Other nanofillers can include nanoparticles of alumina or aluminum oxide, diatomite, and nanoscale carbon materials such as single-wall carbon nanotubes (SWCNT) or double-wall carbon nanotubes (DWCNT).

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The terms "comprises," "comprising," "including," and "having," are inclusive and therefore specify the presence of features, steps, operations, elements, and/or components, but do not preclude the presence or addition of one or more other features, steps, operations, elements, components, and/or groups thereof.

As used in the specification and the appended claims, the singular forms "a," "an" and "the" include plural referents unless the context clearly dictates otherwise. Thus, for example, reference to "a foam particle," "a midsole," or "an adhesive," including, but not limited to, two or more such foam particles, midsoles, or adhesives, and the like.

As used herein, the term "and/or" includes any and all combinations of one or more of the associated listed items.

As used herein, in substance or substantially means at least 50 percent, 60 percent, 75 percent, 90 percent, 95 percent, or more, as determined based on weight or volume.

The terms first, second, third, etc. can be used herein to describe various elements, components, regions, layers and/or sections. These elements, components, regions, layers and/or sections should not be limited by these terms. These terms can be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As used herein, the modifiers "upper," "lower," "top," "bottom," "upward," "downward," "vertical," "horizontal," "longitudinal," "transverse," "front," "back" etc., unless otherwise defined or made clear from the disclosure, are relative terms meant to place the various structures or orientations of the structures of the article of footwear in the context of an article of footwear worn by a user standing on a flat, horizontal surface.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

The terms "at least one" and "one or more of" an element are used interchangeably, and have the same meaning that includes a single element and a plurality of the elements, and can also be represented by the suffix "(s)" at the end of the element. For example, "at least one polyamide", "one or more polyamides", and "polyamide(s)" can be used interchangeably and have the same meaning.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

The terms "about" and "substantially" are used herein with respect to measurable values and ranges due to expected variations known to those skilled in the art (e.g., limitations and variabilities in measurements).

As used herein, the terms "optional" or "optionally" means that the subsequently described component, event or circumstance can or cannot occur, and that the description includes instances where said component, event or circumstance occurs and instances where it does not.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

As used herein the terms "percent by weight" or "weight percent," which can be used interchangeably, indicate the weight percent of a given component based on the total weight of the composition or article, unless otherwise specified. That is, unless otherwise specified, all weight percent values are based on the total weight of the composition. It should be understood that the sum of weight percent values for all components in a disclosed composition or formulation or article are equal to 100.

Similarly, the terms "percent by volume" or "volume percent," which can be used interchangeably, indicate the percent by volume of a given component based on the total volume of the composition or article, unless otherwise specified. That is, unless otherwise specified, all volume percent values are based on the total volume of the composition or article. It should be understood that the sum of volume percent values for all components in a disclosed composition or formulation or article are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Unless otherwise specified, temperatures referred to herein are based on atmospheric pressure (i.e. one atmosphere).

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Test Methods

Below are certain sampling procedures and testing methods referenced in the Description and in the Examples.
Sampling Procedures Various properties of the compositions and foams and other articles formed therefrom can be characterized using samples prepared with the following sampling procedures:
a. Neat Sampling Procedure The neat sampling procedure can be used to obtain a neat sample of a foamed or unfoamed first thermoplastic composition, an unfoamed or foamed second thermoplastic composition, or, in some instances, a sample of a material (e.g., polymer) used to form a first thermoplastic composition or second thermoplastic composition. The material can be provided in media form, such as flakes, granules, powders, pellets, and the like. If a source of the first thermoplastic composition or second thermoplastic composition is not available in a neat form, the sample can be cut from another component containing the composition or material, thereby isolating a sample of the composition or material.
b. Plaque Sampling Procedure—Solid Composition or Material The first thermoplastic composition or second thermoplastic composition is molded into a plaque having dimensions of about six inches by about 4 inches and a thickness of about 20 millimeters (or as otherwise specified by the test method). The sample is prepared by mixing together the components of the composition or material, melting the composition or material, pouring, extruding, or injecting the melted composition into a mold cavity, cooling the melted composition or material to solidify it in the mold cavity to form the plaque, and then removing the plaque from the mold cavity.
c. Plaque Sampling Procedure—Foam Composition or Material The foamed first thermoplastic composition or second thermoplastic composition is foamed into a sheet. The skin is removed from a portion of the sheet, and the skinned portion of the sheet is cut into a plaque having dimensions of about six inches by about four inches and a thickness of about 20 millimeter (mm) (or as otherwise specified by the test method).
d. Component Sampling Procedure This procedure can be used to obtain a sample of a foamed or unfoamed composition or material when the composition or material is incorporated into a component such as a sole structure or midsole or outsole of an article of footwear. A sample of the component which includes the composition or material is obtained as formed into the component, or cut from the article of footwear using a blade. This process is performed by separating the component from an associated footwear upper, if present, and removing any materials from the article's top surface (e.g., corresponding to the top surface). For example, the article's top surface can be skinned, abraded, scraped, or otherwise cleaned to remove any upper adhesives, yarns, fibers, foams, and the like that could potentially interfere with the test results.

The resulting component sample includes the composition or material. As such, any test using a Component Sampling Procedure can simulate how the composition or material will perform as part of an article of footwear. As specified by the test method, the component may be tested as a full component (e.g., full midsole component), or it can be extracted as a sample having a certain geometry. A sample of a component is taken at a location along the component that provides a substantially constant thickness for the component (within plus or minus 10 percent of the average thickness), such as in a forefoot region, mid-foot region, or a heel region of the article. Unless otherwise specified, the desired harvested geometry is a cylindrical puck with a 45-millimeter diameter and a cylinder height of at least about 10 millimeters, preferably from about 20 to 25 millimeters. Compression testing of the harvested component samples should be tested along the length of the cylinder using compression platens that are at least twice the diameter of the cylindrical puck sample.
Solid Polymer, Thermoplastic Copolyester Composition, and Second Thermoplastic Composition Characterization.
Glass Transition Temperature, Melting Temperature, and Crystallization Temperature Test Dynamic scanning calorimetry (DSC) is performed on samples prepared using the Neat Sampling Procedure, or on a portion of a sample prepared using the Plaque Sampling Procedure or the Component Sampling Procedure. The test is conducted using a DSC system such as a TA instruments Q2000. 10-30 mg samples are cycled from negative 90 degrees centigrade to 225 degrees centigrade at a rate of 20 degrees centigrade/min and cooled to negative 90 degrees centigrade at a rate of 10 degrees centigrade/min. Each sample is run in duplicate. The melting temperature, crystallization temperature, and glass transition temperature values are recorded from the second cycle. The melt, crystallization, or glass transition "peak" is identified as the local maximum of the second heating cycle. If there was more than one melt peak in the DSC curve, the melt peak occurring at hotter temperatures was chosen as the injecting or foaming temperature reference. The tail was identified as the intersection of the tangent of the line of the higher temperature side of the melt peak with the extrapolated baseline. A schematic illustrating the method for determining peak and tail temperatures is shown in FIG. 8.

Cyclic Tensile Test

The cyclic tensile testing is carried out on solid samples prepared using the Plaque Sampling Procedure or the Component Sampling Procedure, having a dog-bone shape as described in ASTM D638 with a 2 mm thickness. In the test, the specimen is placed under a pre-load of 5 N. Strain is controlled to extend the sample to an extension 6 percent at a strain rate of 5 Hz. The stiffness is the load at 6 percent strain divided by the extension at 6 percent strain, giving a value in N/mm. The maximum load (N) observed over the test cycle of 500 cycles is also recorded.

Melt Flow Index Test

The melt flow index is determined using a sample prepared using the Neat Sampling Procedure, or on a portion of a sample prepared using the Plaque Sampling Procedure or the Component Sampling Procedure, according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the sample is loaded into the barrel of the melt flow apparatus, which has been heated to a specified temperature of 210 degrees centigrade, 220 degrees centigrade, or 230 degrees centigrade. A weight of 2.16 kilograms is applied to a plunger and the molten sample is forced through the die. A timed extrudate is collected and weighed. Melt flow rate values are calculated in g/10 min, and are reported with the specified temperature (i.e., 210, 220 or 230 degrees centigrade) and the weight applied to the plunger (i.e., 2.15 kilograms).

Solid Polymer Abrasion Test (Akron)

Abrasion loss is tested on a sample sheet having a thickness of 3 millimeters, prepared using the Plaque Sampling procedure or the Component Sampling Procedure. The sample sheet is adhered onto an Akron abrasion test specimen with JIS-A hardness of 70 by using an adhesive to prepare a test specimen. Abrasion loss in volume is measured by using an Akron abrasion test machine at a load of 27N, an inclination angle of 15 degree, a preliminary abrasion of 500 times and a test abrasion of 1,000 times according to JIS K6254. The mass and/or volume of the sample is measured before and after the test, with the difference being the abrasion loss. The smaller the abrasion loss volume or mass, the better the abrasion resistance.

Solid Polymer Abrasion Test (DIN)

Abrasion loss is tested on samples cut from sheets having a minimum thickness of 6 millimeters to 12 millimeters, prepared using the Plaque Sampling Procedure or the Component Sampling Procedure. The cut samples have a cylindrical shape with a diameter of 16 millimeters plus or minus 0.2 millimeters and a minimum thickness of 6 mm to 12 mm cut from sheets using an ASTM standard hole drill. The abrasion loss is measured using Method B of ASTM D 5963-97a on a standard abrasion test machine such as a Gotech GT-7012-D abrasion test machine. The tests are performed at 22 degrees centigrade with an abrasion path of 40 meters. The sample is abraded with a standard sandpaper such as VSM-VITEX-KK511X-60P sandpaper (commercially available from VSM Abrasives Corp.), using an abrasion load of 10 Newton. The mass and/or volume of the sample is measured before and after the test, with the difference being the abrasion loss. The smaller the abrasion loss, the better the abrasion resistance of the material.

Solid Polymer Coefficient of Friction Test (Wet & Dry)

This test measures the coefficient of friction of the Coefficient of Friction Test for a sample (e.g., taken with the above-discussed Component Sampling Procedure, Plaque Sampling Procedure, or the Neat Sampling Procedure). The sample is cut into a rectangular shape measuring approximately 3.0 inches by 3.3 inches, and having a thickness of about 2 millimeters. The sample is permanently adhered to a 1 centimeter thick piece of EVA foam having a density of approximately 0.25 grams/cubic centimeters and having a Durometer hardness of 50 C.

For a dry test (i.e., to determine a dry-state coefficient of friction), the sample is initially equilibrated at 25 degree C. and 20 percent humidity for 24 hours. For a wet test (i.e., to determine a wet-state coefficient of friction), the sample is fully immersed in a deionized water bath maintained at 25 degree C. for 24 hours. After that, the sample is removed from the bath and blotted with a cloth to remove surface water.

The measurement is performed with an aluminum sled mounted on a test track, which is used to perform a sliding friction test for test sample on the surface of the test track. The surface of the test track may include a specified test track material, such as aluminum, wood court surface (wet or dry), smooth concrete surface (wet or dry). The test track measures 127 millimeters wide by 610 millimeters long. The aluminum sled measures 76.2 millimeters by 76.2 millimeters, with a 9.5 millimeter radius cut into the leading edge. The contact area of the aluminum sled with the track is 76.2 millimeters by 66.6 millimeters, or 5,100 square millimeters).

The dry or wet sample is attached to the bottom of the sled using a room temperature-curing two-part epoxy adhesive such as the adhesive commercially available under the tradename "LOCTITE 608" from Henkel, Dusseldorf, Germany. The adhesive is used to maintain the planarity of the wet sample, which can curl when saturated. A polystyrene foam having a thickness of about 25.4 millimeters is attached to the top surface of the sled (opposite of the test sample) for structural support.

The sliding friction test is conducted using a screw-driven load frame. A tow cable is attached to the sled with a mount supported in the polystyrene foam structural support, and is wrapped around a pulley to drag the sled across the aluminum test track. The sliding or frictional force is measured using a load transducer with a capacity of 2,000 Newtons. The normal force is controlled by placing weights on top of the aluminum sled, supported by the foam structural support, for a total sled weight of 1000 Newtons). The crosshead of the test frame has a speed of 0.4 meters/second, and the total test displacement is 250 millimeters. The coefficient of friction is calculated based on the steady-state force parallel to the direction of movement required to pull the sled at constant velocity. The coefficient of friction itself is found by dividing the steady-state pull force by the applied normal force. Any transient value relating static coefficient of friction at the start of the test is ignored.

Ply Adhesion Testing

Ply adhesion testing determines the adhesion between two bonded plies of material (e.g., a thermoplastic copolyester composition and a second thermoplastic composition) using a tensile testing device such as an Instron Electropuls E10000 (Instron, Norwood, Massachusetts, USA). Sample plies of each material may be provided using the Neat Sampling Procedure or the Plaque Sampling Procedure or Component Sampling Procedure, and the plies are thereafter bonded using a specified method. Alternatively, a sample of bonded plies may be provided by using the Component Sampling Procedure. On one end of the sample, the bond between the plies is carefully separated to provide approximately 0.5 centimeter unbonded length that may be inserted into the crossheads of the tensile testing device. A first ply is inserted into a first grip of the tensile tester, and a second ply is inserted into a second grip of the tensile tester so that the sample between the grips is substantially straight. The crosshead speed is set to 50 millimeters per minute. The peel strength is measured throughout the separation of the bonded sample until the bond fully separates or the sample fails. The force per peel distance is reported (kilograms force/centimeter), and the mode of failure (either adhesive or cohesive) is recorded for each sample.

Foam Characterization.

Density Test

The density is measured for samples taken using the Plaque Sampling Procedure, or the Component Sampling Procedure, using a digital balance or a Densicom Tester (Qualitest, Plantation, Florida, USA). For each sample a sample volume is determined in cubic centimeters, and then each sample is weighed (g). The density of the sample is the mass divided by the sample volume, given in grams/cubic centimeters.

Specific Gravity Test

The specific gravity (SG) is measured for samples taken using the Plaque Sampling Procedure, or the Component Sampling Procedure, using a digital balance or a Densicom Tester (Qualitest, Plantation, Florida, USA). Each sample is weighed (g) and then is submerged in a distilled water bath (at 22 degrees centigrade plus or minus 2 degrees centigrade). To avoid errors, air bubbles on the surface of the samples are removed, e.g., by wiping isopropyl alcohol on the sample before immersing the sample in water, or using a brush after the sample is immersed. The weight of the sample in the distilled water is recorded. The specific gravity is calculated with the following formula:

$$S.G. = \frac{\text{Weight of the sample in air (g)}}{\text{Weight of sample in air (g)} - \text{Weight of sample in water (g)}}$$

Water Uptake Test

This test measures the water uptake capacity of a foam sample after a soaking duration of 5 minutes. A 1-centimeter core sample is removed from a foam sample prepared using the Plaque Sampling Procedure or Component Sampling Procedure, starting from the side wall of the foamed article, e.g., the midsole of an article of footwear. The core is then cut to provide a cylindrical sample having a 1-centimeter cylinder height, ensuring that the side wall remains as part of the core sample. The sample is conditioned in an oven for 24 hours at 50 degrees centigrade plus or minus 3 degrees centigrade. After conditioning, the sample is cooled for 30 minutes in a lab environment at a temperature of 22 degrees centigrade plus or minus 2 degrees centigrade, and then is immediately weighed, and the weight recorded in grams ($W\_0$). The surface of the side wall is masked with masking tape, while all other surfaces are sealed with a nonpermeable coating. When the surfaces are fully coated, the sidewall surface is unmasked. The coated sample is then conditioned in an oven for 24 hours at 50 degrees centigrade plus or minus 3 degrees centigrade, cooled for 30 minutes in a lab environment at a temperature of 22 degrees centigrade plus or minus 2 degrees centigrade, and then is immediately weighed and the weight recorded in grams ($W\_i$). The dried sample is fully immersed in a deionized water bath maintained at 22 degrees centigrade plus or minus 2 degrees centigrade, for a duration of 2 hours. After the soaking duration, the sample is removed from the deionized water bath, blotted with a cloth to remove surface water, and the total weight of the soaked sample ($W\_f$) is measured in grams ($W\_f$). The water uptake for the time period is calculated as follows:

$$\text{Water Uptake Capacity} = \frac{W\_f - W\_i}{W\_i} \times 100\%$$

Force/Displacement Test (Cyclic Compression Test)

Force/displacement behavior for the foams and the foamed articles is measured using samples having a diameter of 45 millimeters and a thickness of at least 10 millimeters (preferably 20 to 25 millimeters) prepared using the Plaque Sampling Procedure or the Component Sampling Procedure with a cyclic compression testing device such an Instron Electropuls E10000 (Instron, Norwood, Massachusetts, USA) with a stainless steel circular cross section impact geometry having a diameter at least twice the diameter of the foam sample (e.g., for a 45-millimeter diameter sample, a 90-millimeter diameter platen). Each sample is compressed to 50% strain at 5 Hz for 500 cycles. Stiffness, efficiency, and energy return are measured from the force vs. displacement curves for cycles 200, 300, 400, and 500. Stiffness of a particular foam sample is the stress at the maximum strain divided by the maximum strain, giving a value in kPa or N/mm. Efficiency of a foam sample is the integral of the unloading force-displacement curve divided by the integral of the loading force-displacement curve. Energy return of a foam sample is the integral of the unloading force-displacement curve, giving a value in mJ. The reported value for each metric is the average of each metric between cycles 200, 300, 400, and 500. All fatigue metrics are defined as relative differences in properties at the end of the test compared to the same properties at the beginning of the test (i.e., cycle 1).

In some cases, a full midsole is tested using a footform for impact instead of a cylindrical tupp to more accurately simulate full gate loading. For these tests, a US mens size 10 midsole is tested, and a mens size 9 footform used for impact, with a load of 2000N being applied to the midsole with the footform at a loading rate of 5 Hz. All of the metrics from the footform test are collected and analyzed as described above.

As with when a cylindrical tupp is used, when a footform is used, energy input is taken as the integral of the force-displacement curve during compression force loading. Energy return is taken as the integral of the force displacement curve during unloading. Hysteresis is taken as the ratio: (energy return)/(energy input), which can also be viewed as the energy efficiency of the foam. Fatigue behavior is judged by changes in the foam displacement at the max load of a cycle. All measured properties: stiffness, hysteresis, and fatigue are measured for thousands of cycles for both running and walking compression cycles.

Durometer Hardness Test—Shore A

The test used to obtain the hardness values for the foam articles is as follows. A flat foam sample is prepared using the Plaque Sampling Procedure or the Component Sampling Procedure, where the sample has a minimum of 6 mm thick for Shore A durometer testing. If necessary, samples are stacked to make up the minimum thickness. Samples are large enough to allow all measurements to be performed at a minimum of 12 mm from the edge of the sample and at least 12 mm from any other measurement. Regions tested are flat and parallel with an area at least 6 mm in diameter. A minimum of five hardness measurements are taken and tested using a 1 kilogram head weight.

Split Tear Test

The split tear test can determine the internal tear strength for a foam material. A sample may be provided either using the Plaque Sampling Procedure or the Component Sampling Procedure. The sample is die cut into a rectangular shape having a width of 1.54 centimeters and a length of 15.24 centimeters (1 inch by 6 inches), and having a thickness of 10 millimeters, plus or minus 1 millimeter. On one end, a cut is made into the sample that bisects the thickness, the cut extending the full width of the sample, and 3 centimeters from the end of the sample. Starting from the end of the cut, 5 marks are placed along the length of the sample spaced 2 centimeters apart. The cut ends of the sample are placed in the clamps of a tensile tester. Each section of the sample is held in a clamp in such a manner that the original adjacent cut edges form a straight line joining the centers of the clamps. The crosshead speed is set to 50 millimeters per minute. The tear strength is measured throughout the separation of the crossheads. If necessary, a sharp knife may be used to keep separating the foam in the center of the sample, discarding the readings caused by cutting of the knife. The lowest split tear strength values are recorded for each of the five marked segments of the sample (between each of the 2-centimeter markings). An average split tear strength value is recorded for each sample. If a segment of a sample has an air bubble measuring more than 2 millimeters, the tear strength for the segment is discarded, and the air bubble recorded as a test defect. If more than one segment of a sample has an air bubble measuring more than 2 millimeters, the entire sample is discarded.

Hand Pull Test

The hand pull test can evaluate the bond strength between two foams, compositions or materials, such as between a solid and a foam or between two different foams. Depending upon the bonding method used, a sample of two pre-bonded foams, compositions or materials may be provided either using the Plaque Sampling Procedure or the Component Sampling Procedure. Alternatively, separate samples of a foam, a composition or a material can be prepared using the Plaque Sampling Procedure or the Component Sampling Procedure, and then can be bonded together using the bonding method to be evaluated. The sample is die cut into a rectangular shape having a width of 1.54 centimeters and a length of 15.24 centimeters (1 inch by 6 inches), and having a thickness of 10 millimeters, plus or minus 1 millimeter. On one end, a cut is made into the sample that bisects the thickness, the cut extending the full width of the sample, and 3 centimeters from the end of the sample. Starting from the end of the cut, 5 marks are placed along the length of the sample spaced 2 centimeters apart. The cut ends of the sample are held in the tester's hand and pulled at a rate of approximately 50 millimeters per minute. If necessary, a sharp knife may be used to keep separating the material in the center of the sample, discarding the readings caused by cutting of the knife. Tear strength values are recorded for each of the five marked segments of the sample (between each of the 2-centimeter markings), using the following scoring rubric: easy to peel or adhesive failure is given a score of 1; an adhesive failure but some resistance is given a score of 2; cohesive foam failure is given a score of 3 to 4.5 based on the accompanying level of foam skin failure, where 3 is the highest level of foam skin failure and 4.5 is the lowest level of foam skin failure; and unable to separate is given a score of 5. The scores for each segment are averaged to give value recorded for each sample. If a segment of a sample has an air bubble measuring more than 2 millimeters, the tear strength for the segment is discarded, and the air bubble recorded as a test defect. If more than one segment of a sample has an air bubble measuring more than 2 millimeters, the entire sample is discarded.

Aspects

The following listing of exemplary aspects supports and is supported by the disclosure provided herein.

Aspect 1. A foam comprising a thermoplastic multicellular foam having an open cell foam microstructure, an average cell size of from about 50 micrometers to about 500 micrometers, and a specific gravity of about 0.15 to about 0.25;
  wherein the first foam compositionally comprises a first thermoplastic composition comprising one or more copolyesters; and
  wherein the first thermoplastic composition of the first foam is free or essentially free of nucleating agents, or is free or essentially free of fillers, or is free or essentially free of both nucleating agents and fillers.

Aspect 2. A foam comprising a thermoplastic multicellular foam having an open cell foam microstructure, an average cell size of from about 50 micrometers to about 500 micrometers, and a specific gravity of about 0.15 to about 0.25;
  wherein the first foam compositionally comprises a first thermoplastic composition comprising one or more copolyesters;
  wherein the first foam is the physically foamed product of a single-phase solution of a supercritical fluid and the first thermoplastic composition in a molten state; and
  wherein the first thermoplastic composition of the first foam is free or essentially free of nucleating agents, or is free or essentially free of fillers, or is free or essentially free of both nucleating agents and fillers.

Aspect 3. The foam of Aspects 1-2, wherein the foam is produced by the method comprising: forming a single-phase solution of the first thermoplastic composition comprising the one or more thermoplastic copolyesters and the supercritical fluid, wherein the first thermoplastic composition is molten in the single-phase solution;
  injecting the single-phase solution into a mold cavity, the single-phase solution having an injection temperature during the injecting;
  reducing pressure in the mold cavity and foaming the molten first thermoplastic composition, the single-phase solution having a foaming temperature during the foaming, thereby forming a first foam, wherein the first foam is a thermoplastic multicellular foam having an open cell foam microstructure;
  solidifying the first foam; and removing the solidified first foam from the mold cavity, forming the cushioning element.

Aspect 4. The foam of any one of Aspects 1-3, wherein the supercritical fluid comprises supercritical carbon dioxide or supercritical nitrogen.

Aspect 5. The foam of any one of Aspects 1-4, wherein the supercritical fluid is present in the single-phase solution in an amount of about 1 percent to about 3 percent by weight based on upon a total weight of the single-phase solution.

Aspect 6. The foam of any one of Aspects 1-5, wherein the foaming temperature is from about the melting temperature of the thermoplastic copolyester as determined by dynamic scanning calorimetry to about 50 degrees C. above the tail temperature of the thermoplastic copolyester as determined by dynamic scanning calorimetry.

Aspect 7. The foam of any one of Aspects 1-6, wherein the thermoplastic copolyester is a block copolymer; a segmented copolymer; a random copolymer; or a condensation copolymer.

Aspect 8. The foam of any one of Aspects 1-7, wherein the thermoplastic copolyester has a weight average molecular weight of about 50,000 Daltons to about 1,000,000 Daltons.

Aspect 9. The foam of any one of Aspects 1-8, wherein the thermoplastic copolyester has a weight average molecular weight of about 50,000 Daltons to about 500,000 Daltons; about 75,000 Daltons to about 300,000 Daltons; or about 100,000 Daltons to about 200,000 Daltons.

Aspect 10. The foam of any one of Aspects 1-9, wherein the thermoplastic copolyester has a ratio of first segments to third segments from about 1:1 to about 1:5 based on the weight of each of the first segments and the third segments.

Aspect 11. The foam of any one of Aspects 1-10, wherein the thermoplastic copolyester has a ratio of first segments to third segments from about 1:1 to about 1:3 or about 1:1 to about 1:2 based on the weight of each of the first segments and the third segments.

Aspect 12. The foam of any one of Aspects 1-11, wherein the thermoplastic copolyester has a ratio of second segments to third segments from about 1:1 to about 1:3 based on the weight of each of the first segments and the third segments.

Aspect 13. The foam of any one of Aspects 1-12, wherein the thermoplastic copolyester has a ratio of second segments to third segments from about 1:1 to about 1:2 or about 1:1 to about 1:1.52 based on the weight of each of the first segments and the third segments.

Aspect 14. The foam of any one of Aspects 1-13, wherein the first segments derived from a dihydroxy-terminated polydiol comprise segments derived from a poly(alkylene oxide)diol having a number-average molecular weight of about 250 Daltons to about 6000 Daltons.

Aspect 15. The foam of Aspect 14, wherein the number-average molecular weight is about 400 Daltons to about 6,000 Daltons; about 350 Daltons to about 5,000 Daltons; or about 500 Daltons to about 3,000 Daltons.

Aspect 16. The foam of any one of Aspects 14-15, wherein the poly(alkylene oxide)diol is poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof.

Aspect 17. The foam of Aspect 16, wherein the poly(alkylene oxide)diol is poly(ethylene ether)diol; poly(propylene ether)diol; poly(tetramethylene ether)diol; poly(pentamethylene ether)diol; or poly(hexamethylene ether)diol.

Aspect 18. The foam of Aspect 16, wherein the poly(alkylene oxide)diol is poly(tetramethylene ether)diol.

Aspect 19. The foam of any one of Aspects 1-18, wherein the second segments derived from a diol comprise a diol having a molecular weight of less than about 250.

Aspect 20. The foam of Aspect 19, wherein the diol is a C2-C8 diol.

Aspect 21. The foam of Aspect 20, wherein the second segments derived from a diol comprise a diol selected from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof.

Aspect 22. The foam of Aspect 21, wherein the diol is selected from 1,2-ethanediol, 1,3-propanediol, 1,4-butanediol, 1,6-hexanediol, and mixtures thereof.

Aspect 23. The foam of any one of Aspects 1-22, wherein the third segments derived from an aromatic dicarboxylic acid comprise an aromatic C5-C16 dicarboxylic acid.

Aspect 24. The foam of Aspect 23, wherein the aromatic C5-C16 dicarboxylic acid has a molecular weight less than about 300 Daltons or about 120 Daltons to about 200 Daltons.

Aspect 25. The foam of Aspect 23, wherein the aromatic C5-C16 dicarboxylic acid is terephthalic acid, phthalic acid, isophthalic acid, or a derivative thereof.

Aspect 26. The foam of Aspect 25, wherein the aromatic C5-C16 dicarboxylic acid is terephthalic acid or the dimethyl ester derivative thereof.

Aspect 27. The foam of any one of Aspects 1-26, wherein the first thermoplastic composition of the first foam further comprises a non-polymeric component comprising all non-polymeric ingredients present in the first thermoplastic composition, and the non-polymeric component makes up less than 5 weight percent, less than 4 weight percent, less than 3 weight percent, less than 2 weight percent, less than 1 weight percent, or less than 0.5 weight percent of the first thermoplastic composition based on a total weight of the first thermoplastic composition.

Aspect 28. The foam of any one of Aspects 1-27, wherein the first thermoplastic composition of the first foam comprises a polymeric component comprising all polymers present in the first thermoplastic composition, and the polymeric component makes up at least 95 weight percent of the first thermoplastic composition based on a total weight of the first thermoplastic composition.

Aspect 29. The foam of any one of Aspects 1-28, wherein the first thermoplastic composition of the first foam comprises a polymeric component comprising all polymers present in the first thermoplastic composition, and the polymeric component makes up at least 97 weight percent, at least 98 weight percent, or at least 99 weight percent of the first thermoplastic composition based on a total weight of the first thermoplastic composition.

Aspect 30. The foam of any one of Aspects 1-29, wherein the first thermoplastic composition of the first foam comprises a polymeric component comprising all polymers present in the first thermoplastic composition, and, in addition to the one or more copolyesters, the polymeric component further comprises a polyester, a polyolefin, or both.

Aspect 31. The foam of any one of Aspects 1-30, wherein the first thermoplastic composition of the first foam comprises a polymeric component comprising all polymers present in the first thermoplastic composition, and the polymeric component consists essentially of the one or more copolyesters.

Aspect 32. The foam of any one of Aspects 1-31, wherein the thermoplastic copolyester comprises
- a plurality of first segments, each first segment derived from a dihydroxy-terminated polydiol;
- a plurality of second segments, each second segment derived from a diol; and
- a plurality of third segments, each third segment derived from an aromatic dicarboxylic acid.

Aspect 33. The foam of any one of Aspects 1-32, wherein the one or more thermoplastic copolyesters comprise at least one thermoplastic copolyester elastomer.

Aspect 34. The foam of any one of Aspects 1-33, wherein the thermoplastic copolyester comprises,
(a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

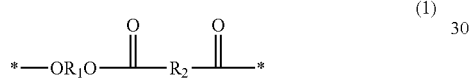

wherein $R_1$ is a group remaining after removal of terminal hydroxyl groups from the poly(alkylene oxide) diol of the first segment, wherein the poly (alkylene oxide) diol of the first segment is a poly (alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the the second copolyester unit has a structure represented by a formula 2:

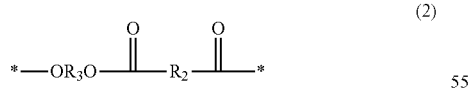

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

Aspect 35. The foam of Aspect 34, wherein the first copolyester unit has a structure represented by a formula 3:

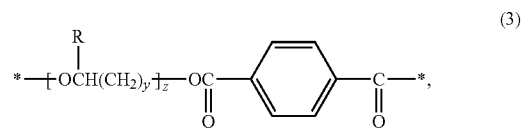

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons.

Aspect 36. The foam of Aspect 35, wherein y is an integer having a value of 1, 2, 3, 4, or 5.

Aspect 37. The foam of Aspect 35 or 36, wherein R is hydrogen; wherein R is methyl; wherein
R is hydrogen and y is an integer having a value of 1, 2, or 3; or wherein R is methyl and y is an integer having a value of 1.

Aspect 38. The foam of Aspect 35, wherein the first copolyester unit has a structure represented by a formula 4:

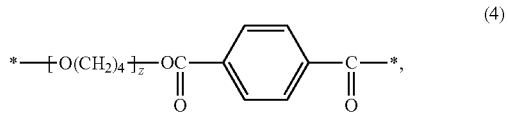

wherein z is an integer having a value from 2 to 60; and wherein a weight average molecular weight of each of the plurality of first copolyester units is from about 300 Daltons to about 7,000 Daltons.

Aspect 39. The foam of any one of Aspects 35-38, wherein z is an integer having a value from 5 to 60; from 5 to 50; from 5 to 40; from 4 to 30; from 4 to 20; or from 2 to 10.

Aspect 40. The foam of any one of Aspects 35-39, wherein the weight average molecular weight of each of the plurality of first copolyester units is from about 400 Daltons to about 6,000 Daltons; from about 400 Daltons to about 5,000 Daltons; from about 400 Daltons to about 4,000 Daltons; from about 400 Daltons to about 3,000 Daltons; from about 500 Daltons to about 6,000 Daltons; from about 500 Daltons to about 5,000 Daltons; from about 500 Daltons to about 4,000 Daltons; from about 500 Daltons to about 3,000 Daltons; from about 600 Daltons to about 6,000 Daltons; from about 600 Daltons to about 5,000 Daltons; from about 600 Daltons to about 4,000 Daltons; from about 600 Daltons to about 3,000 Daltons.

Aspect 41. The foam of any one of Aspects 35-40, wherein the second copolyester unit has a structure represented by a formula 5:

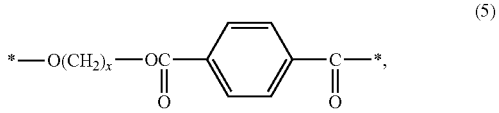

wherein x is an integer having a value from 1 to 20.

Aspect 42. The foam of Aspect 41, wherein x is an integer having a value from 2 to 18; a value from 2 to 17; a value from 2 to 16; a value from 2 to 15; a value from 2 to 14; a value from 2 to 13; a value from 2 to 12; a value from 2 to 11; a value from 2 to 10; a value from 2 to 9; a value from 2 to 8; a value from 2 to 7; a value from 2 to 6; or a value of 2, 3, or 4.

Aspect 43. The foam of Aspect 41, wherein the second copolyester unit has a structure represented by a formula 6:

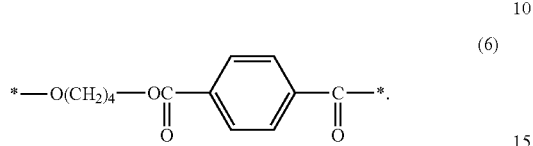

(6)

Aspect 44. The foam of any one of Aspects 1-43, wherein the thermoplastic copolyester comprises a weight percent of the plurality of first copolyester units based on total weight of the thermoplastic copolyester of about 30 weight percent to about 80 weight; about 40 weight percent to about 80 weight percent; about 50 weight percent to about 80 weight percent; about 30 weight percent to about 70 weight percent; about 40 weight percent to about 70 weight percent; or about 50 weight percent to about 70 weight percent.

Aspect 45. The foam of any one of Aspects 1-44, wherein the thermoplastic copolyester comprises a weight percent of the plurality of second copolyester units based on total weight of the thermoplastic copolyester of about 40 weight percent to about 65 weight percent; about 45 weight percent to about 65 weight percent; about 50 weight percent to about 65 weight percent; about 55 weight percent to about 65 weight percent; about 40 weight percent to about 60 weight percent; about 45 weight percent to about 60 weight percent; about 50 weight percent to about 60 weight percent; or about 55 weight percent to about 60 weight percent.

Aspect 46. The foam of any one of Aspects 1-45, wherein the thermoplastic copolyester comprises a weight percent of the plurality of second copolyester units based on total weight of the thermoplastic copolyester of about 40 weight percent to about 65 weight percent.

Aspect 47. The foam of any one of Aspects 1-46, wherein the thermoplastic copolyester has a ratio of first segments to third segments from about 1:1 to about 1:5 based on the weight of each of the first segments and the third segments, or wherein the thermoplastic copolyester has a ratio of second segments to third segments from about 1:1 to about 1:3 based on the weight of each of the first segments and the third segments.

Aspect 48. The foam of any one of Aspects 1-47, wherein the thermoplastic copolyester has a weight average molecular weight of about 50,000 Daltons to about 1,000,000 Daltons.

Aspect 49. The foam of any one of Aspects 1-48, wherein the thermoplastic copolyester composition further comprises an additive.

Aspect 50. The foam of Aspect 49, wherein the additive is present in an amount from about 0.1 weight percent to about 10 weight percent based on the total weight of the foamed polymeric material.

Aspect 51. The foam of Aspects 49 or 50, wherein the additive is a wax, an anti-oxidant, a UV-absorbing agent, a coloring agent, or combinations thereof.

Aspect 52. The foam of any one of Aspects 1-51, wherein the thermoplastic copolyester composition consists essentially of one or more thermoplastic copolyester.

Aspect 53. The foam of any one of Aspects 1-52, further comprising at least one ionomer.

Aspect 54. The foam of any one of Aspects 1-53, further comprising at least one thermoplastic polyurethane.

Aspect 55. The foam of any one of Aspects 1-54, wherein the thermoplastic copolyester composition is substantially free of a thermoplastic polyamide polymer, include polyamide copolymers such as polyether block amide copolymers.

Aspect 56. The foam of any one of Aspects 1-55, wherein the thermoplastic copolyester composition is substantially free of a thermoplastic polyolefin polymers, including polyethylene and polypropylene and/or polyolefin copolymers such as ethylene-vinyl acetate copolymers.

Aspect 57. The foam of any one of Aspects 1-56, wherein the thermoplastic copolyester has a zero shear viscosity when determined using a cyclic tensile test as described herein of about 10 to about 10,000 pascal-second; about 100 to about 7,000 pascal-second; or about 1,000 to about 5,000 pascal-second.

Aspect 58. The foam of any one of Aspects 1-57, wherein the first thermoplastic composition of the first foam further comprises one or more dyes or pigments.

Aspect 59. The foam of Aspects 1-58, wherein the first thermoplastic composition of the first foam comprises 5 weight percent or less, 4 weight percent or less, 3 weight percent or less, 2 weight percent or less, or 1 weight percent or less of dyes or pigments.

Aspect 60. The foam of any one of Aspects 1-59, wherein the first thermoplastic composition of the first foam is substantially free of dyes or pigments.

Aspect 61. The foam of any one of Aspects 1-60, wherein the single-phase solution is free or essentially free of chemical blowing agents, and the first foam is free or essentially free of chemical blowing agent decomposition products.

Aspect 62. The foam of any one of Aspects 1-61, wherein the multicellular foam does not include a chemical foaming agent, or a decomposition product of a chemical foaming agent.

Aspect 63. The foam of Aspect 62, wherein the chemical foaming agent comprises an inorganic substance.

Aspect 64. The foam of Aspect 62, wherein the chemical foaming agent comprises an organic substance.

Aspect 65. The foam of any one of Aspects 1-63, wherein the single-phase solution is essentially free of crosslinking agents.

Aspect 66. The foam of any one of Aspects 1-64, wherein the multicellular foam structure comprises less than 10 percent of cells having a closed cell microstructure.

Aspect 67. The foam of any one of Aspects 1-64, wherein the multicellular foam structure comprises less than 5 percent of cells having a closed cell microstructure.

Aspect 68. The foam of any one of Aspects 1-64, wherein the multicellular foam structure comprises less than 1 percent of cells having a closed cell microstructure.

Aspect 69. The foam of any one of Aspects 1-68, wherein the multicellular foam has an average cell size of from about 50 micron to about 5 millimeters; from about 100 micron to about 1 millimeters; or from about 50 micron to about 1 millimeters.

Aspect 70. The foam of any one of Aspects 1-69, wherein up to 80% of the open cells in the first foam have an average diameter of from about 50 micrometers to about 200 micrometers.

Aspect 71. The foam of any one of Aspects 1-70, wherein the first foam has a split tear greater than or equal to about 2.0 kg/cm, or an energy efficiency greater than or equal to about 60 percent, or both.

Aspect 72. A method for making a foam article, the method comprising:
forming a mixture of molten first thermoplastic composition comprising a thermoplastic elastomer and a blowing agent;
injecting the mixture into a mold cavity;
foaming the molten first thermoplastic composition, thereby forming a foamed molten first thermoplastic composition;
solidifying the foamed molten first thermoplastic composition thereby forming a multicellular foam article having a multicellular foam structure; and removing the foam article from the mold cavity.

Aspect 73. The method of Aspect 72, wherein the blowing agent is a physical blowing agent.

Aspect 74. The method of Aspect 73, wherein the physical blowing agent is a supercritical fluid.

Aspect 75. The method of Aspect 74, wherein the supercritical fluid comprises nitrogen, or a supercritical fluid thereof.

Aspect 76. The method of Aspect 75, wherein the supercritical fluid comprises or consists essentially of nitrogen, or a supercritical fluid thereof.

Aspect 77. The method of Aspect 75, wherein the supercritical fluid further comprises carbon dioxide, or a supercritical fluid thereof.

Aspect 78. The method of Aspect 75, wherein the carbon dioxide is present in an amount of about 1% to about 3% or about 1% to about 5% by weight based on upon a total weight of the mixture.

Aspect 79. The method of any one of Aspects 75-78, wherein the nitrogen is present in an amount of about 1% to about 3% or about 1% to about 5% by weight based on upon a total weight of the mixture.

Aspect 80. The method of any one of Aspects 72-79, wherein the forming the mixture of the molten first thermoplastic composition and the physical blowing agent comprises adding the physical blowing agent to the molten first thermoplastic composition and forming a single phase solution of the physical blowing agent dissolved in the molten first thermoplastic composition.

Aspect 81. The method of any one of Aspects 72-79, wherein the forming the mixture of the molten first thermoplastic composition and the physical blowing agent comprises infusing a solid resin comprising the polymeric material with the physical blowing agent to form infused resin, and melting the infused resin to form a single phase solution of the physical blowing agent dissolved in the molten first thermoplastic composition.

Aspect 82. The method of any one of Aspects 72-81, wherein the injecting the mixture into the mold cavity comprises injecting the mixture into a pressurized mold cavity, the pressurized mold cavity having a first pressure greater than atmospheric pressure; and the foaming the molten first thermoplastic composition comprises decreasing the first pressure to a second pressure and initiating formation of gas bubbles by the physical blowing agent, thereby foaming the molten first thermoplastic composition.

Aspect 83. The method of any one of Aspects 72-82, wherein the injecting the mixture into the mold cavity comprises injecting the mixture into a pressurized mold cavity having a first pressure greater than atmospheric pressure.

Aspect 84. The method of Aspect 83, wherein the method comprises applying a gas counter pressure to the mold cavity of from about 100 psi to about 3,000 psi, or from about 550 psi to about 1500 psi, or from about 650 psi to about 1000 psi, and wherein the gas counter pressure is applied to the mold cavity before the foaming.

Aspect 85. The method of Aspect 82, wherein the second pressure is atmospheric pressure; and
wherein decreasing the first pressure to the second pressure comprises venting the pressurized mold cavity to atmospheric pressure.

Aspect 86. The method of Aspect 82, wherein the second pressure is atmospheric pressure; and
wherein decreasing the first pressure to the second pressure comprises using a controlled rate of pressure decrease until the mold cavity has a pressure essentially equal to atmospheric pressure.

Aspect 87. The method of Aspect 86, wherein the controlled rate of pressure decrease is from about 10 psi per sec to about 600 psi per sec, or from about 15 psi per sec to about 300 psi per sec, or from about 20 psi per sec to about 150 psi per sec.

Aspect 88. The method of any one of Aspects 72-87, wherein the foam article is substantially free of a chemical blowing agent or a decomposition product thereof.

Aspect 89. The method of any one of Aspects 72-88, wherein the mixture has an injection temperature; and wherein the injection temperature is from about the melting temperature of the first thermoplastic composition to about 50 degrees C. above the tail temperature of the first thermoplastic composition.

Aspect 90. The method of Aspect 89, wherein the injection temperature is from about the melting temperature of the first thermoplastic composition to a temperature that is above the tail temperature of the first thermoplastic composition by about 0 degrees C., 5 degrees C., 10 degrees C., 15 degrees C., 20 degrees C., 25 degrees C., 30 degrees C., 35 degrees C., 40 degrees C., 45 degrees C., or 50 degrees C.

Aspect 91. The method of any one of Aspects 72-90, wherein the foaming occurs at a foaming temperature; and wherein the foaming temperature is from about the melting temperature of the thermoplastic elastomer to about 50 degrees C. above the tail temperature of the thermoplastic elastomer.

Aspect 92. The method of Aspect 91, wherein the foaming temperature is from about the melting temperature of the first thermoplastic composition to a temperature that is above the tail temperature of the first thermoplastic composition by about 0 degrees C., 5 degrees C., 10 degrees C., 15 degrees C., 20 degrees C., 25 degrees C., 30 degrees C., 35 degrees C., 40 degrees C., 45 degrees C., or 50 degrees C.

Aspect 93. The method of any one of Aspects 72-92, wherein the foam article is a thermoplastic foam article.

Aspect 94. The method of any one of Aspects 72-93, wherein the solidifying comprises cooling the mold cavity; or wherein the solidifying comprises cooling the foamed first thermoplastic composition.

Aspect 95. The method of any one of Aspects 72-94, wherein the foaming comprises releasing pressure from the mold cavity at a mold cavity pressure release rate.

Aspect 96. The method of Aspect 95, wherein the mold cavity pressure release rate is about 10 psi per sec to about 600 psi per sec, or about 15 psi per sec to about 300 psi per sec, or about 20 psi per sec to about 150 psi per sec.

Aspect 97. The method of any one of Aspects 72-96, wherein the foaming comprises providing a gas counter pressure to the mold cavity.

Aspect 98. The method of Aspect 97, wherein the gas counter pressure is at least about 550 psi, about 550 psi to about 1500 psi, or about 650 psi to about 1000 psi.

Aspect 99. The method of Aspect 98, wherein the blowing agent is a physical blowing agent; or
wherein the blowing agent is supercritical nitrogen.

Aspect 100. The method of any one of Aspects 72-99, the method further comprising placing a textile element in the mold cavity prior to injecting the mixture, and foaming the molten first thermoplastic composition in contact with the textile element.

Aspect 101. The method of Aspect 100, wherein the textile element comprises thermoplastic polyester fibers, thermoplastic polyester yarns, thermoplastic polyurethane fibers, thermoplastic polyurethane yarns, thermoplastic polyamide fibers, thermoplastic polyamide yarns, or combinations thereof.

Aspect 102. The method of Aspects 100 or 101, wherein the textile element is a component for an upper for an article of footwear.

Aspect 103. The method of any one of Aspects 72-102, wherein the foam article is a component of an article of footwear.

Aspect 104. The method of Aspect 103, wherein the foam article is a midsole.

Aspect 105. The method of any one of Aspects 72-103, wherein the foam article is a component of an article of apparel.

Aspect 106. The method of any one of Aspects 72-103, wherein the foam article is a component of an article of sporting equipment.

Aspect 107. The method of any one of Aspects 72-106, wherein the injecting comprises monitoring an injection pressure of the mixture prior or during the injecting, and controlling the injecting based on the injection pressure of the mixture.

Aspect 108. The method of any one of Aspects 72-106, wherein the injecting comprises controlling the injection temperature of the mixture prior to the mixture entering the mold cavity.

Aspect 109. The method of any one of Aspects 72-106, wherein the injecting comprises controlling a mold cavity temperature prior to the mixture entering the mold cavity.

Aspect 110. The method of any one of Aspects 72-109, wherein the mixture has an expansion ratio of 1 as compared to a volume of the mold cavity.

Aspect 111. The method of any one of Aspects 72-109, wherein, following removing the foam article from the mold cavity, cooling the foam article to about 25 degrees C., and equilibrating the foam article at about 25 degrees C. and about 1 atm of pressure, a volume of the equilibrated foam article is within plus or minus 5 percent of a volume of the mold cavity.

Aspect 112. The method of any one of Aspects 72-111, wherein the multicellular foam article comprises less than 1 percent of cells having a closed cell microstructure.

Aspect 113. The method of any one of Aspects 72-112, wherein the multicellular foam article has an average cell size of from about 50 micron to about 5 millimeters; from about 100 micron to about 1 millimeters; or from about 50 micron to about 1 millimeters.

Aspect 114. The method of any one of Aspects 72-113, wherein the multicellular foam article does not include a chemical foaming agent.

Aspect 115. The method of Aspect 114, wherein the chemical foaming agent comprises an inorganic substance.

Aspect 116. The method of Aspect 115, wherein the chemical foaming agent comprises an organic substance.

Aspect 117. The method of any one of Aspects 72-116, wherein the thermoplastic copolyester is a block copolymer; a segmented copolymer; a random copolymer; or a condensation copolymer.

Aspect 118. The method of any one of Aspects 72-117, wherein the thermoplastic copolyester has a weight average molecular weight of about 50,000 Daltons to about 1,000,000 Daltons.

Aspect 119. The method of Aspect 118, wherein the thermoplastic copolyester has a weight average molecular weight of about 50,000 Daltons to about 500,000 Daltons; about 75,000 Daltons to about 300,000 Daltons; or about 100,000 Daltons to about 200,000 Daltons.

Aspect 120. The method of any one of Aspects 72-119, wherein the thermoplastic copolyester has a ratio of first segments to third segments from about 1:1 to about 1:5 based on the weight of each of the first segments and the third segments.

Aspect 121. The method of Aspect 120, wherein the thermoplastic copolyester has a ratio of first segments to third segments from about 1:1 to about 1:3 or about 1:1 to about 1:2 based on the weight of each of the first segments and the third segments.

Aspect 122. The method of any one of Aspects 72-121, wherein the thermoplastic copolyester has a ratio of second segments to third segments from about 1:1 to about 1:3 based on the weight of each of the first segments and the third segments.

Aspect 123. The method Aspect 122, wherein the thermoplastic copolyester has a ratio of second segments to third segments from about 1:1 to about 1:2 or about 1:1 to about 1:1.52 based on the weight of each of the first segments and the third segments.

Aspect 124. The method of any one of Aspects 72-123, wherein the first segments derived from a dihydroxy-terminated polydiol comprise segments derived from a poly(alkylene oxide)diol having a number-average molecular weight of about 250 Daltons to about 6000 Daltons.

Aspect 125. The method of Aspect 124, wherein the number-average molecular weight is about 400 Daltons to about 6,000 Daltons; about 350 Daltons to about 5,000 Daltons; or about 500 Daltons to about 3,000 Daltons.

Aspect 126. The method of any one of Aspects 124-125, wherein the poly(alkylene oxide)diol is poly(ethylene ether)diol; poly(propylene ether)diol; poly(tetramethylene ether)diol; poly(pentamethylene ether)diol; poly (hexamethylene ether)diol; poly(heptamethylene ether)diol; poly(octamethylene ether)diol; poly(nonamethylene ether)diol; poly(decamethylene ether)diol; or mixtures thereof.

Aspect 127. The method of Aspect 126, wherein the poly(alkylene oxide)diol is poly(ethylene ether)diol; poly(propylene ether)diol; poly(tetramethylene ether)diol; poly(pentamethylene ether)diol; or poly(hexamethylene ether)diol.

Aspect 128. The method of Aspect 126, wherein the poly(alkylene oxide)diol is poly(tetramethylene ether)diol.

Aspect 129. The method of any one of Aspects 72-128, wherein the second segments derived from a diol comprise a diol having a molecular weight of less than about 250.

Aspect 130. The method of Aspect 129, wherein the diol is a C2-C8 diol.

Aspect 131. The method of Aspect 130, wherein the second segments derived from a diol comprise a diol selected from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof.

Aspect 132. The method of Aspect 130, wherein the diol is selected from 1,2-ethanediol, 1,3-propanediol, 1,4-butanediol, 1,6-hexanediol, and mixtures thereof.

Aspect 133. The method of any one of Aspects 72-132, wherein the third segments derived from an aromatic dicarboxylic acid comprise an aromatic C5-C16 dicarboxylic acid.

Aspect 134. The method of Aspect 133, wherein the aromatic C5-C16 dicarboxylic acid has a molecular weight less than about 300 Daltons or about 120 Daltons to about 200 Daltons.

Aspect 135. The method of Aspect 133, wherein the aromatic C5-C16 dicarboxylic acid is terephthalic acid, phthalic acid, isophthalic acid, or a derivative thereof.

Aspect 136. The method of Aspect 135, wherein the aromatic C5-C16 dicarboxylic acid is terephthalic acid or the dimethyl ester derivative thereof.

Aspect 137. The method of any one of Aspects 72-136, wherein the thermoplastic copolyester comprises,
a. a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

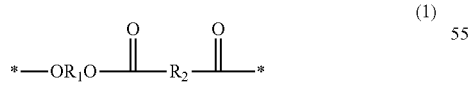

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and b. a plurality of second copolyester units, each second copolyester unit of the plurality comprising the second segment derived from a diol and the third segment derived from an aromatic dicarboxylic acid, wherein the second copolyester unit has a structure represented by a formula 2:

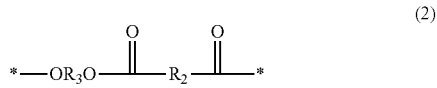

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

Aspect 138. The method of Aspect 137, wherein the first copolyester unit has a structure represented by a formula 3:

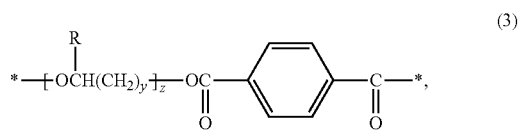

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons.

Aspect 139. The method of Aspect 138, wherein y is an integer having a value of 1, 2, 3, 4, or 5.

Aspect 140. The method of Aspect 138 or 139, wherein R is hydrogen; wherein R is methyl;
wherein R is hydrogen and y is an integer having a value of 1, 2, or 3; or wherein R is methyl and y is an integer having a value of 1.

Aspect 141. The method of Aspect 137, wherein the first copolyester unit has a structure represented by a formula 4:

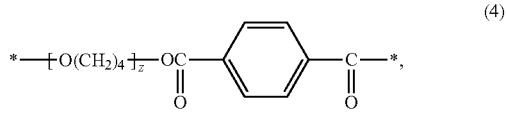

wherein z is an integer having a value from 2 to 60; and wherein a weight average molecular weight of each of the plurality of first copolyester units is from about 300 Daltons to about 7,000 Daltons.

Aspect 142. The method of any one of Aspects 137-141, wherein z is an integer having a value from 5 to 60; from 5 to 50; from 5 to 40; from 4 to 30; from 4 to 20; or from 2 to 10.

Aspect 143. The method of any one of Aspects 137-142, wherein the weight average molecular weight of each of the plurality of first copolyester units is from about 400 Daltons to about 6,000 Daltons; from about 400

Daltons to about 5,000 Daltons; from about 400 Daltons to about 4,000 Daltons; from about 400 Daltons to about 3,000 Daltons; from about 500 Daltons to about 6,000 Daltons; from about 500 Daltons to about 5,000 Daltons; from about 500 Daltons to about 4,000 Daltons; from about 500 Daltons to about 3,000 Daltons; from about 600 Daltons to about 6,000 Daltons; from about 600 Daltons to about 5,000 Daltons; from about 600 Daltons to about 4,000 Daltons; from about 600 Daltons to about 3,000 Daltons.

Aspect 144. The method of any one of Aspects 137-143, wherein the second copolyester unit has a structure represented by a formula 5:

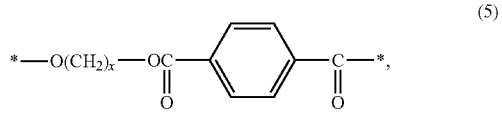

(5)

wherein x is an integer having a value from 1 to 20.

Aspect 145. The method of Aspect 144, wherein x is an integer having a value from 2 to 18; a value from 2 to 17; a value from 2 to 16; a value from 2 to 15; a value from 2 to 14; a value from 2 to 13; a value from 2 to 12; a value from 2 to 11; a value from 2 to 10; a value from 2 to 9; a value from 2 to 8; a value from 2 to 7; a value from 2 to 6; or a value of 2, 3, or 4.

Aspect 146. The method of Aspect 144, wherein the second copolyester unit has a structure represented by a formula 6:

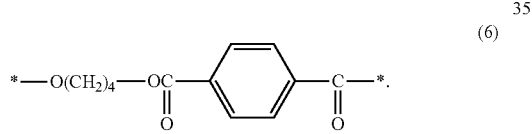

(6)

Aspect 147. The foam of any one of Aspects 137-146, wherein the thermoplastic copolyester comprises a weight percent of the plurality of first copolyester units based on total weight of the thermoplastic copolyester of about 30 weight percent to about 80 weight; about 40 weight percent to about 80 weight percent; about 50 weight percent to about 80 weight percent; about 30 weight percent to about 70 weight percent; about 40 weight percent to about 70 weight percent; or about 50 weight percent to about 70 weight percent.

Aspect 148. The method of any one of Aspects 72-147, wherein the thermoplastic copolyester comprises a weight percent of the plurality of second copolyester units based on total weight of the thermoplastic copolyester of about 40 weight percent to about 65 weight percent; about 45 weight percent to about 65 weight percent; about 50 weight percent to about 65 weight percent; about 55 weight percent to about 65 weight percent; about 40 weight percent to about 60 weight percent; about 45 weight percent to about 60 weight percent; about 50 weight percent to about 60 weight percent; or about 55 weight percent to about 60 weight percent.

Aspect 149. The method of any one of Aspects 72-148, wherein the thermoplastic copolyester composition further comprises an additive.

Aspect 150. The method of Aspect 149, wherein the additive is present in an amount from about 0.1 weight percent to about 10 weight percent based on the total weight of the foamed polymeric material.

Aspect 151. The method of Aspects 149 or 150, wherein the additive is a wax, an anti-oxidant, a UV-absorbing agent, a coloring agent, or combinations thereof.

Aspect 152. The method of any one of Aspects 72-151, wherein the thermoplastic copolyester composition consists essentially of one or more thermoplastic copolyester.

Aspect 153. The method of any one of Aspects 72-151, further comprising at least one ionomer.

Aspect 154. The method of any one of Aspects 72-151, further comprising at least one thermoplastic polyurethane.

Aspect 155. The method of any one of Aspects 72-154, wherein the thermoplastic copolyester composition is substantially free of a thermoplastic polyamide polymer, include polyamide copolymers such as polyether block amide copolymers.

Aspect 156. The method of any one of Aspects 72-154, wherein the thermoplastic copolyester composition is substantially free of a thermoplastic polyolefin polymers, including polyethylene and polypropylene and/or polyolefin copolymers such as ethylene-vinyl acetate copolymers.

Aspect 157. The method of any one of Aspects 72-156, wherein the thermoplastic copolyester has a zero shear viscosity when determined using a cyclic tensile test as described herein of about 10 to about 10,000 pascal-second; about 100 to about 7,000 pascal-second; or about 1,000 to about 5,000 pascal-second.

Aspect 158. The method of any one of Aspects 72-157, wherein the foam article has a maximum load of about 100 N to about 4000 N when determined using the Cyclic Tensile test as described herein.

Aspect 159. The method of Aspect 158, wherein the foam article has a maximum load of about 100 N to about 4000 N when determined using the Cyclic Tensile test as described herein.

Aspect 160. The method of any one of Aspects 72-159, wherein the foam article has an energy efficiency of greater than or equal to about 50 percent when determined using the Cyclic Compression test as described herein.

Aspect 161. The foam article of Aspect 160, wherein the foam article has an energy efficiency of greater than or equal to about 60 percent when determined using the Cyclic Compression test as described herein.

Aspect 162. The method of Aspect 160, wherein the foam article has an energy efficiency of greater than or equal to about 70 percent when determined using the Cyclic Compression test as described herein.

Aspect 163. The method of Aspect 160, wherein the foam article has an energy efficiency of about 50 percent to about 97 percent when determined using the Cyclic Compression test as described herein.

Aspect 164. The method of any one of Aspects 72-163, wherein the foam article has an energy return of about 200 millijoules (mJ) to 1200 mJ when determined using the Cyclic Compression test as described herein.

Aspect 165. The method of Aspect 164, wherein the foam article has an energy return of about 400 mJ to 1000 mJ when determined using the Cyclic Compression test as described herein.

Aspect 166. The method of Aspect 164, wherein the foam article has an energy return of about 600 mJ to 800 mJ when determined using the Cyclic Compression test as described herein.

Aspect 167. The method of any one of Aspects 72-166, wherein the foam article has a split tear value of about 1.0 kilogram per centimeter to 4.5 kilogram per centimeter, about 1.6 kilogram per centimeter to 4.0 kilogram per centimeter, about 2.0 kilogram per centimeter to 4.0 kilogram per centimeter, about 2.0 kilogram per centimeter to 3.5 kilogram per centimeter, about 2.5 kilogram per centimeter to 3.5 kilogram per centimeter, about 0.07 kilogram per centimeter to 2.0 kilogram per centimeter, or about 0.8 kilogram per centimeter to 1.5 kilogram per centimeter, or about 0.9 to 1.2 kilogram per centimeter, about 1.5 kilogram per centimeter to 2.2 kilogram per centimeter; about 0.08 kilogram per centimeter to 4.0 kilogram per centimeter, about 0.9 kilogram per centimeter to 3.0 kilogram per centimeter, about 1.0 to 2.0 kilogram per centimeter, about 1.0 kilogram per centimeter to 1.5 kilogram per centimeter, or about 2 kilogram per centimeter using a split tear test as described herein.

Aspect 168. The method of any one of Aspects 72-167, wherein the foam article has a split tear value of greater than or equal to about 1.5 kg/cm, greater than or equal to about 2.0 kg/cm, or greater than or equal to about 2.5 kg/cm, when determined using a split tear test as described herein.

Aspect 169. The method of any one of Aspects 72-168, wherein the foam article has a specific gravity of less than or equal to 0.9, less than or equal to 0.7, less than or equal to 0.5, or less than or equal to 0.3.

Aspect 170. The foam article of Aspect 169, wherein the foam article has a specific gravity of from about 0.02 to about 0.22; of from about 0.03 to about 0.12; from about 0.04 to about 0.10; from about 0.11 to about 0.12; from about 0.10 to about 0.12; from about 0.15 to about 0.2; 0.15 to about 0.30; 0.01 to about 0.10; from about 0.02 to about 0.08; from about 0.03 to about 0.06; 0.08 to about 0.15; from about 0.10 to about 0.12; from about 0.15 to about 0.2; from about 0.10 to about 0.12; from about 0.1 to about 0.35; from about 0.12 to about 0.20; from about 0.02 to about 0.22; from about 0.02 to about 0.20; from about 0.02 to about 0.18; or from about 0.02 to about 0.16.

Aspect 171. The method of any one of Aspects 72-170, wherein the foam article has a stiffness of about 200 kilopascals to about 1000 kilopascals, for a cylindrical sample having a diameter of about 45 millimeters as determined using the Cyclic Compression Test.

Aspect 172. The method of Aspect 171, wherein the foam article has a stiffness of about 400 kilopascals to about 900 kilopascals, for a cylindrical sample having a diameter of about 45 millimeters as determined using the Cyclic Compression Test.

Aspect 173. The method of any one of Aspects 72-172, wherein the foam article has a change in displacement at max loading of about 1 millimeters to about 5 millimeters when measured on foam slabs having a thickness of about 1 centimeter, wherein the foam slabs are compressed for about 5000 cycles of compression from 0 newtons to 300 newtons and back to 0 N per cycle, using a 45 mm diameter cylindrical tupp as the compression head.

Aspect 174. The method of any one of Aspects 72-172, wherein the foam article has a change in displacement at max loading of about 2 millimeters to about 4 millimeters when measured on foam slabs having a thickness of about 1 centimeters, wherein the foam slabs are compressed for about 5000 cycles of compression from 0 newtons to 300 newtons and back to 0 newtons per cycle, using a 45 mm diameter cylindrical tupp as the compression head.

Aspect 175. The method of any one of Aspects 72-174, further comprising disposing a layer comprising a second thermoplastic composition on an exterior surface of the foam article.

Aspect 176. The method of Aspect 175, further comprising a step of removing the foam article from the mold cavity following the disposing step.

Aspect 177. The method of Aspect 175, further comprising a step of removing the foam article from the mold cavity before the disposing step.

Aspect 178. The method of any one of Aspects 175-177, wherein the thermoplastic composition comprises a thermoplastic elastomer or thermoplastic vulcanizate material for use a type of ground contact, reinforcing skin, containment layer, outsole, rand, or other application.

Aspect 179. The method of any one of Aspects 175-178, wherein the second thermoplastic composition comprises a thermoplastic elastomer (TPE) from polymer chemical families such as copolyesters, thermoplastic polyurethanes (TPU), styrenic copolymers like styrene butadiene rubbers (SBRs), styrene ethylene butadiene styrene (SEBSs), styrene ethylene propylene styrene (SEPS), ethylenic copolymers such as ethylene-propylene copolymers, olefinic block copolymers, Surlyns and other ionomers, and/or acrylic copolymer elastomers wherein they are block copolymers comprised of PMMA blocks—acrylate blocks—PMMA blocks, etc, Aspect 180. The method of any one of Aspects 175-179, wherein the second thermoplastic composition is comprised of an injection processible thermoplastic vulcanizate (TPV) material, which are typically cross-linked or partially cross-linked rubbers dispersed into thermoplastic host phases, such as an ethylene propylene diene rubber in polypropylene (EPDM/PP) where examples include Sarlink or Santoprene TPV tradenames, or alkyl acrylic copolymer rubbers in polyamide hosts (ACM/PA) where examples include Zeotherm TPVs, or silicone rubbers dispersed in Hytrel based copolyesters (e.g. so called TSiPVs)

Aspect 181. The method of any one of Aspects 175-180, wherein the second thermoplastic composition if used as a solid polymer material without the addition of compressed gas, supercritical fluid or other blowing agent has a durometer less than Shore A 90, optionally less than Shore A 85, and preferably less than Shore A 80, but greater than Shore A 60, and optionally greater than Shore A 65.

Aspect 182. The method of any one of Aspects 175-181, wherein the thermoplastic composition if used as a solid polymer is comprised of TPEs or TPVs with densities less than 1.25 g/cc, optionally less than 1.1 g/cc, or less than 0.95 g/cc and preferably less than 0.9 g/cc.

Aspect 183. The method of any one of Aspects 175-182, wherein the second thermoplastic composition is produced separately via injection molding with or without the addition of compressed gas, supercritical fluids or other blowing agents upon which the foam article is produced or injected via overmolding.

Aspect 184. The method of any one of Aspects 175-183, wherein the second thermoplastic composition (TPE or TPV) is extruded into a fused deposition 3D printing filament of 1.5 mm, 1.75 mm, 1.85 mm, 2.85 mm 3.0 mm, or other relevant diameter for deposition and attachment to foamed article comprised of the first thermoplastic composition in such a way that it comprises the ground contact layer, print-on outsole, or other exterior features.

Aspect 185. The method of Aspect 184, wherein the second thermoplastic composition was produced via sequential injection in the same process, or wherein the second thermoplastic composition was produced in a separate process, and subsequently inserted into the mold after which foam article from the first thermoplastic composition is over molded.

Aspect 186. The method of any one of Aspects 175-185, wherein the second thermoplastic composition is produced separately via injection molding with only sufficient compressed gas, supercritical fluids or other blowing agents to achieve a density of 0.9 g/cc or less, 0.85 g/cc or less, or 0.8 g/cc or less.

Aspect 187. The method of any one of Aspects 175-185, wherein the second thermoplastic composition is a film or an outsole or a rand that is pretreated with a plasma or corona treatment prior to receiving an overmolding assembly method.

Aspect 188. The method of any one of Aspects 175-187, wherein the second thermoplastic composition is a film or an outsole or a rand that is pretreated with a primer alone, or a primer plus and an adhesive prior to receiving the overmolding assembly method described in Aspects above.

Aspect 189. The method of any one of Aspects 175-188, wherein the ply adhesion strength between the second thermoplastic composition and the first thermoplastic composition comprising overmolded foam article exceeds 2.5 kilogram force per centimeter.

Aspect 190. The method of Aspect 189, wherein the ply adhesion strength between the second thermoplastic composition and the first thermoplastic composition comprising the foam article exceeds 3.0 kilogram force per centimeter.

Aspect 191. The method of any one of Aspects 72-190, wherein the foam article comprises greater than about 90 weight percent of the thermoplastic copolyester based on the total weight of the first thermoplastic composition.

Aspect 192. The method of Aspect 191, wherein the foam article comprises greater than about 95 weight percent of the thermoplastic copolyester based on the total weight of the first thermoplastic composition.

Aspect 193. The method of Aspect 191, wherein the foam article comprises greater than about 97 weight percent of the thermoplastic copolyester based on the total weight of the first thermoplastic composition.

Aspect 194. The method of Aspect 191, wherein the foam article comprises greater than about 98 weight percent of the thermoplastic copolyester based on the total weight of the first thermoplastic composition.

Aspect 195. The method of Aspect 191, wherein the foam article comprises greater than about 99 weight percent of the thermoplastic copolyester based on the total weight of the first thermoplastic composition.

Aspect 196. A foam article comprising a foamed polymeric material comprising the foam of any one of Aspects 1-71; wherein the foam article has a multicellular foam structure.

Aspect 197. The foam article of Aspect 196, wherein the foam article is an extruded foam article.

Aspect 198. The foam article of Aspect 196, wherein the foam article is an injection molded foam article.

Aspect 199. The foam article of Aspect 198, wherein the foam article is a compression molded foam article.

Aspect 200. The foam article of any one of Aspects 196-199, wherein the multicellular foam structure has a closed cell foam microstructure.

Aspect 201. The foam article of any one of Aspects 196-200, wherein the multicellular foam structure comprises less than 5 percent of cells having a closed cell microstructure.

Aspect 202. The foam article of any one of Aspects 196-200, wherein the multicellular foam structure comprises less than 1 percent of cells having a closed cell microstructure.

Aspect 203. The foam article of any one of Aspects 196-202, wherein the multicellular foam has an average cell size of from about 50 micron to about 5 millimeters; from about 100 micron to about 1 millimeters; or from about 50 micron to about 1 millimeters.

Aspect 204. The foam article of any one of Aspects 196-203, wherein the foam article has a ply adhesion strength between the polymeric layer and the foam component that is greater than 2.5 kg force/centimeter or greater than 3.0 kg force/centimeter, when determined using the Ply Adhesion Test method described herein.

Aspect 205. The foam article of any one of Aspects 196-204, wherein the foam article has an average hand pull test result between the polymeric layer and the foam component that is greater than or equal to 2.0, or greater than or equal to 2.5, or greater than or equal to 3.0, or greater than or equal to 3.5, or greater than or equal to 4.0, or greater than or equal to 4.5, when determined according to the Hand Pull Test method described herein.

Aspect 206. The foam article of any one of Aspects 196-205, wherein the layer has an Akron abrasion of less than 0.50 cubic centimeters lost, optionally less than 0.40 cubic centimeters lost, less than 0.30 cubic centimeters lost, less than 0.20 cubic centimeters lost, or less than 0.10 cubic centimeters lost as determined using the Akron Abrasion Test.

Aspect 207. The foam article of any one of Aspects 196-206, wherein the layer has an Akron abrasion of less than 500 milligrams lost, optionally less than 400 milligrams lost, less than 300 milligrams lost, less than 200 milligrams lost, or less than 100 milligrams lost as determined using the Akron Abrasion Test.

Aspect 208. The foam article of any one of Aspects 196-207, wherein the layer has a DIN abrasion of less than 0.30 cubic centimeters lost, optionally less than 0.20 cubic centimeters lost, less than 0.10 cubic centimeters lost, less than 0.05 cubic centimeters lost, or less than 0.03 cubic centimeters lost as determined using the DIN Abrasion Test.

Aspect 209. The foam article of any one of Aspects 196-208, wherein the layer has a DIN abrasion of less than 300 milligrams lost, optionally less than 250 milligrams lost, optionally less than 200 milligrams lost, optionally less than 150 milligrams lost, optionally less than 100 milligrams lost, optionally less than 80 milligrams lost, optionally less than 50 milligrams lost, or optionally less than 30 milligrams as determined using the DIN Abrasion Test.

Aspect 210. The foam article of any one of Aspects 196-209, wherein the layer has a dry dynamic coefficient of friction (COF) on a dry surface of greater than 0.5, optionally of greater than 0.7, greater than 0.8, greater than 0.9, greater than 1.0, as determined using the Dry Outsole Coefficient of Friction Test.

Aspect 211. The foam article of any one of Aspects 206-210, wherein the layer has a wet dynamic COF of greater than 0.25, optionally of greater than 0.30, greater than 0.35, greater than 0.40, or greater than 0.50, as determined using the Wet Outsole Coefficient of Friction Test.

Aspect 212. The foam article of any one of Aspects 196-211, wherein the foam article has a maximum load of about 100 N to about 4000 N when determined using the Cyclic Tensile test as described herein.

Aspect 213. The foam article of Aspect 212, wherein the foam article has a maximum load of about 100 N to about 4000 N when determined using the Cyclic Tensile test as described herein.

Aspect 214. The foam article of any one of Aspects 196-213, wherein the foam article has an energy efficiency of greater than or equal to about 50 percent when determined using the Cyclic Compression test as described herein.

Aspect 215. The foam article of Aspect 214, wherein the foam article has an energy efficiency of greater than or equal to about 60 percent when determined using the Cyclic Compression test as described herein.

Aspect 216. The foam article of Aspect 214, wherein the foam article has an energy efficiency of greater than or equal to about 70 percent when determined using the Cyclic Compression test as described herein.

Aspect 217. The foam article of Aspect 214, wherein the foam article has an energy efficiency of about 50 percent to about 97 percent when determined using the Cyclic Compression test as described herein.

Aspect 218. The foam article of any one of Aspects 196-217, wherein the foam article has an energy return of about 200 millijoules (mJ) to 1200 mJ when determined using the Cyclic Compression test as described herein.

Aspect 219. The foam article of Aspect 218, wherein the foam article has an energy return of about 400 mJ to 1000 mJ when determined using the Cyclic Compression test as described herein.

Aspect 220. The foam article of Aspect 218, wherein the foam article has an energy return of about 600 mJ to 800 mJ when determined using the Cyclic Compression test as described herein.

Aspect 221. The foam article of any one of Aspects 196-220, wherein the foam article has a split tear value of about 1.0 kilogram per centimeter to 4.5 kilogram per centimeter, about 1.6 kilogram per centimeter to 4.0 kilogram per centimeter, about 2.0 kilogram per centimeter to 4.0 kilogram per centimeter, about 2.0 kilogram per centimeter to 3.5 kilogram per centimeter, about 2.5 kilogram per centimeter to 3.5 kilogram per centimeter, about 0.07 kilogram per centimeter to 2.0 kilogram per centimeter, or about 0.8 kilogram per centimeter to 1.5 kilogram per centimeter, or about 0.9 to 1.2 kilogram per centimeter, about 1.5 kilogram per centimeter to 2.2 kilogram per centimeter; about 0.08 kilogram per centimeter to 4.0 kilogram per centimeter, about 0.9 kilogram per centimeter to 3.0 kilogram per centimeter, about 1.0 to 2.0 kilogram per centimeter, about 1.0 kilogram per centimeter to 1.5 kilogram per centimeter, or about 2 kilogram per centimeter using a split tear test as described herein.

Aspect 222. The foam article of any one of Aspects 196-220, wherein the foam article has a split tear value of greater than or equal to about 1.5 kg/cm, greater than or equal to about 2.0 kg/cm, or greater than or equal to about 2.5 kg/cm, when determined using a split tear test as described herein.

Aspect 223. The foam article of any one of Aspects 196-222, wherein the foam article has a specific gravity of less than or equal to 0.9, less than or equal to 0.7, less than or equal to 0.5, or less than or equal to 0.3.

Aspect 224. The foam article of Aspect 223, wherein the foam article has a specific gravity of from about 0.02 to about 0.22; of from about 0.03 to about 0.12; from about 0.04 to about 0.10; from about 0.11 to about 0.12; from about 0.10 to about 0.12; from about 0.15 to about 0.2; 0.15 to about 0.30; 0.01 to about 0.10; from about 0.02 to about 0.08; from about 0.03 to about 0.06; 0.08 to about 0.15; from about 0.10 to about 0.12; from about 0.15 to about 0.2; from about 0.10 to about 0.12; from about 0.1 to about 0.35; from about 0.12 to about 0.20; from 0.02 to about 0.22; from about 0.02 to about 0.20; from about 0.02 to about 0.18; or from of about 0.02 to about 0.16.

Aspect 225. The foam article of any one of Aspects 196-224, wherein the foam article has a stiffness of about 200 kilopascals to about 1000 kilopascals, for a cylindrical sample having a diameter of about 45 millimeters as determined using the Cyclic Compression Test.

Aspect 226. The foam article of Aspect 225, wherein the foam article has a stiffness of about 400 kilopascals to about 900 kilopascals, for a cylindrical sample having a diameter of about 45 millimeters as determined using the Cyclic Compression Test.

Aspect 227. The foam article of any one of Aspects 196-226, wherein the foam article has a change in displacement at max loading of about 1 millimeters to about 5 millimeters when measured on foam slabs having a thickness of about 1 centimeters, wherein the foam slabs are compressed for about 5000 cycles of compression from ON to 300 N and back to 0 N per cycle, using a 45 mm diameter cylindrical tupp as the compression head.

Aspect 228. The foam article of any one of Aspects 196-226, wherein the foam article has a change in displacement at max loading of about 2 millimeters to about 4 millimeters when measured on foam slabs having a thickness of about 1 centimeters, wherein the foam slabs are compressed for about 5000 cycles of compression from ON to 300 N and back to 0 N per cycle, using a 45 mm diameter cylindrical tupp as the compression head.

Aspect 229. The foam article of any one of Aspects 196-228, wherein the foam article comprises greater than about 90 weight percent of the thermoplastic copolyester based on the total weight of the first thermoplastic composition.

Aspect 230. The foam article of Aspect 229, wherein the foam article comprises greater than about 95 weight percent of the thermoplastic copolyester based on the total weight of the first thermoplastic composition.

Aspect 231. The foam article of Aspect 229, wherein the foam article comprises greater than about 97 weight percent of the thermoplastic copolyester based on the total weight of the first thermoplastic composition.

Aspect 232. The foam article of Aspect 229, wherein the foam article comprises greater than about 98 weight percent of the thermoplastic copolyester based on the total weight of the first thermoplastic composition.

Aspect 233. The foam article of Aspect 229, wherein the foam article comprises greater than about 99 weight percent of the thermoplastic copolyester based on the total weight of the first thermoplastic composition.

Aspect 234. An article comprising the foam article made by the method of any one of Aspects 72-195, or the foam article of any one of Aspects 196-233.

Aspect 235. The article of Aspect 234, wherein the article is an article of footwear.

Aspect 236. The article of Aspect 234, wherein the foam article is a cushioning element in the article of footwear.

Aspect 237. The article of Aspect 234, wherein the cushioning element is a component of a sole structure in the article of footwear.

Aspect 238. The article of Aspect 234, wherein the foam article is a component of a sole structure in the article of footwear.

Aspect 239. The article of any one of Aspects 243-238, wherein the sole structure has a first side that is configured to be ground-facing when the sole structure is a component of an article of footwear, a second side opposed to the first side, and a sidewall extending at least partially between the first side and the second side; wherein the layer comprising the second polymeric material is disposed on one or more of the first side, the second side, or the sidewall.

Aspect 240. The article of any one of Aspects 234-239, wherein the sole structure includes a midsole.

Aspect 241. The article of any one of Aspects 234-240, wherein the sole structure includes a plate.

Aspect 242. The article of any one of Aspects 234-241, wherein the sole structure includes a chassis.

Aspect 243. The article of any one of Aspects 234-242, wherein the sole structure includes a bladder.

Aspect 244. The article of any one of Aspects 234-243, wherein the sole structure includes a bladder, and the foam article is disposed on an exterior surface of the bladder.

Aspect 245. The article of any one of Aspects 234-244, wherein the sole structure includes a heel counter, or wherein the foam article is a heel counter.

Aspect 246. The article of any one of Aspects 234-245, wherein the sole structure comprises a shell component that at least partially encloses the foam article, wherein the shell component comprises the layer comprising the second thermoplastic composition.

Aspect 247. The article of any one of Aspects 234-246, wherein the shell component encloses the foam article on the first side and the sidewall of the sole structure.

Aspect 248. The article of any one of Aspects 234-247, wherein the shell component is attached to the upper of the article of footwear.

Aspect 249. The article of any one of Aspects 234-248, wherein the sole structure further comprises an outsole component on the ground-facing side of the sole structure.

Aspect 250. The article of Aspect 249, wherein the outsole component comprises a thermoplastic elastomer (TPE) or thermoplastic vulcanizate (TPV).

Aspect 251. The article of Aspect 250, wherein the thermoplastic vulcanizate is cross-linked.

Aspect 252. The article of Aspect 250, wherein the thermoplastic vulcanizate is comprises a partially cross-linked rubber dispersed into a thermoplastic host phase.

Aspect 253. The article of Aspect 252, wherein the partially cross-linked rubber of the thermoplastic vulcanizate comprises an ethylene propylene diene rubber, an alkyl acrylic copolymer rubber, or silicone rubber, or any combination thereof; or wherein the thermoplastic host phase of the thermoplastic vulcanizate comprises a polypropylene homopolymer or copolymer, a polyamide homopolymer or copolymer, a polyester homopolymer or copolymer, or any combination thereof; optionally wherein the partially cross-linked rubber dispersed into a thermoplastic host phase comprises an ethylene propylene diene rubber in polypropylene (EPDM/PP), an alkyl acrylic copolymer rubber in a polyamide host (ACM/PA), a silicone rubber dispersed in thermoplastic copolyester, or combinations thereof.

Aspect 254. The article of any one of Aspects 234-253, wherein the outsole component comprises a thermoplastic elastomer (TPE).

Aspect 255. The article of Aspect 254, wherein the thermoplastic elastomer is selected from a copolyester, a thermoplastic polyurethane (TPU), a styrenic copolymer, an ethylenic copolymer, an ionomer, an acrylic copolymer, and combinations thereof; optionally wherein the thermoplastic elastomer is a TPU or a styrenic copolymer.

Aspect 256. The article of Aspect 255, wherein the styrenic copolymer is selected from a styrene butadiene rubber (SBR), a styrene ethylene butadiene styrene (SEBS), a styrene ethylene propylene styrene (SEPS), and combinations thereof.

Aspect 257. The article of Aspect 255, wherein the ethylenic copolymer is selected from an ethylene-propylene copolymer, an olefinic block copolymer, and combinations thereof.

Aspect 258. The article of Aspect 255, wherein the olefinic block comprises poly(methyl methacrylate) blocks, acrylate blocks, poly(methyl methacrylate)-acrylate copolymeric blocks, and combinations thereof.

Aspect 259. The article of any one of Aspects 249-258, wherein the outsole component comprises a solid polymeric material that was formed without the addition of compressed gas, supercritical fluid or other blowing agent.

Aspect 260. The article of Aspect 259, wherein the outsole component has a durometer less than Shore A 90, than Shore A 85, or less than Shore A 80.

Aspect 261. The article of Aspect 259, wherein the outsole component has a durometer greater than Shore A 60 or Shore A 65.

Aspect 262. The article of Aspect 259, wherein the outsole component has a durometer less than Shore A 90, than Shore A 85, or less than Shore A 80; and wherein the outsole component has a durometer greater than Shore A 60 or Shore A 65.

Aspect 263. The article of any one of Aspects 249-262, wherein the outsole component comprises a thermoplastic elastomer (TPE) or thermoplastic vulcanizate (TPV); and wherein the outsole component has a density less than about 1.25 grams per cubic centimeter, about 1.1 grams per cubic centimeter, about 0.95 grams per cubic centimeter, or about 0.9 grams per cubic centimeter.

Aspect 264. The article of any one of Aspects 249-263, wherein the outsole component comprises a ground contact layer, outsole, or other exterior feature; wherein the ground contact layer, outsole, or other exterior feature is prepared using a fused deposition 3D printing process; and wherein the fused deposition 3D printing process comprises using a preformed filament comprising a thermoplastic elastomer (TPE) or thermoplastic vulcanizate (TPV); or wherein the ground contact layer, outsole, or other exterior feature is prepared using a yarn having a coating comprising a thermoplastic elastomer (TPE) or thermoplastic vulcanizate (TPV), and the process of forming the ground contact layer, outsole, or other exterior feature comprises melting, re-flowing and re-solidifying the coating of the yarn to form the ground contact layer, outsole, or other exterior feature.

Aspect 265. The article of Aspect 264, wherein the filament has a diameter of about 1.5 millimeters, 1.75 millimeters, 1.85 millimeters, 2.85 millimeters, or 3.0 millimeters.

Aspect 266. The article of Aspect 264, wherein the filament has a linear density from about 100 denier to about 300 denier, or has a diameter of from about 60 to 200 microns.

Aspect 267. The article of Aspects 265 or 266, wherein the ground contact layer, outsole, or other exterior feature has a durometer less than Shore A 90, than Shore A 85, or less than Shore A 80; and wherein the outsole component has a durometer greater than Shore A 60 or Shore A 65.

Aspect 268. The article of any one of Aspects 265-267, wherein the ground contact layer, outsole, or other exterior feature has a density less than about 1.25 grams per cubic centimeter, about 1.1 grams per cubic centimeter, about 0.95 grams per cubic centimeter, or about 0.9 grams per cubic centimeter.

Aspect 269. The article of any one of Aspects 259-268, wherein the outsole component is injected molded; optionally wherein the outsole component is injection molded and foamed.

Aspect 270. The article of Aspect 269, wherein the injection molding comprises the use of a compressed gas, a supercritical fluid, or a combination thereof.

Aspect 271. The article of Aspect 269, wherein the injection molding comprises the use of a chemical foaming agent.

Aspect 272. The article of Aspect 269, wherein the injection molding comprises the use of a compressed gas, a supercritical fluid, a chemical foaming agent, or a combination thereof.

Aspect 273. The article of any one of Aspects 249-272, wherein the outsole component exhibits a dry traction coefficient of friction of about 0.9, of about 1.0, or about 1.1 by methods as defined herein.

Aspect 274. The article of any one of Aspects 249-273, wherein the outsole component exhibits a wet traction coefficient of friction of about 0.3, about 0.4, or about 0.5 by methods as defined herein.

Aspect 275. The article of any one of Aspects 249-274, wherein the outsole component comprising TPE or TPV polymers exhibits abrasion resistance as defined per the DIN or rotary drum abrasion test of less than 250 milligrams lost per test, optionally less than 200 milligrams lost per test, and preferably less than 150 milligrams lost per test, or less than 100 milligrams lost per test, or less than 80 milligrams lost per test by methods as defined herein.

Aspect 276. The article of any one of Aspects 249-275, wherein the outsole component comprises a cured rubber.

Aspect 277. The article of any one of Aspects 249-276, wherein the outsole has a density of less than or equal to about 0.90 grams per cubic centimeter.

Aspect 278. The article of any one of Aspects 249-276, wherein the outsole has a density of less than or equal to about 0.85 grams per cubic centimeter.

Aspect 279. The article of any one of Aspects 249-276, wherein the outsole has a density of less than or equal to about 0.50 grams per cubic centimeter.

Aspect 280. The article of any one of Aspects 249-276, wherein the outsole has a density about 0.60 grams per cubic centimeter to about 0.90 grams per cubic centimeter.

Aspect 281. The article of any one of Aspects 249-276, wherein the outsole has a density about 0.60 grams per cubic centimeter to about 0.85 grams per cubic centimeter.

Aspect 282. The article of any one of Aspects 249-276, wherein the outsole has a density about 0.60 grams per cubic centimeter to about 0.80 grams per cubic centimeter.

Aspect 283. The article of any one of Aspects 249-276, wherein a side of the foam article is bonded to an upper.

Aspect 284. The article of any one of Aspects 196-283, wherein the upper comprises a polyester yarn, a polyester fiber, a thermoplastic polyurethane yarn, a thermoplastic polyurethane fiber, or combinations thereof.

Aspect 285. The article of any one of Aspects 196-284, wherein the side of the foam article bonded to an upper is bonded using an adhesive.

Aspect 286. The article of any one of Aspects 196-285, wherein the side of the foam article bonded to an upper is essentially free of an adhesive at a bond interface between the side of the foam article and the upper.

Aspect 287. The article of any one of Aspects 196-286, wherein the sole structure further comprises an outsole component on a ground-facing side of the outsole component.

Aspect 288. The article of any one of Aspects 196-287, wherein the outsole component comprises a cured rubber.

Aspect 289. The article of any one of Aspects 196-288, wherein the article comprises a side of the foam article bonded to an upper.

Aspect 290. The article of any one of Aspects 196-289, wherein the upper comprises a thermoplastic polyester yarn, a thermoplastic polyester fiber, a thermoplastic polyurethane yarn, a thermoplastic polyurethane fiber, a thermoplastic polyamide yarn, a thermoplastic polyamide fiber, or combinations thereof.

Aspect 291. The article of any one of Aspects 196-2690 wherein the side of the foam article bonded to an upper is bonded using an adhesive.

Aspect 292. The article of any one of Aspects 196-291, wherein the side of the foam article bonded to an upper and is essentially free of an adhesive at a bond interface between the side of the foam article and the upper.

Aspect 293. The article of any one of Aspects 196-292, wherein the article is an article of apparel.

Aspect 294. The article of any one of Aspects 196-293, wherein the article is an article of sporting equipment.

Aspect 295. A method for manufacturing an article of footwear, the method comprising: affixing a foam article and a textile element to each other;
wherein the foam article is a form article of any one of Aspects 196-294; or
wherein the foam article is a form article is made by the method one of Aspects 72-195.

Aspect 296. A method for manufacturing an article of footwear, the method comprising: affixing an outsole to the midsole to a midsole;
wherein the outsole comprises an outsole thermoplastic copolyester; and
wherein the midsole comprises a form article of any one of Aspects 196-294, or a form article is made by the method one of Aspects 72-195.

Aspect 297. The method of Aspect 296, wherein the outsole thermoplastic copolyester comprises a thermoplastic copolyester of any one of Aspects 1-71.

Aspect 298. The method of Aspect 296, wherein the outsole thermoplastic copolyester is substantially free of a thermoplastic copolyester of any one of Aspects 1-71.

Aspect 299. The method of any one of Aspects 296-298, wherein outsole is substantially free of a foamed outsole thermoplastic copolyester.

Aspect 300. The method of any one of Aspects 296-298, wherein outsole comprises a foamed outsole thermoplastic copolyester.

Aspect 301. The method of any one of Aspects 296-300, wherein the midsole comprises a midsole foamed thermoplastic composition comprising at least one first thermoplastic copolyester, and the outsole comprises an outsole thermoplastic copolyester composition comprising a second thermoplastic composition including at least one second thermoplastic copolyester, and wherein a concentration of an additive in the foamed thermoplastic copolyester composition differs from a concentration of the additive in the outsole thermoplastic copolyester composition by at least 10 weight percent, or a first concentration of the first thermoplastic composition in the foamed thermoplastic copolyester composition differs from a second concentration of the second thermoplastic composition in the outsole thermoplastic copolyester composition by at least 10 weight percent, or a chemical structure of the first at least one thermoplastic copolyester differs from a chemical structure of the second at least one thermoplastic copolyester, or a number average molecular weight of the first at least one thermoplastic copolyester differs from a number average molecular weight of the second at least one thermoplastic copolyester by at least 10 percent, or any combination thereof.

Aspect 302. The method of any one of Aspects 296-301, wherein the affixing comprises injection molding an outsole, and then injection molding the midsole directly onto the outsole.

Aspect 303. The method of any one of Aspects 296-301, wherein the affixing comprises thermally bonding the midsole to the outsole.

Aspect 304. A molding system for forming a foam article, the system comprising:
a barrel housing a screw configured to receive a molten first thermoplastic composition and form a mixture of the molten first thermoplastic composition comprising a thermoplastic elastomer and a blowing agent, and to adjust a position of the screw in the barrel to regulate a flowrate of the mixture out of the barrel;
a mold cavity configured to contain the mixture during foaming, mold the foamed mixture, and solidify the molded foamed mixture into the foam article;
an injection or extrusion device configured to receive the mixture and extrude or inject it into the mold cavity at an injection pressure and temperature; and
a temperature control and monitoring system configured to control the injection temperature or a foaming temperature at which the molten first thermoplastic composition is foamed within the mold cavity, or both.

Aspect 305. The molding system of Aspect 304, wherein the temperature control and monitoring system is configured to control the injection temperature of the mixture or the foaming temperature of the molten first thermoplastic composition or both within a temperature ranging from about the melting temperature of the thermoplastic elastomer to about 50 degrees C. above the tail temperature of the thermoplastic elastomer.

Aspect 306. The molding system of Aspect 304 or 305, further comprising a gas counter pressure assembly coupled to the mold cavity, wherein the gas counter pressure assembly is configured to regulate an amount of counter pressure gas flow into the mold cavity before, during or after extruding or injecting the mixture into the mold cavity, or during foaming of the molten first thermoplastic composition in the mold cavity.

Aspect 307. The molding system of any one of Aspects 304-306, further comprising a mold cavity venting system configured to regulate a rate of pressure loss due to gas flow out of the mold cavity.

Aspect 308. The molding system of any one of Aspects 304-307, wherein the system further comprises a runner system in fluid communication with the injection or extrusion device and the mold cavity.

Aspect 309. The molding system of Aspect 308, wherein the runner system is configured to control a temperature of the mixture as it flows through the runner.

Aspect 310. The molding system of Aspect 309, wherein the runner system is configured to heat the mixture as it flows through the runner.

Aspect 311. The molding system of any one of Aspects 304-310, wherein the system includes a pressure control assembly configured to control a pressure of the mixture as it enters the mold cavity.

Aspect 312. A method for operation of a molding system for forming a foam article, the method comprising:

forming a mixture of a molten first thermoplastic composition comprising a thermoplastic elastomer and a blowing agent in a barrel housing a screw;

adjusting a position of the screw in the barrel to regulate a flowrate of the mixture out of the barrel;

flowing the mixture from the barrel into a mold cavity;

extruding or injecting the mixture into the mold cavity at an injection pressure and an injection pressure;

foaming the molten first thermoplastic composition in the mold cavity at a foaming temperature, thereby forming a foamed molten first thermoplastic composition; and solidifying the foamed molten first thermoplastic composition in the mold cavity, thereby forming a foam article having a multicellular foam structure.

Aspect 313. The method of operation of Aspect 312, wherein the method further comprises monitoring and controlling the injection temperature of the mixture or the foaming temperature of the molten first thermoplastic composition or both within a temperature ranging from about the melting temperature of the thermoplastic elastomer to about 50 degrees C. above the tail temperature of the thermoplastic elastomer.

Aspect 314. The method of operation of Aspect 312 or 313, further comprising regulating an amount of counter pressure gas flowing into the mold cavity before, during or after extruding or injecting the mixture into the mold cavity, or during foaming of the molten first thermoplastic composition in the mold cavity.

Aspect 315. The method of operation of Aspect 312-314, further comprising releasing gas from the mold cavity at a controlled rate during the extruding or injecting or during the foaming.

Aspect 316. The method of operation of Aspect 312-315, further comprising controlling a temperature of the mixture as it flows through a runner into the mold cavity.

Aspect 317. The method of operation of Aspect 312-316, further controlling the injection pressure of the mixture as it enters the mold cavity.

Aspect 318. The method of operation of Aspect 312-317, wherein the molten first thermoplastic composition comprises a thermoplastic copolyester according any one of Aspects 1-49, or the method is a method of making a foam article according to any one of Aspects 50-173 or the foam article comprises a foam article according to any one of Aspects 174-271, or any combination thereof.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Materials

HYTREL 3078 and HYTREL 4068 were obtained from DuPont (Wilmington, Delaware, USA).

Processing Conditions

Foam plaques were prepared according to the conditions shown in Table 1 below:

TABLE 1

| Material | Melt Temp (° C.) | Mold Temp (° C.) | Injection Speed (cc/sec) | Fill time (s) | MPP (Bar) | N₂ (%) | GCP (PSI) | GCP release |
|---|---|---|---|---|---|---|---|---|
| Hytrel 4068 | 210 | 54 | 100 | 2.5 | 175 | 0.5 | 600 | End of fill |
| Hytrel 3078 | 200 | 40 | 100 | 2.5 | 175 | 0.5 | 600 | End of fill |

Foam midsoles were prepared according to the conditions shown in Table 2 below:

TABLE 2

| Material | Melt Temp (° C.) | Mold Temp (° C.) | Injection Speed (cc/sec) | Fill time (s) | Cooling Time (s) | MPP (Bar) | N₂ (%) | GCP (PSI) | GCP release |
|---|---|---|---|---|---|---|---|---|---|
| Hytrel 4068 | 210 | 54 | 100 | 2.5 | 400 | 175 | 1.22 | 600 | End of fill |
| Hytrel 3078 | 200 | 40 | 100 | 2.5 | 400 | 175 | 1.5 | 600 | End of fill |

Foam plaques were prepared according to the conditions shown in Table 3 below.

TABLE 3

| No. | Polyester | Mold Temperature (degrees centigrade) | Mold Temperature relative to peak temperature (degrees centigrade) | Mold Temperature relative to tail temperature (degrees centigrade) | Foam Quality |
|---|---|---|---|---|---|
| 1 | Triel ® 5400 | 160 | +5 | −16 | Good |
| 2 | Toyobo P-30B | 175 | 0 | −18 | Poor |
| 3 | Toyobo P-30B | 190 | +15 | −3 | Good |
| 4 | Toyobo P-30B | 205 | +30 | +12 | Coarse |
| 5 | Toyobo P-30B | 245 | +70 | +52 | Coarser |

Figure 10:
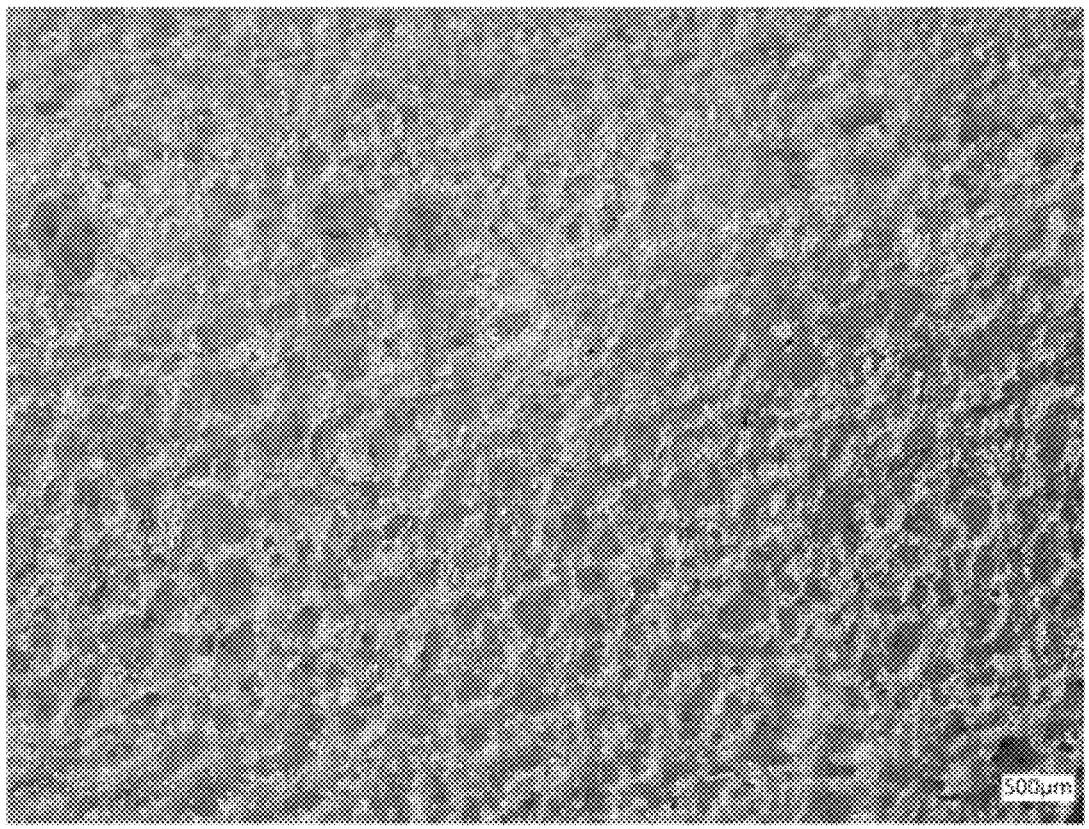
FIG. 10 shows a representative image of a cross-sectional view of a foam plaque prepared using a disclosed thermoplastic copolyester elastomer 160 degrees centigrade. The image shows a scalar bar (500 micrometers).

Cross-sectional views of the foam plaques described above are shown in FIGS. 9A-9D (for Nos. 2-5 above) and FIG. 10 (for No. 1 above).

Example 1. Exemplary Data of Foam Plaques

Figure 6:
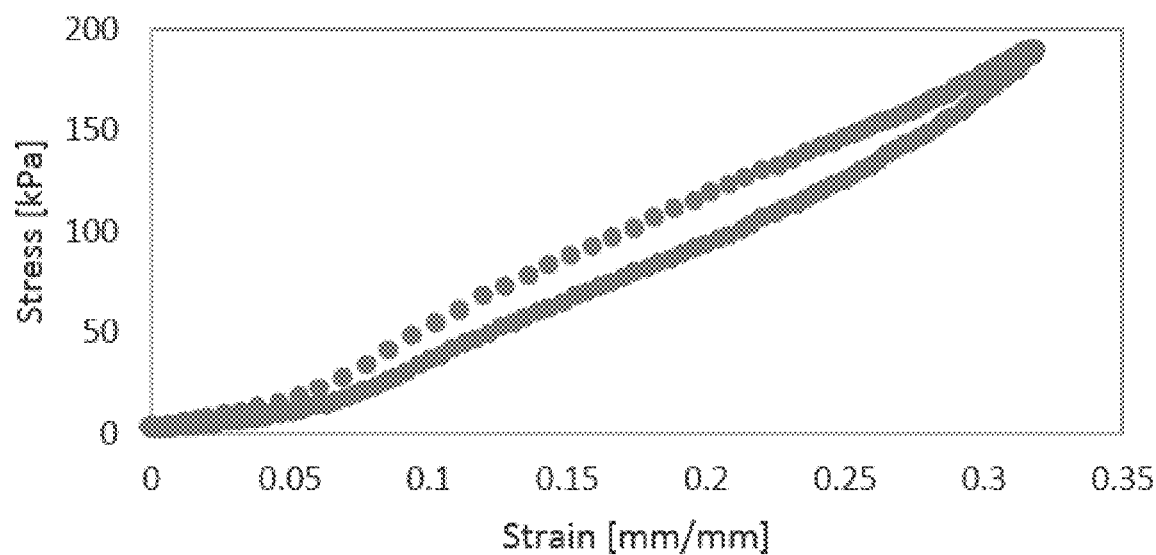
FIG. 6 shows representative compression data for representative foam plaques comprising a disclosed composition and prepared using a disclosed method.

Foam plaques were prepared as described above using HYTREL 4068. Exemplary compression data are shown in FIG. 6. The data were obtained by a cyclic compression testing protocol on a plaque in the form of a cylindrical tupp having the following dimensions: thickness—20 mm; diameter—44.86 mm. The compression data in FIG. 6 are a representative compression curve. The data obtained from these tests are summarized in Table 4 below.

TABLE 4

| Material | Average Modulus (kPa) | Average Stiffness (N/mm) | Max Strain | Efficiency (%) | Energy Return (mJ) |
|---|---|---|---|---|---|
| Hytrel 4068 | 554 | 80 | 0.377 | 87 | 397 |

The specific gravity for foam plaques, prepared as described herein above, was determined to be 0.16-0.28 for HYTREL 4068 and 0.17-0.26 HYTREL 3078.

The foam plaques described in Table 3 above were subjected to energy return analysis as described herein. The results are shown in Table 5 below.

TABLE 5

| No. | Polyester | Energy Return (mJ) |
|---|---|---|
| 1 | Triel ® 5400 | 2830 |
| 2 | Toyobo P-30B | 2050 |
| 3 | Toyobo P-30B | 2940 |
| 4 | Toyobo P-30B | 3150 |
| 5 | Toyobo P-30B | 2950 |

Example 2. Exemplary Data of Foam Midsoles

Foam midsoles were prepared as described above using HYTREL 4068. Compression data were obtained by a cyclic compression testing protocol using a footform as described above. The data obtained from these tests are summarized in Table 6 below.

TABLE 6

| Material | Average Modulus (kPa) | Average Stiffness (N/mm) | Max Displacement (mm) | Efficiency (%) | Energy Return (mJ) |
|---|---|---|---|---|---|
| Hytrel 4068 | N/A | 173 | 11.57 | 74 | 4078 |

The specific gravity for foam midsoles, prepared as described herein above, was determined to be 0.19-0.27 for HYTREL 4068 and 0.19-0.26 HYTREL 3078.

Example 3. Exemplary Hand Pull Data

A foam article was prepared comprising a first foam component and a second s component. The first foam component was an open-cell foam formed from a first thermoplastic copolyester composition comprising HYTREL 4068 which contained less than 1 weight percent of non-polymeric materials. The first thermoplastic copolyester composition was injection molded, foamed and bonded in place to the second solid component. The thermoplastic copolyester composition was foamed using the MUCELL process by forming a single-phase solution of carbon dioxide and the thermoplastic copolyester composition. The first thermoplastic copolyester composition was injection molded and foamed onto a preformed second component as described herein below. The second solid component was prepared as a solid plaque using a second thermoplastic copolyester composition, i.e., a second thermoplastic composition comprising one of the four listed polymers shown in the table below (MP IN15074, HYTREL 3078, TRIEL 5202SU, and SP9339, which are further described in Table 8). The first foam component was bonded to the second foam component, i.e., a plaque comprising a solid second thermoplastic composition, by injecting, foaming, and molding a single-phase solution of carbon dioxide and a thermoplastic copolyester composition comprising HYTREL 4068 onto the outsole plaque in an injection mold. Prior to placing the outsole plaque into the mold, one of the following treatments was used: a) no surface preparation was conducted on the surface of the outsole plaque onto which the foam was injected (i.e., control sample); b) the outsole plaque surface was wiped with methyl ethyl ketone prior to insertion into the mold; c) the outsole plaque surface was treated using a rotating cone open air plasma treatment immediately prior to insertion into the mold and injection of the foam composition, where the plaque surface was held 1 cm away from the emitting head, and the plaque was moved passed the emitting head at a rate of about 100-200 mm/sec; or d) the outsole plaque was heated using an infrared lamp for at least 30 seconds after insertion into the mold and immediately prior to injection of the foam composition. The equipment used was a Plasmatreat OPENAIR-PLASMA System with an RD1004 head (Plasmatreat GmbH, Steinhagen, Germany).

Hand pull data were obtained using the Hand Pull Test as described herein above. The data obtained are shown in Table 7 below. The data in Table 7 indicate that good bonding of the foam to an outsole material can be achieved using a direct bonding process with little if any additional process steps prior to foaming and molding in place the first foam component.

TABLE 7

| Surface Prep of Foam Plaque | Outsole Polymer* | | | |
|---|---|---|---|---|
| | MP IN15074 | HY3078 | TRIEL 5202SU | SP9339 |
| No treatment | 1 | 2 | 3.5 | 2 |
| MEK wipe | 1 | 3 | 3 | 3 |
| Plasmatreat | 1.5 | 4.5 | 4 | 3.5 |
| IR pre-treatment | 1 | 4.5 | 4 | 4 |

*Values correspond to the following results in Hand Pull Test:
1-easy to peel adhesive failure;
2-adhesive failure, but some resistance;
3-4.5 cohesive foam failure, varying levels of foam skin failure; and
5-unable separate)

Example 4. Exemplary Data of Second Thermoplastic Composition Characterization—Coefficient of Friction—Polymer Samples Sample preparation, coefficient of friction, and other test procedures were carried out as described herein above. The coefficient of friction data for wood and concrete surfaces are shown in the table shown in FIGS. 11 and 12, respectively. The materials referred into FIGS. 11 and 12 are further described in Table 8 below.

TABLE 8

| Material Grade | Polymer type | Form | Supplier |
| --- | --- | --- | --- |
| BT 1030D | CoPe TPE | Solid | LG |
| Desmopan 8795A | TPU | Foam | Covestro |
| Ellastolan b70a | TPU | Solid | Lubrizol |
| Ellastolan SP9339 | TPU | Foam | BASF |
| Ellastolan SP9339 | TPU | Solid | BASF |
| Estane t470a-3 | TPU | Solid | Lubrizol |
| HPF AD1035 | Ethlyenic TPE/Ionomer | Solid | DuPont |
| HPF AD1172 | Ethlyenic TPE/Ionomer | Solid | DuPont |
| Hytrel 3078 | CoPe TPE | Solid | DuPont |
| Hytrel 3078 | CoPe TPE | Foam | DuPont |
| Hytrel 3078 | CoPe TPE | Solid | DuPont |
| Hytrel 4068 | CoPe TPE | Foam | DuPont |
| Hytrel 4556 | CoPe TPE | Solid | DuPont |
| KP3340 | CoPe TPE | Solid | Kolon |
| KP3347 | CoPe TPE | Solid | Kolon |
| Kurarity LA2250 | Acrylic TPE | Solid | Kuraray |
| Kurarity LA4285 | Acrylic TPE | Solid | Kuraray |
| Monprene 12990 | SEBS TPE | Foam | Teknor Apex |
| Monprene 66070 | SEBS TPE | Solid | Teknor Apex |
| Monprene CP28160-01 | SEBS TPE | Solid | Teknor Apex |
| Monprene IN15056 | SEBS TPE | Solid | Teknor Apex |
| Monprene IN15074 | SEBS TPE | Solid | Teknor Apex |
| Monprene IN15074 | SEBS TPE | Foam | Teknor Apex |
| Monprene SP16074H | SEBS TPE | Solid | Teknor Apex |
| Monprene SP16975 | SEBS TPE | Solid | Teknor Apex |
| Santoprene 123-40 | TPV: EPDM/PP | Solid-Herringbone | Exxon |
| Santoprene 201-64 | TPV: EPDM/PP | Solid-Herringbone | Exxon |
| Santoprene 103-50 | TPV: EPDM/PP | Solid-Herringbone | Exxon |
| Sarlink 3160 | TPV: EPDM/PP | Solid | Teknor Apex |
| Sarlink 6755B | TPV: EPDM/PP | Solid | Teknor Apex |
| Sarlink 6755N | TPV: EPDM/PP | Solid | Teknor Apex |
| Septon blends w/PP (16-011-4) | SEBS/PP compound | Solid | Kuraray |
| Septon blends w/PP (16-051-1) | SEBS/PP compound | Solid | Kuraray |
| Septon blends w/PP (16-078-2) | SEBS/PP compound | Solid | Kuraray |
| Surlyn 8150 | Ethlyenic TPE/Ionomer | Solid | DuPont |
| Surlyn 8320 | Ethlyenic TPE/Ionomer | Solid | DuPont |
| Surlyn 9320 | Ethlyenic TPE/Ionomer | Solid | DuPont |
| Topgreen RH 1502-2 | CoPe TPE | Solid | FENC |
| Topgreen RH 1601-7 | CoPe TPE | Solid | FENC |
| TPSIV-50A | TPV: Silicone/Hytrel | Solid | DuPont |
| TPSiV-60A | TPV: Silicone/Hytrel | Solid | DuPont |
| Triel 5202SP | CoPe TPE | Solid | SamYang |
| Triel 5202SP | CoPe TPE | Foam | SamYang |
| Triel 5300 | CoPe TPE | Solid | SamYang |
| Triel 5401A | CoPe TPE | Solid | SamYang |
| Triel SY 5280 | CoPe TPE | Solid | SamYang |
| Tuftec P1500 | SEBS TPE | Solid | Asahi |
| Tuftec P5051 | SEBS TPE | Solid | Asahi |
| Zeotherm 100-70B | TPV: ACM/PA | Solid | Zeon Chemical |
| Zeotherm 100-80B | TPV: ACM/PA | Solid | Zeon Chemical |
| Zeotherm 110-70B | TPV: ACM/PA | Solid | Zeon Chemical |
| Zeotherm 130-90B | TPV: ACM/PA | Solid | Zeon Chemical |

Table 8, the abbreviations used therein have the following meaning:
"TPU" means "Thermoplastic Polyurethane";
CoPe TPE means "Copolyester Thermoplastic Elastomer";
"Ethylenic TPE/Ionomer" means "Ethylenic Thermoplastic Elastomer/Ionomer";
"Acrylic TPE" means "Acrylic Thermoplastic Elastomer";
"SEBS TPE" means "Styrene-Ethylene-Butadiene-Styrene Thermoplastic Elastomer";
"TPV/EPDM/PP" means "Styrene-Ethylene-Butadiene-Styrene Thermoplastic Elastomer Thermoplastic Vulcanizate of Ethylene Propylene Diene Monomer Rubber and Thermoplastic Polypropylene";
"TPV: Silicone/Hytrel" means "Thermoplastic Vulcanizate of Silicone Rubber and Thermoplastic Copolyester"; and
"TPV: ACM/PA" means "Thermoplastic Vulcanizate of Acryl Acrylate Copolymer Rubber and Thermoplastic Polyamide".

Example 5. Exemplary Data of Second Thermoplastic Composition Characterization—Coefficient of Friction—Blown Outsole Samples Sample preparation, coefficient of friction, and other test procedures were carried out as described herein above. The coefficient of friction data for concrete surfaces are shown in the table shown in FIG. 13. The materials referred into FIG. 13 are further described in Table 8 above.

Example 6. Exemplary Data of Second Thermoplastic Composition Characterization—Specific Gravity—Blown Outsole Samples Sample preparation and specific gravity test procedures were carried out as described herein above. The coefficient of friction data for concrete surfaces are shown in the table shown in FIG. 14. The samples approximated 'blown' rubber via physically foamed thermoplastic resins using added compressed gas or SCF. The materials referred into FIG. 14 are further described in Table 8 above.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The invention claimed is:

1. A method of manufacturing a cushioning element for an article of footwear, the method comprising:
    impregnating a molten first thermoplastic composition with a blowing agent comprising a supercritical fluid, wherein the molten first thermoplastic composition comprises a first thermoplastic copolyester elastomer to form an impregnated molten first thermoplastic composition;
    inserting a bladder into a mold cavity, wherein a second thermoplastic composition defines at least a portion of an exterior surface of the bladder;
    injecting the impregnated molten first thermoplastic composition into the mold cavity containing the bladder to form an injected molten first thermoplastic composition;
    in the mold cavity containing the bladder, physically foaming the injected molten first thermoplastic composition into a first foam by expanding the supercritical fluid to nucleate foam cells in the molten first thermoplastic composition, the molten first thermoplastic composition having a foaming temperature during the physically foaming;
    during the physically foaming, contacting the second thermoplastic composition of the at least a portion of the exterior surface of the bladder with the molten first thermoplastic composition;
    while in the mold cavity, solidifying the first foam and forming bonds between the first thermoplastic composition and the second thermoplastic composition where the second thermoplastic composition and the molten first thermoplastic composition came into contact during the physically foaming step to form a solidified and bonded first foam and bladder;
    removing the solidified and bonded first foam and bladder from the mold cavity, forming the cushioning element;
    wherein the first foam of the cushioning element is a physically-foamed thermoplastic multicellular foam.

2. The method of claim 1, wherein the supercritical fluid comprises supercritical carbon dioxide or supercritical nitrogen.

3. The method of claim 1, wherein the supercritical fluid comprises supercritical carbon dioxide.

4. The method of claim 1, wherein the blowing agent consists of supercritical carbon dioxide.

5. The method of claim 1, wherein the impregnating the molten first thermoplastic composition with the blowing agent comprises forming a single-phase solution comprising the molten first thermoplastic composition and the supercritical fluid.

6. The method of claim 5, wherein the supercritical fluid is present in the single-phase solution in an amount of about 1 percent to about 3 percent by weight based on upon a total weight of the single-phase solution.

7. The method of claim 1, wherein the bladder comprises a multi-layer film, wherein the multi-layer film comprises the second thermoplastic composition.

8. The method of claim 7, wherein the multi-layer film includes a third thermoplastic composition comprising a barrier polymer.

9. The method of claim 8, wherein the barrier polymer comprises ethylene-vinyl alcohol (EVOH).

10. The method of claim 8, wherein the second thermoplastic composition comprises a thermoplastic polyurethane (TPU).

11. The method of claim 1, wherein the cushioning element is a midsole or a heel cushion.

12. The method of claim 1, wherein the foaming temperature is from about the melting temperature of the molten first thermoplastic copolyester as determined by dynamic scanning calorimetry to about 50 degrees centigrade above the tail temperature of the molten first thermoplastic copolyester as determined by dynamic scanning calorimetry.

13. The method of claim 1, wherein the injecting and physically foaming steps comprise overmolding the bladder with the first foam, and the cushioning component is an overmolded cushioning component.

14. The method of claim 1, wherein the first foam has an open cell foam microstructure.

15. The method of claim 1, wherein the first foam has an average cell size of from about 50 micrometers to about 500 micrometers, and a specific gravity of about 0.15 to about 0.25.

16. The method of claim 1, wherein the first foam has a split tear greater than or equal to about 2.0 kg/cm, or an energy efficiency greater than or equal to about 60 percent, or both.

17. The method of claim 1, wherein the molten first thermoplastic composition is free or essentially free of nucleating agents, or is free or essentially free of fillers, or is free or essentially free of both nucleating agents and fillers.

18. The method of claim 1, wherein the molten first thermoplastic composition of the first foam comprises less than 5 weight percent of dyes or pigments.

19. The method of claim 1, wherein the molten first thermoplastic composition of the first foam further comprises a non-polymeric component comprising all non-polymeric ingredients present in the first thermoplastic composition, and the non-polymeric component makes up less than one weight percent of the molten first thermoplastic composition based on a total weight of the molten first thermoplastic composition.

20. The method of claim 1, wherein the first thermoplastic copolyester elastomer comprises
    (a) a plurality of first segments, each first segment of the plurality is derived from a dihydroxy-terminated polydiol;
    (b) a plurality of second segments, each second segment of the plurality is derived from a diol; and
    (c) a plurality of third segments, wherein each third segment of the plurality is derived from an aromatic dicarboxylic acid.

* * * * *

UNITED STATES PATENT AND TRADEMARK OFFICE
CERTIFICATE OF CORRECTION

| | | |
|---|---|---|
| PATENT NO. | : 12,004,590 B2 | |
| APPLICATION NO. | : 18/455582 | |
| DATED | : June 11, 2024 | |
| INVENTOR(S) | : Hossein A. Baghdadi et al. | |

It is certified that error appears in the above-identified patent and that said Letters Patent is hereby corrected as shown below:

In the Drawings
Sheet 10 of 15, FIG. 11, Line no. 7 remove "Monoprene IN 15056" and insert -- Monprene IN 15056 --
Sheet 11 of 15, FIG. 12, Line no. 9 remove "Ellastolan b70a" and insert -- Elastollan b70a --
Sheet 11 of 15, FIG. 12, Line no. 10 remove "Ellastolan SP9500" and insert -- Elastollan SP9500 --
Sheet 14 of 15, FIG. 13, Line no. 9 remove "Ellastolan SP9339" and insert -- Elastollan SP9339 --
Sheet 15 of 15, FIG. 14, Line no. 4 remove "Ellastolan SP9339" and insert -- Elastollan SP9339 --

In the Specification
Under Column no. 5, Line no. 15 remove "thermoplastic c foam" and insert -- thermoplastic foam --
Under Column no. 8, Line no. 35 remove "heel foxings" and insert -- heel fixings --
Under Column no. 10, Line no. 28 remove "and has have a split" and insert -- and has a split --
Under Column no. 11, Line no. 33 remove "for in an article" and insert -- for an article --
Under Column no. 11, Line no. 29 remove "described herein" and insert -- described herein. --
Under Column no. 12, Line nos. 4-26 remove "In other aspects, the temperature at which the molten first thermoplastic composition is foamed can modify the properties of the foam. In one aspect, the foaming temperature of the thermoplastic composition, i.e., the temperature of the thermoplastic composition at the point that foaming is initiated, is from about the melting temperature of the thermoplastic composition to about 50 degrees centigrade, or about 40 degrees centigrade, or about 30 degrees centigrade, or about 20 degrees centigrade above the tail temperature of the thermoplastic composition. Alternatively, the foaming temperature can be from the crystallization temperature of the thermoplastic composition to about 50 degrees centigrade, or about 40 degrees centigrade, or about 30 degrees centigrade, or about 20 degrees centigrade above the crystallization temperature of the thermoplastic composition. The melting temperature, the tail temperature, and the crystallization temperature of the thermoplastic composition can be determined using differential scanning calorimetry (DSC). In this aspect, properties such as reduced specific gravity, consistent foam cell size, and/or high energy efficiency or energy return can be achieved, particularly when foaming thermoplastic copolyester compositions." and insert -- In other aspects, the temperature at which the molten first thermoplastic composition is foamed can modify the properties of the foam. In Signed and Sealed this
Fifth Day of November, 2024

*Katherine Kelly Vidal*
Katherine Kelly Vidal
*Director of the United States Patent and Trademark Office* one aspect, the foaming temperature of the thermoplastic composition, i.e., the temperature of the thermoplastic composition at the point that foaming is initiated, is from about the melting temperature of the thermoplastic composition to about 50 degrees centigrade, or about 40 degrees centigrade, or about 30 degrees centigrade, or about 20 degrees centigrade above the tail temperature of the thermoplastic composition. Alternatively, the foaming temperature can be from the crystallization temperature of the thermoplastic composition to about 50 degrees centigrade, or about 40 degrees centigrade, or about 30 degrees centigrade, or about 20 degrees centigrade above the crystallization temperature of the thermoplastic composition. The melting temperature, the tail temperature, and the crystallization temperature of the thermoplastic composition can be determined using differential scanning calorimetry (DSC). In this aspect, properties such as reduced specific gravity, consistent foam cell size, and/or high energy efficiency or energy return can be achieved, particularly when foaming thermoplastic copolyester compositions. --

Under Column no. 15, Line no. 65 remove "thermoplastic r foams" and insert -- thermoplastic foams --

Under Column no. 26, Line no. 17 remove "component can have an can have an Akron" and insert -- component can have an Akron --

Under Column no. 30, Line no. 36 (approx.) remove "can be is an" and insert -- can be an --

Under Column no. 32, Line no. 1 remove "65 wt; about" and insert -- 65 weight percent; about --

Under Column no. 34, Line no. 55 remove "65 wt; about" and insert -- 65 weight percent; about --

Under Column no. 40, Line no. 30 remove "described herein" and insert -- described herein. --

Under Column no. 45, Line no. 29 remove "Gimhae-si, Gyeongsangdam-do, Korea" and insert -- Gimhae-si, Gyeongsangnam-do, Korea --

Under Column no. 48, Line no. 11 remove "oxazolyl, isooxazolyl, thiadiazolyl," and insert -- oxazolyl, isoxazolyl, thiadiazolyl, --

Under Column no. 48, Line no. 16 remove "with trimethyloylpropane (TMP)" and insert -- with trimethylolpropane (TMP) --

Under Column no. 48, Line no. 31 remove "from diisocynates including" and insert -- from diisocyanates including --

Under Column no. 48, Line no. 40 remove "9500, B70A;" and insert -- 9500, B70A, --

Under Column no. 48, Line nos. 58-59 remove "Gimhae-si, Gyeongsangdam-do, Korea" and insert -- Gimhae-si, Gyeongsangnam-do, Korea --

Under Column no. 49, Line no. 5 remove "repeating blocks soft" and insert -- repeating blocks of soft --

Under Column no. 49, Line nos. 16-37 remove "The polyamide segments of the block co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating blocks. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The thermoplastic copolyamide can be formed from the polycodensation of a polyamide oligomer or prepolymer with a second oligomer prepolymer to form a block copolyamide (i.e., a block co-polymer including polyamide segments. Optionally, the second prepolymer can be a hydrophilic prepolymer." and insert -- The polyamide segments of the block co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating blocks. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The thermoplastic copolyamide can be formed from the polycondensation of a polyamide oligomer or prepolymer with a second oligomer prepolymer to form a block copolyamide (i.e., a block co-polymer including polyamide segments. Optionally, the second prepolymer can be a hydrophilic prepolymer. --

Under Column no. 49, Line no. 33 remove "the polycodensation of" and insert -- the polycondensation of --

Under Column no. 51, Line no. 15 remove "a ratio Ill of" and insert -- a ratio III of --

Under Column no. 51, Line no. 22 remove "Delaware, USA." and insert -- Delaware, USA). --

Under Column no. 51, Line no. 35 remove "include MONOPRENE IN5074," and insert
-- include MONPRENE IN5074, --

Under Column no. 54, Line no. 49 remove "such as of plates," and insert -- such as plates, --

Under Column no. 67, Line no. 48 remove "wherein the the second" and insert -- wherein the second --

Under Column no. 80, Line no. 47 remove "called TSiPVs)" and insert -- called TSIPVs). --

Under Column no. 84, Line no. 47 remove "from ON to 300 N" and insert -- from 0 N to 300 N --

Under Column no. 84, Line no. 56 remove "from ON to 300 N" and insert -- from 0 N to 300 N --

Under Column no. 86, Line no. 7 remove "vulcanizate is comprises" and insert -- vulcanizate comprises --

Under Column no. 95-96, Line no. 6, TABLE 8 remove "Ellastolan b70a" and insert -- Elastollan b70a --

Under Column no. 95-96, Line no. 7, TABLE 8 remove "Ellastolan SP9339" and insert -- Elastollan SP9339 --

Under Column no. 95-96, Line no. 8, TABLE 8 remove "Ellastolan SP9500" and insert -- Elastollan SP9500 --